US012581359B2

(12) United States Patent
Uchino et al.

(10) Patent No.: US 12,581,359 B2
(45) Date of Patent: Mar. 17, 2026

(54) RADIO ACCESS NETWORK ENHANCEMENTS FOR MULTIPLE DESCRIPTION CODING

(71) Applicant: QUALCOMM Incorporated, San Diego, CA (US)

(72) Inventors: Toru Uchino, Zushi (JP); Vivek Rajendran, San Diego, CA (US); Alberto Rico Alvarino, San Diego, CA (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 608 days.

(21) Appl. No.: 18/055,790

(22) Filed: Nov. 15, 2022

(65) Prior Publication Data

US 2024/0163718 A1    May 16, 2024

(51) Int. Cl.
*H04W 28/06*        (2009.01)

(52) U.S. Cl.
CPC .................................... *H04W 28/06* (2013.01)

(58) Field of Classification Search
CPC ............................ H04W 28/06; H04W 28/065
See application file for complete search history.

(56) References Cited

U.S. PATENT DOCUMENTS

| | | | |
|---|---|---|---|
| 2006/0245452 A1 | 11/2006 | Frederiksen et al. | |
| 2009/0175173 A1* | 7/2009 | Kim ...................... | H04L 1/1835 |
| | | | 370/241 |

| | | | |
|---|---|---|---|
| 2009/0252182 A1* | 10/2009 | Maheshwari ....... | H04W 28/065 |
| | | | 370/474 |
| 2012/0155438 A1* | 6/2012 | Shin ...................... | H04L 1/1841 |
| | | | 370/336 |
| 2016/0285559 A1 | 9/2016 | Xie et al. | |
| 2018/0270103 A1* | 9/2018 | Chapman ............ | H04L 43/0847 |
| 2019/0372724 A1* | 12/2019 | Baek .................. | H04W 28/0278 |
| 2020/0229111 A1* | 7/2020 | Kim ...................... | H04W 72/23 |
| 2021/0007008 A1* | 1/2021 | Gage .................... | H04L 1/1896 |
| 2022/0116172 A1 | 4/2022 | Tang et al. | |
| 2024/0154724 A1* | 5/2024 | Liu ....................... | H04L 1/0041 |

FOREIGN PATENT DOCUMENTS

| | | | |
|---|---|---|---|
| KR | 100734632 B1 | 7/2007 | |
| KR | 101478243 B1 | 12/2014 | |
| WO | 2011061855 A1 | 5/2011 | |
| WO | 2015180066 A1 | 12/2015 | |
| WO | 2018064403 A1 | 4/2018 | |
| WO | 2022213008 A1 | 10/2022 | |

OTHER PUBLICATIONS

International Search Report and Written Opinion—PCT/US2023/035123—ISA/EPO—May 2, 2024—21 pages.
Partial International Search Report—PCT/US2023/035123—ISA/EPO—Jan. 26, 2024—15 pages.

* cited by examiner

*Primary Examiner* — Yu-Wen Chang
(74) *Attorney, Agent, or Firm* — Procopio, Cory, Hargreaves & Savitch LLP

(57) ABSTRACT

A method of wireless communication at a first wireless device is disclosed herein. The first wireless device monitors at least one radio bearer for RLC segmentation information corresponding to a set of SDUs associated with the first wireless device. The first wireless device transmits, for a second wireless device, at least one RLC SDU that includes a number of encodings based on the RLC segmentation information corresponding to the set of SDUs.

26 Claims, 34 Drawing Sheets

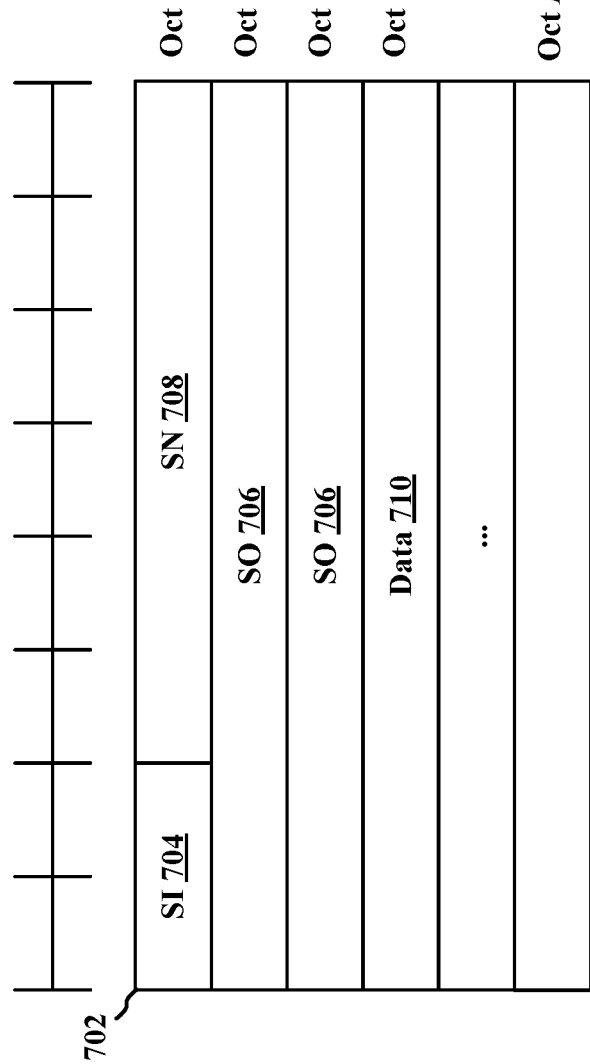
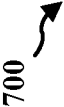
FIG. 7

FIG. 9

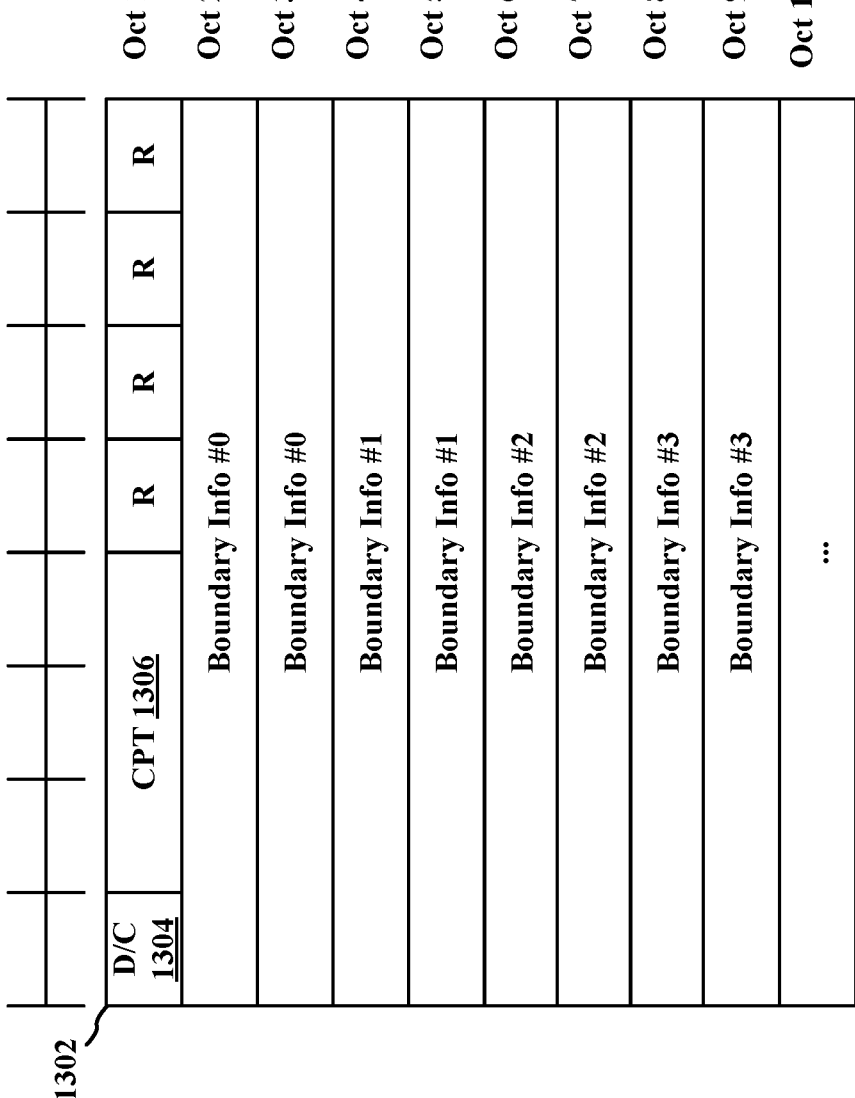
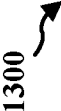
FIG. 13

1800

1802 monitor at least one radio bearer for RLC segmentation information corresponding to a set of SDUs associated with the first wireless device

1804 transmit, for a second wireless device, at least one RLC SDU that includes a number of encodings based on the RLC segmentation information corresponding to the set of SDUs

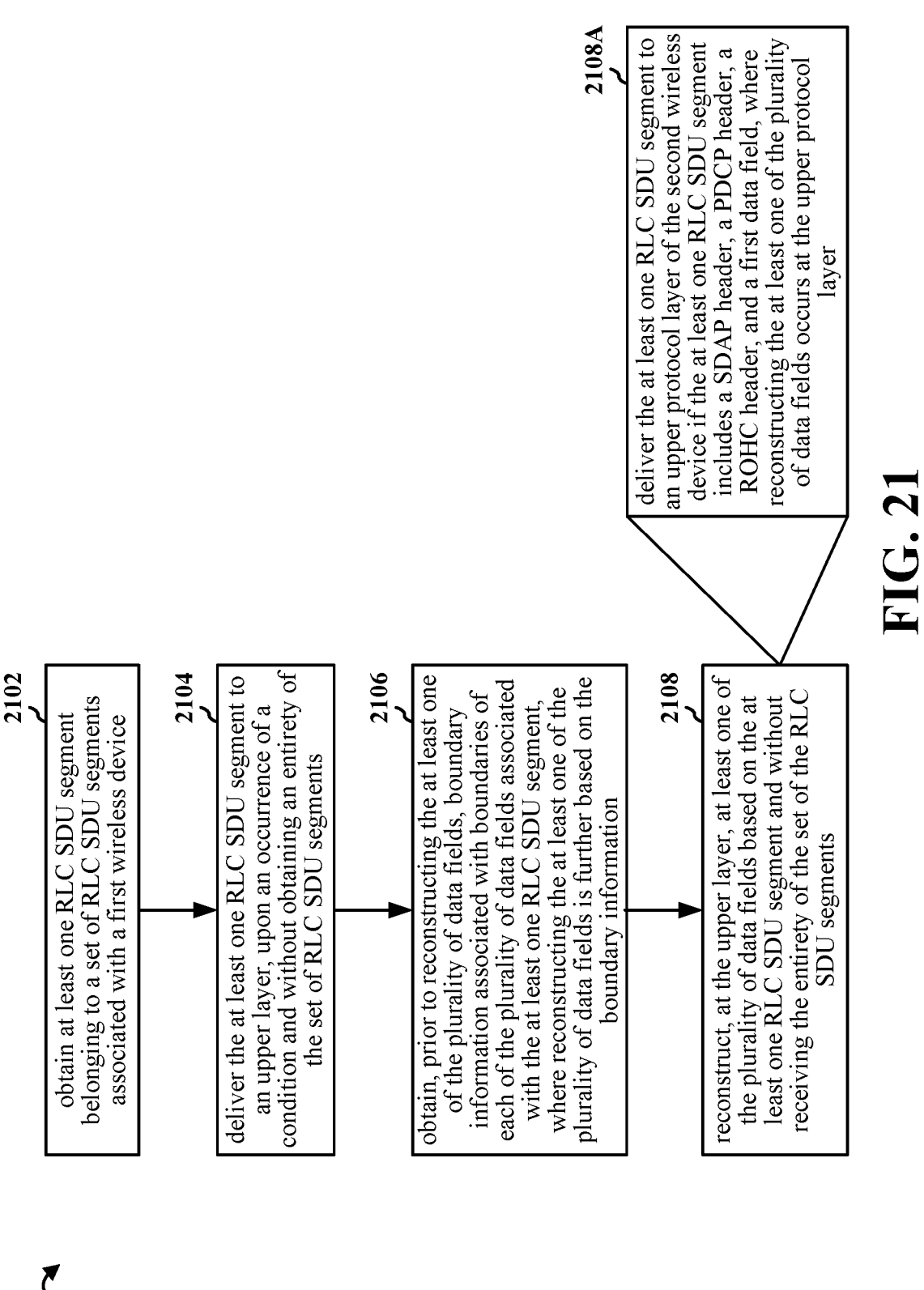

2102 obtain at least one RLC SDU segment belonging to a set of RLC SDU segments associated with a first wireless device

2104 deliver the at least one RLC SDU segment to an upper layer, upon an occurrence of a condition and without obtaining an entirety of the set of RLC SDU segments

2106 obtain, prior to reconstructing the at least one of the plurality of data fields, boundary information associated with boundaries of each of the plurality of data fields associated with the at least one RLC SDU segment, where reconstructing the at least one of the plurality of data fields is further based on the boundary information

2108 reconstruct, at the upper layer, at least one of the plurality of data fields based on the at least one RLC SDU segment and without receiving the entirety of the set of the RLC SDU segments

2108A deliver the at least one RLC SDU segment to an upper protocol layer of the second wireless device if the at least one RLC SDU segment includes a SDAP header, a PDCP header, a ROHC header, and a first data field, where reconstructing the at least one of the plurality of data fields occurs at the upper protocol layer

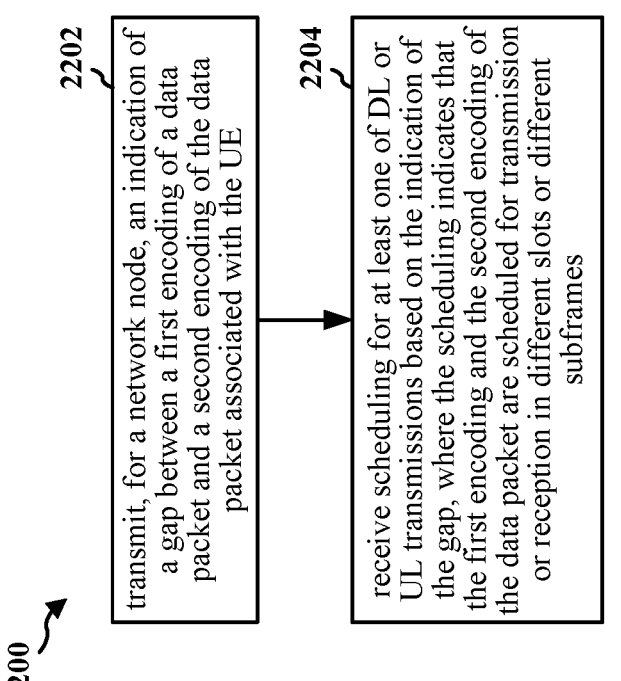

2200

2202 transmit, for a network node, an indication of a gap between a first encoding of a data packet and a second encoding of the data packet associated with the UE

2204 receive scheduling for at least one of DL or UL transmissions based on the indication of the gap, where the scheduling indicates that the first encoding and the second encoding of the data packet are scheduled for transmission or reception in different slots or different subframes

FIG. 22

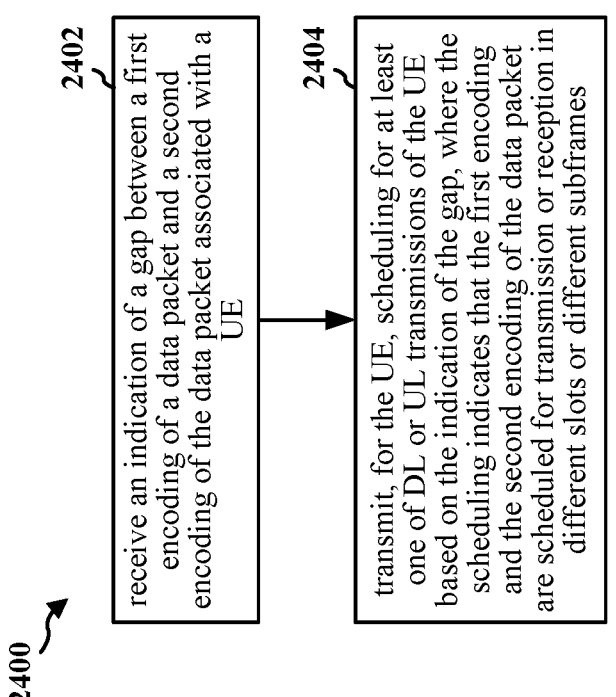

2400

2402 receive an indication of a gap between a first encoding of a data packet and a second encoding of the data packet associated with a UE

2404 transmit, for the UE, scheduling for at least one of DL or UL transmissions of the UE based on the indication of the gap, where the scheduling indicates that the first encoding and the second encoding of the data packet are scheduled for transmission or reception in different slots or different subframes

FIG. 24

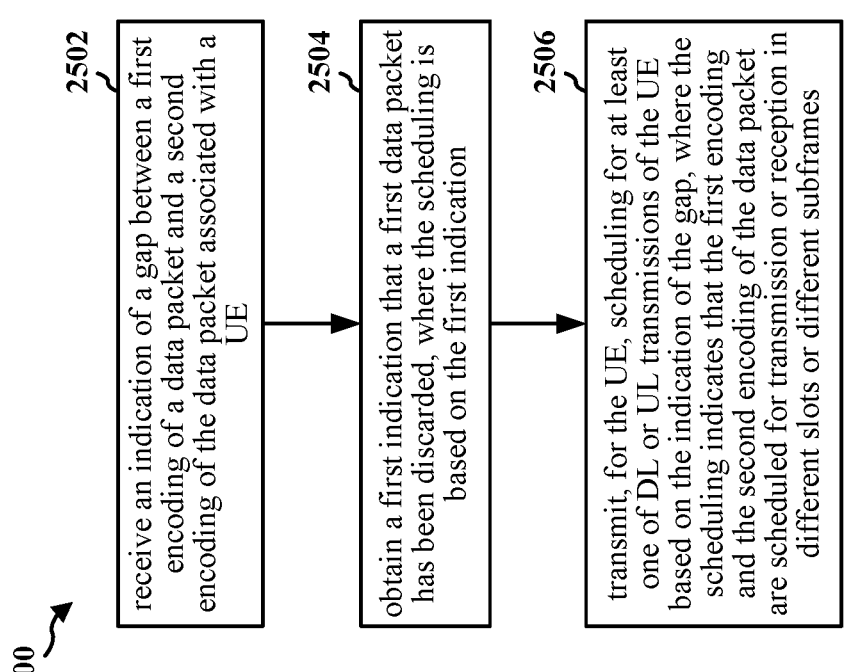

2500

2502 receive an indication of a gap between a first encoding of a data packet and a second encoding of the data packet associated with a UE

2504 obtain a first indication that a first data packet has been discarded, where the scheduling is based on the first indication

2506 transmit, for the UE, scheduling for at least one of DL or UL transmissions of the UE based on the indication of the gap, where the scheduling indicates that the first encoding and the second encoding of the data packet are scheduled for transmission or reception in different slots or different subframes

FIG. 25

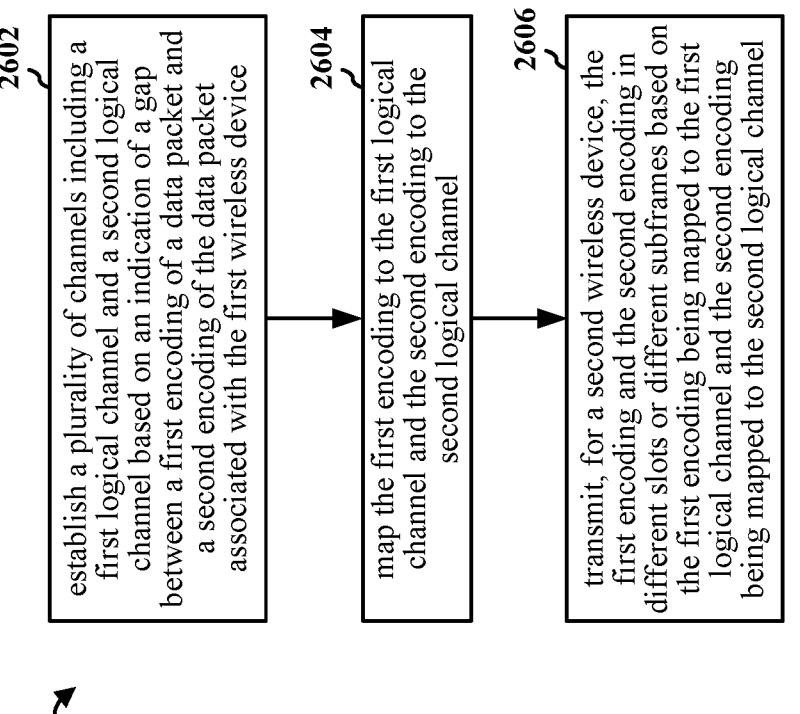

2602 establish a plurality of channels including a first logical channel and a second logical channel based on an indication of a gap between a first encoding of a data packet and a second encoding of the data packet associated with the first wireless device

2604 map the first encoding to the first logical channel and the second encoding to the second logical channel

2606 transmit, for a second wireless device, the first encoding and the second encoding in different slots or different subframes based on the first encoding being mapped to the first logical channel and the second encoding being mapped to the second logical channel

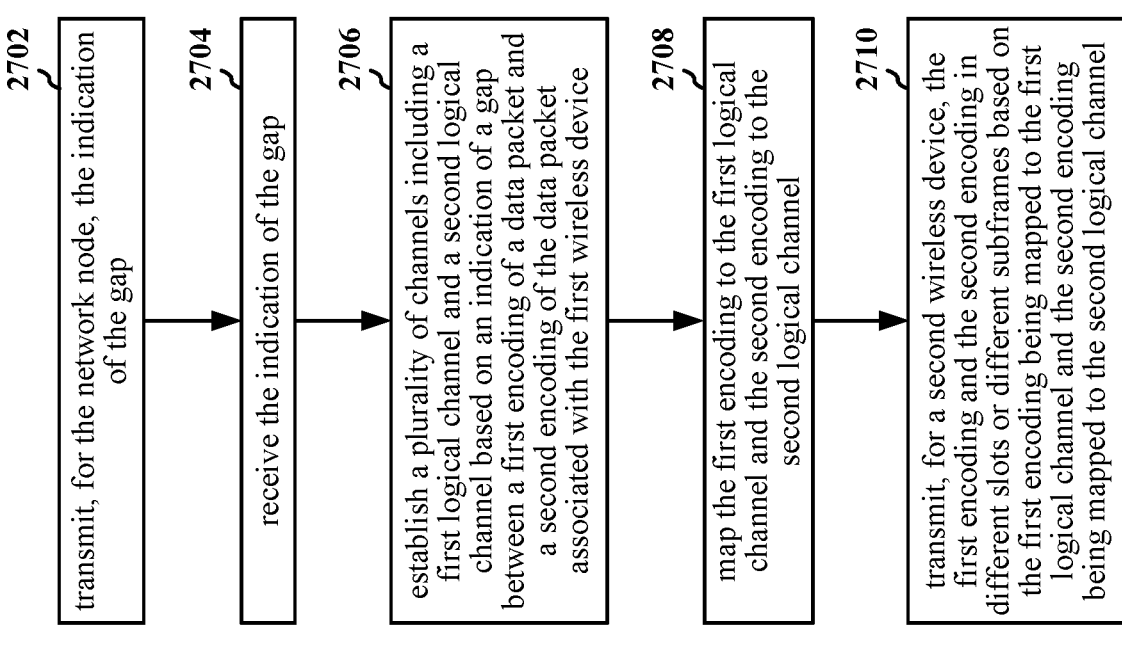

2702 transmit, for the network node, the indication of the gap

2704 receive the indication of the gap

2706 establish a plurality of channels including a first logical channel and a second logical channel based on an indication of a gap between a first encoding of a data packet and a second encoding of the data packet associated with the first wireless device

2708 map the first encoding to the first logical channel and the second encoding to the second logical channel

2710 transmit, for a second wireless device, the first encoding and the second encoding in different slots or different subframes based on the first encoding being mapped to the first logical channel and the second encoding being mapped to the second logical channel

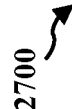

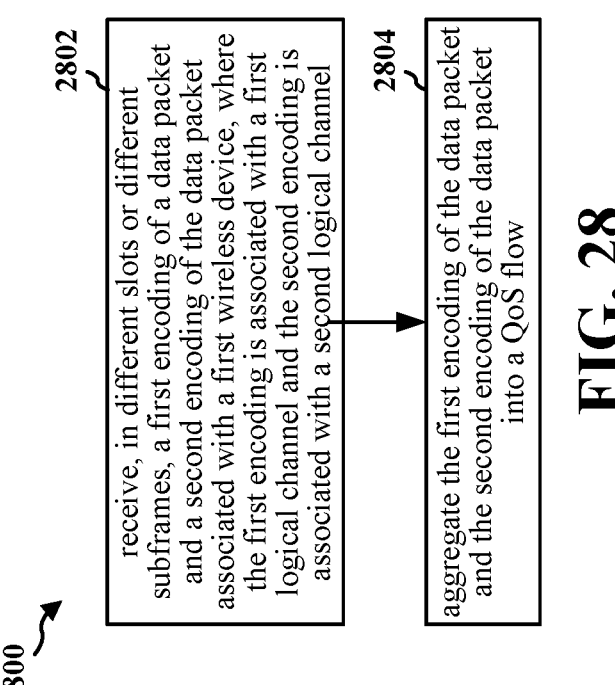

2800

2802 receive, in different slots or different subframes, a first encoding of a data packet and a second encoding of the data packet associated with a first wireless device, where the first encoding is associated with a first logical channel and the second encoding is associated with a second logical channel

2804 aggregate the first encoding of the data packet and the second encoding of the data packet into a QoS flow

FIG. 28

RADIO ACCESS NETWORK ENHANCEMENTS FOR MULTIPLE DESCRIPTION CODING

TECHNICAL FIELD

The present disclosure relates generally to communication systems, and more particularly, to transmitting and/or receiving encoded data.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a first wireless device are provided. The apparatus includes a memory and at least one processor coupled to the memory and, based at least in part on information stored in the memory, the at least one processor is configured to: monitor at least one radio bearer for radio link control (RLC) segmentation information corresponding to a set of service data units (SDUs) associated with the first wireless device; and transmit, for a second wireless device, at least one RLC SDU that includes a number of encodings based on the RLC segmentation information corresponding to the set of SDUs In an aspect of the disclosure, a method, a computer-readable medium, and an apparatus for wireless communication at a second wireless device are provided. The apparatus includes a memory and at least one processor coupled to the memory and, based at least in part on information stored in the memory, the at least one processor is configured to: obtain at least one radio link control (RLC) service data unit (SDU) segment belonging to a set of RLC SDU segments associated with a first wireless device; and deliver the at least one RLC SDU segment to an upper layer, upon an occurrence of a condition and without obtaining an entirety of the set of RLC SDU segments.

In an aspect of the disclosure, a method, a computer-readable medium, and an apparatus for wireless communication at a user equipment (UE) are provided. The apparatus includes a memory and at least one processor coupled to the memory and, based at least in part on information stored in the memory, the at least one processor is configured to: transmit, for a network node, an indication of a gap between a first encoding of a data packet and a second encoding of the data packet associated with the UE; and receive scheduling for at least one of downlink (DL) or uplink (UL) transmissions based on the indication of the gap, where the scheduling indicates that the first encoding and the second encoding of the data packet are scheduled for transmission or reception in different slots or different subframes.

In an aspect of the disclosure, a method, a computer-readable medium, and an apparatus for wireless communication at a first wireless device are provided. The apparatus includes a memory and at least one processor coupled to the memory and, based at least in part on information stored in the memory, the at least one processor is configured to: establish a plurality of channels including a first logical channel and a second logical channel based on an indication of a gap between a first encoding of a data packet and a second encoding of the data packet associated with the first wireless device; map the first encoding to the first logical channel and the second encoding to the second logical channel; and transmit, for a second wireless device, the first encoding and the second encoding in different slots or different subframes based on the first encoding being mapped to the first logical channel and the second encoding being mapped to the second logical channel.

In an aspect of the disclosure, a method, a computer-readable medium, and an apparatus for wireless communication at a network node are provided. The apparatus includes a memory and at least one processor coupled to the memory and, based at least in part on information stored in the memory, the at least one processor is configured to: receive an indication of a gap between a first encoding of a data packet and a second encoding of the data packet associated with a user equipment (UE); and transmit, for the UE, scheduling for at least one of downlink (DL) or uplink (UL) transmissions of the UE based on the indication of the gap, where the scheduling indicates that the first encoding and the second encoding of the data packet are scheduled for transmission or reception in different slots or different subframes.

In an aspect of the disclosure, a method, a computer-readable medium, and an apparatus for wireless communication at a second wireless device are provided. The apparatus includes a memory and at least one processor coupled to the memory and, based at least in part on information stored in the memory, the at least one processor is configured to: receive, in different slots or different subframes, a first encoding of a data packet and a second encoding of the data packet associated with a first wireless device, where the first encoding is associated with a first logical channel and the second encoding is associated with a second logical channel; and aggregate the first encoding of the data packet and the second encoding of the data packet into a quality of service (QoS) flow.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a diagram illustrating an example of a RLC PDU.

FIG. 9 is a diagram illustrating examples of data transmission with and without delay packing.

FIG. 13 is a diagram illustrating an example of a RLC control PDU.

FIG. 21 is a flowchart of a method of wireless communication.

FIG. 22 is a flowchart of a method of wireless communication.

FIG. 24 is a flowchart of a method of wireless communication.

FIG. 25 is a flowchart of a method of wireless communication.

FIG. 26 is a flowchart of a method of wireless communication.

FIG. 27 is a flowchart of a method of wireless communication.

FIG. 28 is a flowchart of a method of wireless communication.

DETAILED DESCRIPTION

Figure 1:
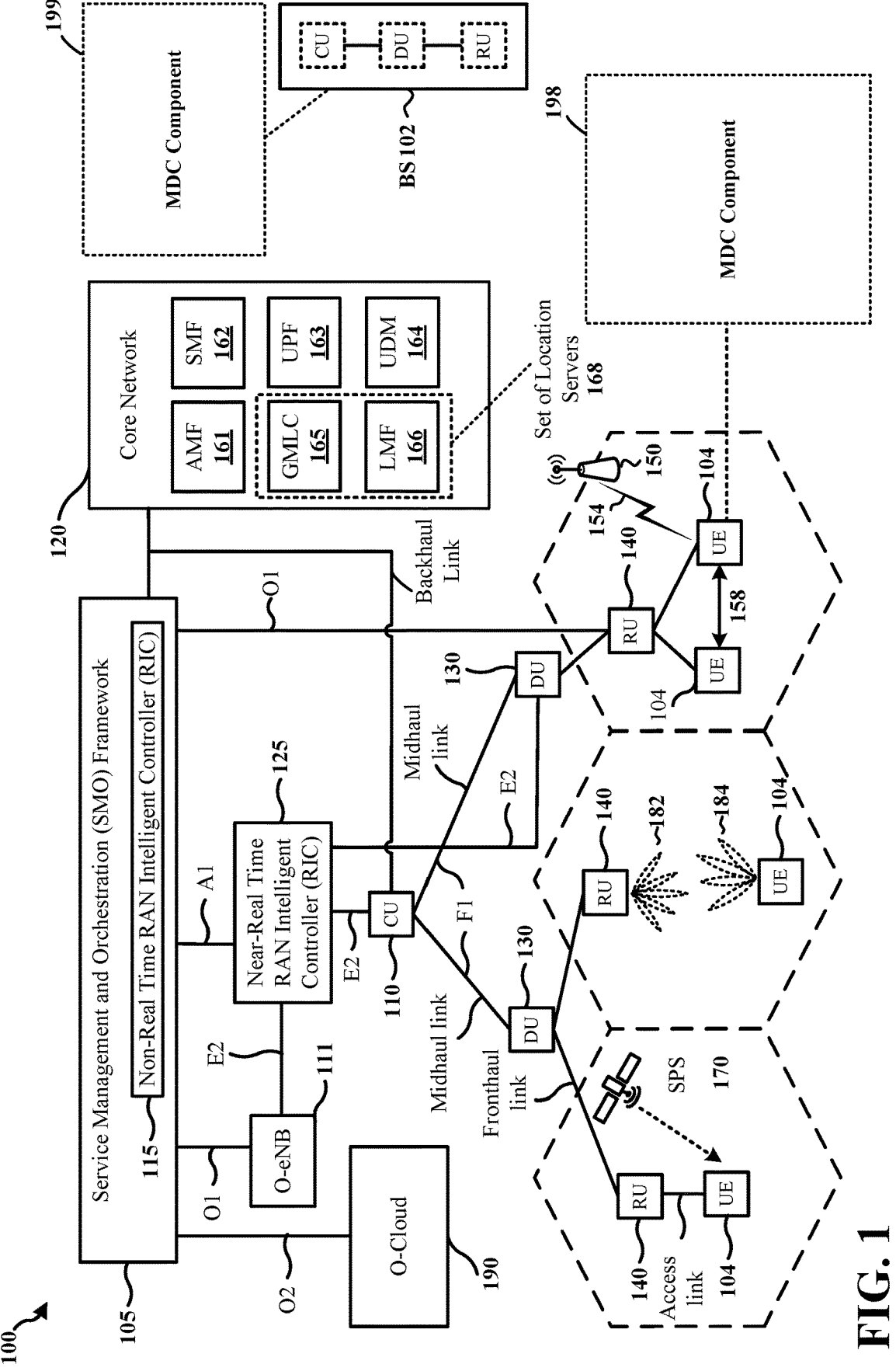
FIG. 1 is a diagram illustrating an example of a wireless communications system and an access network.

A first wireless device may transmit data for a second wireless device. The data may include a first (i.e., primary) encoding (e.g., a first MDC encoding) and a second (i.e., secondary) encoding (e.g., a second MDC encoding) of content (e.g., speech data). Depending on various factors, the second wireless device may receive the first encoding, the second encoding, or both the first encoding and the second encoding. The first encoding and the second encoding of the data may be decoded by the second wireless device independently (e.g., in cases where the second wireless device does not receive one of the first encoding or the second encoding) to achieve increased communications reliability for the content or the first encoding and the second encoding may be decoded jointly (e.g., in cases where the second wireless device receives both the first encoding and the second encoding) to achieve higher quality for the content. However, some wireless communication systems may not be able to take advantage of the independent decoding described above, as some wireless communication systems may discard the first encoding if the second encoding is not received, or vice versa. Various technologies pertaining to radio access network (RAN) enhancements for MDC are described herein. In one aspect, the technologies described herein may avoid RLC SDU segmentation and/or may help to ensure that a Rx RLC receiver delivers received data before RLC SDU reassembly. In another aspect, the technologies described herein may provide for a UE or a base station (e.g., a gNB, a eNB, or other type of base station) that applies a scheduling restriction such that a primary encoding and a secondary encoding are scheduled for transmission or reception in different slots or different subframes. In one approach, the base station may adjust a transport block size (TBS) such that the primary encoding and the secondary encoding are scheduled in different slots or different subframes. In another approach, the UE and/or the base station may restrict mapping of data to a transport block such that the primary encoding and the secondary encoding are scheduled in different slots or different subframes. In one example, a first wireless device monitors at least one radio bearer for RLC segmentation information corresponding to a set of SDUs associated with the first wireless device. The first wireless device transmits, for a second wireless device, at least one RLC SDU that includes a number of encodings based on the RLC segmentation information corresponding to the set of SDUs. By monitoring for the RLC segmentation information, the first wireless device may help to avoid RLC segmentation in order to realize benefits associated with MDC.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system, sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a MDC component 198 that is configured to monitor at least one radio bearer for RLC segmentation information corresponding to a set of SDUs associated with the first wireless device; and transmit, for a second wireless device, at least one RLC SDU that includes a number of encodings based on the RLC segmentation information corresponding to the set of SDUs. In certain aspects, the MDC component 198 is configured to obtain at least one RLC SDU segment belonging to a set of RLC SDU segments associated with a first wireless device; and deliver the at least one RLC SDU segment to an upper layer, upon an occurrence of a condition and without obtain an entirety of the set of RLC SDU segments. In certain aspects, the MDC component 198 is configured to transmit, for a network node, an indication of a gap between a first encoding of a data packet and a second encoding of the data packet associated with the UE; and receive scheduling for at least one of DL or UL transmissions based on the indication of the gap, where the scheduling indicates that the first encoding and the second encoding of the data packet are scheduled for transmission or reception in different slots or different subframes. In certain aspects, the MDC component 198 is configured to establish a plurality of channels including a first logical channel and a second logical channel based on an indication of a gap between a first encoding of a data packet and a second encoding of the data packet associated with the first wireless device; map the first encoding to the first logical channel and the second encoding to the second logical channel; and transmit, for a second wireless device, the first encoding and the second encoding in different slots or different subframes based on the first encoding being mapped to the first logical channel and the second encoding being mapped to the second logical channel. In certain aspects, the MDC component 198 is configured to receive, in different slots or different subframes, a first encoding of a data packet and a second encoding of the data packet associated with a first wireless device, where the first encoding is associated with a first logical channel and the second encoding is associated with a second logical channel; and aggregate the first encoding of the data packet and the second encoding of the data packet into a QoS flow. In certain aspects, the base station 102 may include a MDC component 199 that is configured to monitor at least one radio bearer for RLC segmentation information corresponding to a set of SDUs associated with the first wireless device; and transmit, for a second wireless device, at least one RLC SDU that includes a number of encodings based on the RLC segmentation information corresponding to the set of SDUs. In certain aspects, the MDC component 199 is configured to obtain at least one RLC SDU segment belonging to a set of RLC SDU segments associated with a first wireless device; and deliver the at least one RLC SDU segment to an upper layer, upon an occurrence of a condition and without obtain an entirety of the set of RLC SDU segments. In certain aspects, the MDC component 199 is configured to establish a plurality of channels including a first logical channel and a second logical channel based on an indication of a gap between a first encoding of a data packet and a second encoding of the data packet associated with the first wireless device; map the first encoding to the first logical channel and the second encoding to the second logical channel; and transmit, for a second wireless device, the first encoding and the second encoding in different slots or different subframes based on the first encoding being mapped to the first logical channel and the second encoding being mapped to the second logical channel. In certain aspects, the MDC component 199 is configured to receive an indication of a gap between a first encoding of a data packet and a second encoding of the data packet associated with a UE; and transmit, for the UE, scheduling for at least one of DL or UL transmissions of the UE based on the indication of the gap, where the scheduling indicates that the first encoding and the second encoding of the data packet are scheduled for transmission or reception in different slots or different subframes. In certain aspects, the MDC component 199 is configured to receive, in different slots or different subframes, a first encoding of a data packet and a second encoding of the data packet associated with a first wireless device, where the first encoding is associated with a first logical channel and the second encoding is associated with a second logical channel; and aggregate the first encoding of the data packet and the second encoding of the data packet into a QoS flow. Although the following description may be focused on 5G NR, the concepts described herein may be applicable to other similar areas, such as LTE, LTE-A, CDMA, GSM, and other wireless technologies. Furthermore, although the described herein may be focused on MDC encodings, the concepts described herein may be applicable to other types of encodings. Additionally, although the following description may be focused on RLC layer segmentation, the concepts described herein may be applicable to segmentation at other layers, such as MAC layer segmentation and/or PDCP layer segmentation.

Figure 2:
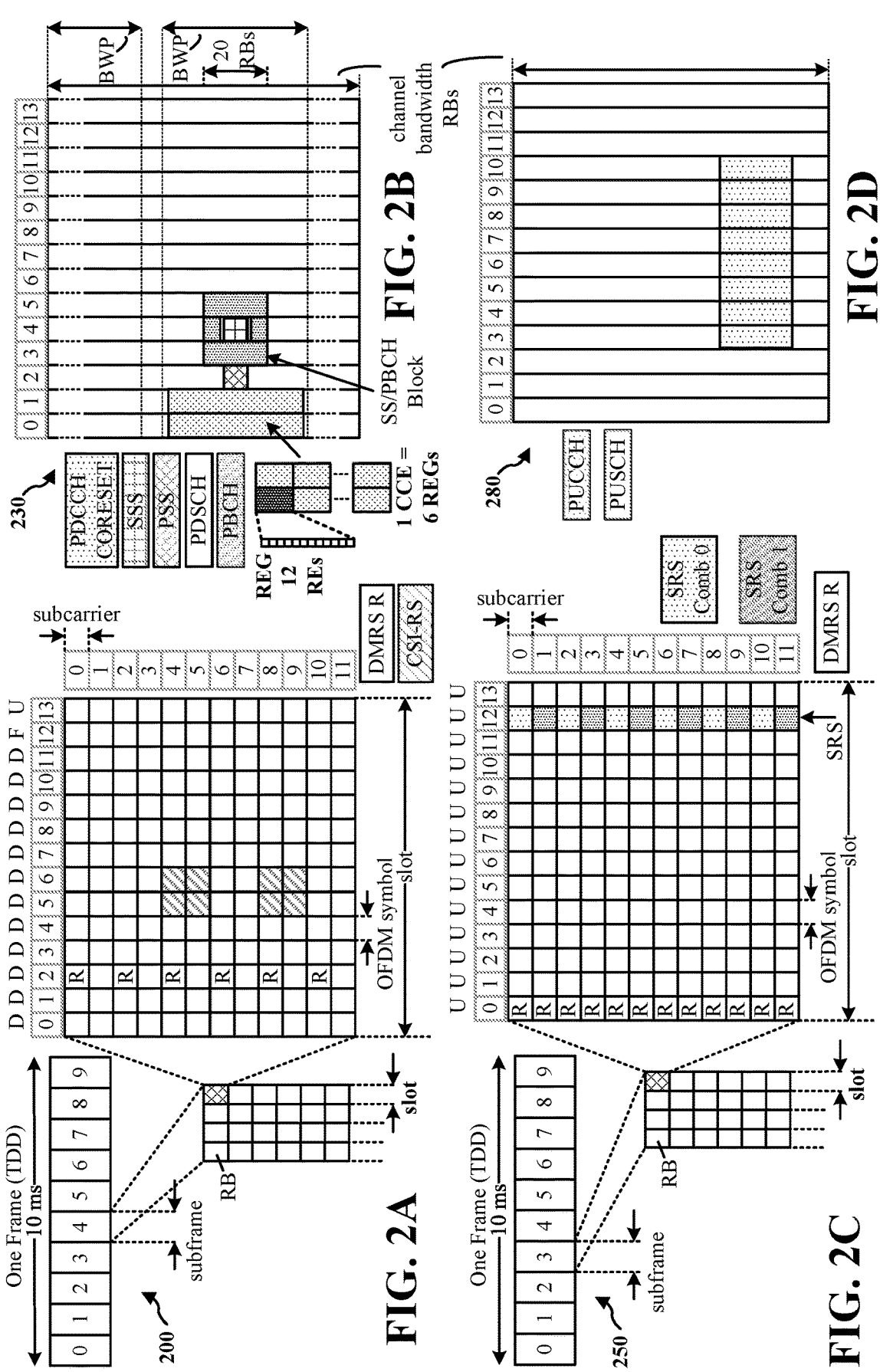
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS<br>$\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
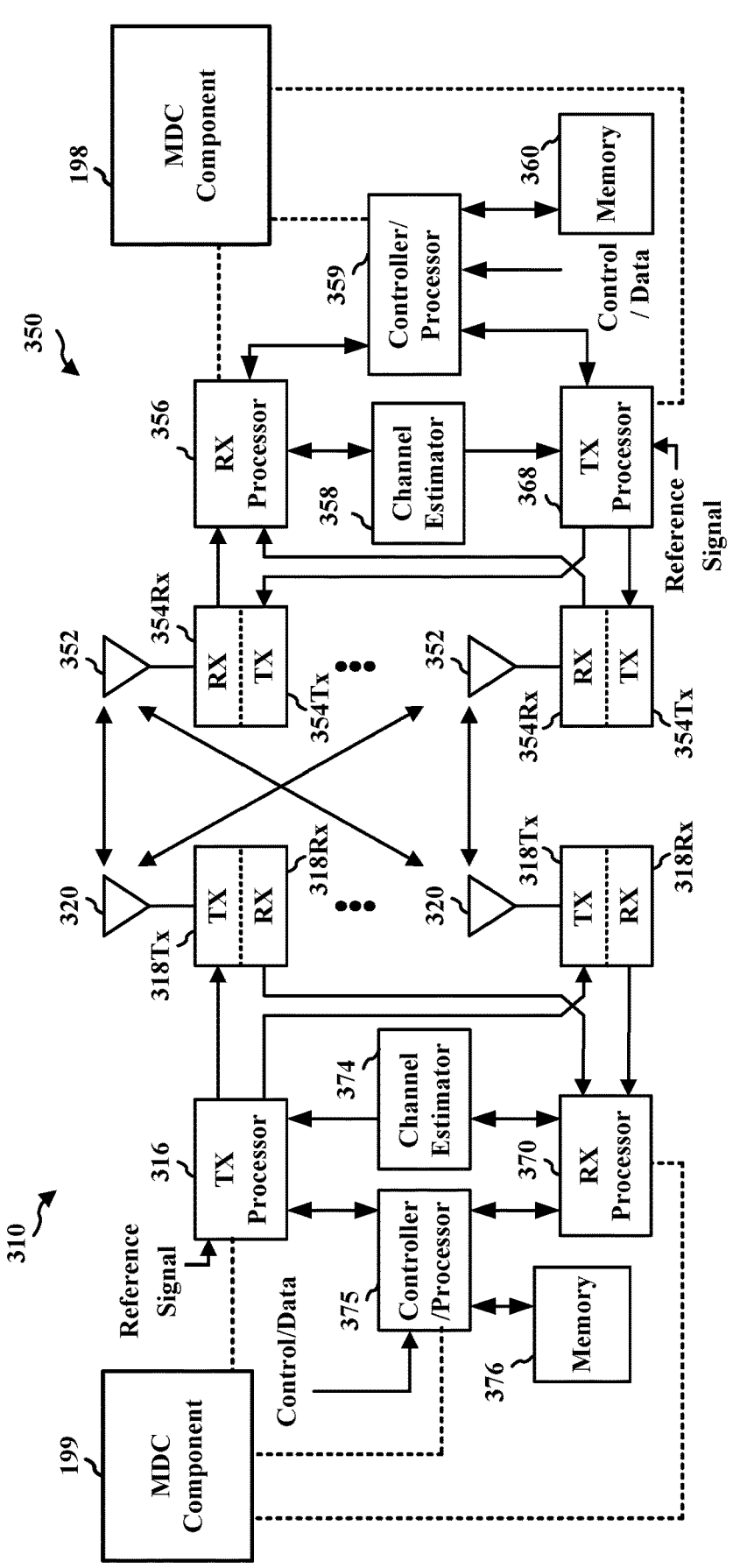
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MDC component 198 of FIG. 1.

At least one of the TX processor 316, the RX processor 370, and the controller/processor 375 may be configured to perform aspects in connection with the MDC component 199 of FIG. 1.

Figure 4:
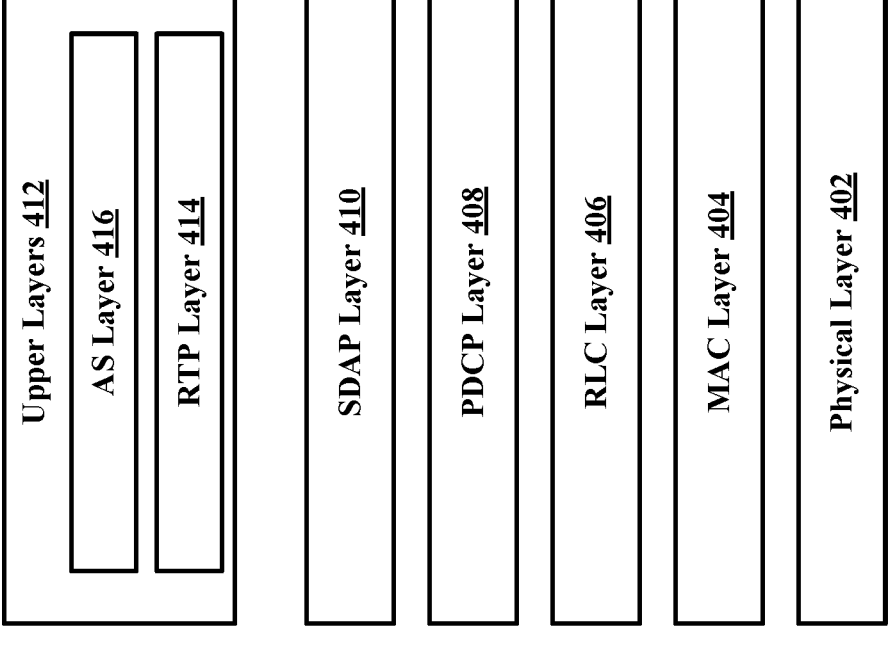
FIG. 4 is a diagram illustrating an example of layers associated with wireless communications.

FIG. 4 is a diagram 400 illustrating an example of layers associated with wireless communications. The diagram 400 depicts a physical layer 402 (which may also be referred to as layer 1 (L1)), a MAC layer 404, a RLC layer 406, a PDCP layer 408, and a SDAP layer 410. The diagram 400 also depicts upper layers 412 which may include a real-time transport protocol (RTP) layer 414 and an application (AS) layer 416.

The physical layer 402 may be associated with coding/decoding, modulation/demodulation, multiantenna mapping, and other physical layer functions. The physical layer 402 may offer services to the MAC layer 404 via transport channels. The MAC layer 404 may be associated with multiplexing of logical channels, hybrid-ARQ retransmissions, and scheduling related functions. The MAC layer 404 may provide services to the RLC layer 406 via logical channels. The RLC layer 406 may be associated with segmentation and retransmission handling. The RLC layer 406 may provide services to the PDCP layer 408 in the form of RLC channels. There may be one RLC entity per RLC channel (and per radio bearer) configured for a UE/base station. The PDCP layer 408 may be associated with IP header compression, ciphering, and integrity protection. The PDCP layer 408 may also be associated with retransmissions, in-sequence delivery, and duplicate removal in case of a handover (e.g., a cell switch). For DC configurations with split radio bearers, the PDCP layer 408 may provide for routing and duplication. The SDAP layer 410 may be associated with mapping QoS bearers to radio bearers according to quality-of-service characteristics.

The RTP layer 414 may be associated with delivering audio and/or video over IP networks. The RTP layer 414 may be configured to support many multimedia formats. The AS layer 416 may communicate with host-based and/or user-facing applications.

Figure 5:
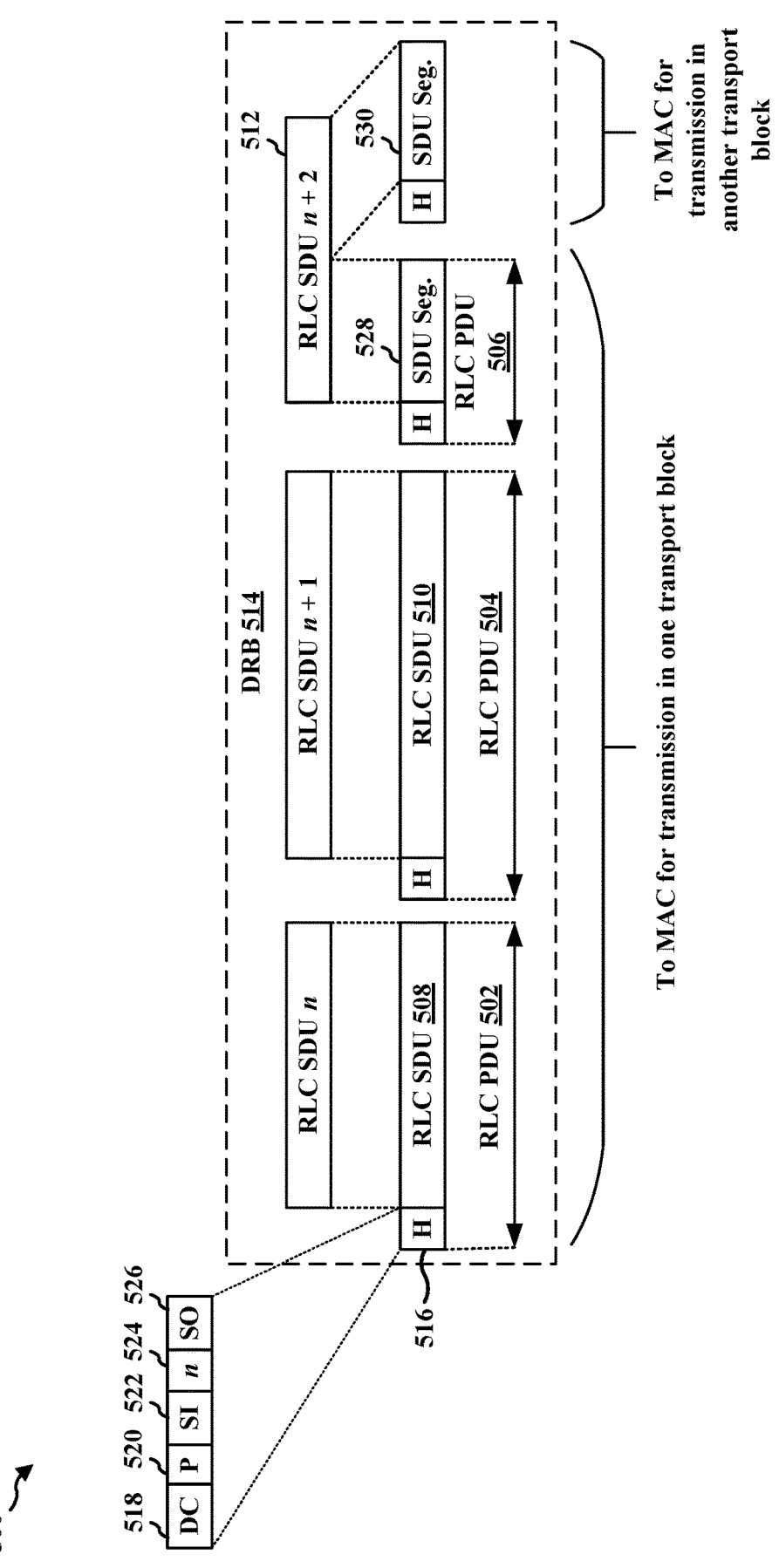
FIG. 5 is a diagram illustrating an example of generating radio link control (RLC) protocol data units (PDUs) from RLC service data units (SDUs).

FIG. 5 is a diagram 500 that depicts an example of generating RLC PDUs 502, 504, 506 from RLC SDUs 508, 510, 512. A RLC entity may generate the RLC PDUs 502-506 from the RLC SDUs 508-512. A SDU may refer to a payload within a PDU. In an example, the RLC entity may be a RLC receiver. In another example, the RLC entity may be a RLC transmitter. As illustrated in the diagram 500, the RLC entity may operate in an acknowledged mode (AM) which may support segmentation, duplicate removal, and retransmission of erroneous data. The RLC entity may also operate in a unacknowledged mode (UM) which may support segmentation, but not retransmission. The RLC PDUs 502-506 may be associated with a data radio bearer (DRB) 514. The DRB 514 may be an AM DRB. The DRB 514 may be a logical transport "pipe" which carries PDUs from a core network and across a RAN to a UE.

The RLC entity may attach a header 516 (illustrated as "H" in the diagram 500) to the RLC SDUs 508-512 (or segments thereof) to generate the RLC PDUs 502-506. A combination of a header and a RLC SDU may be referred to as a RLC PDU. The header 516 may include a data control indicator 518 (illustrated as "DC" in the diagram 500) that may indicate whether an associated RLC PDU contains data to/from a logical channel or control information for RLC operation. The header 516 may include a poll bit 520 (illustrated as "P" in the diagram 500) that may be used to request a status report. The header 516 may include a segmentation information field 522 (illustrated as "SI" in the diagram 500) that indicates whether an associated RLC PDU is a complete RLC SDU, a first segment of an RLC SDU, a last segment of an RLC SDU, or a segment between a first and last segment of the RLC SDU. The header 516 may include a RLC SDU sequence number 524 (illustrated in the diagram 500 as "n") of an SDU. If the header 516 is associated with a segmented RLC SDU, the header 516 may include a segmentation offset 526 (illustrated in the diagram 500 as "SO") that indicates which byte of the RLC SDU that the RLC SDU segment represents.

For non-segmented RLC SDUs (e.g., RLC SDU 508 and RLC SDU 510), the RLC entity may attach a header to an associated SDU to generate RLC PDUs (e.g., the RLC PDU 502 and the RLC PDU 504). A size of a last RLC PDU in a transport block may not match a size of a RLC SDU due to MAC multiplexing. As such, the RLC entity may segment an RLC SDU (e.g., the RLC SDU 512) into multiple segments (e.g., SDU segment 528 and SDU segment 530), where each of the multiple segments may include a corresponding header. In an example, the RLC entity may send the RLC PDUs 502-506 to a MAC layer for transport in a first transport block. In the example, the RLC entity may send a RLC PDU associated with the SDU segment 530 to the MAC layer for transport in a second transport block.

Figure 6A:
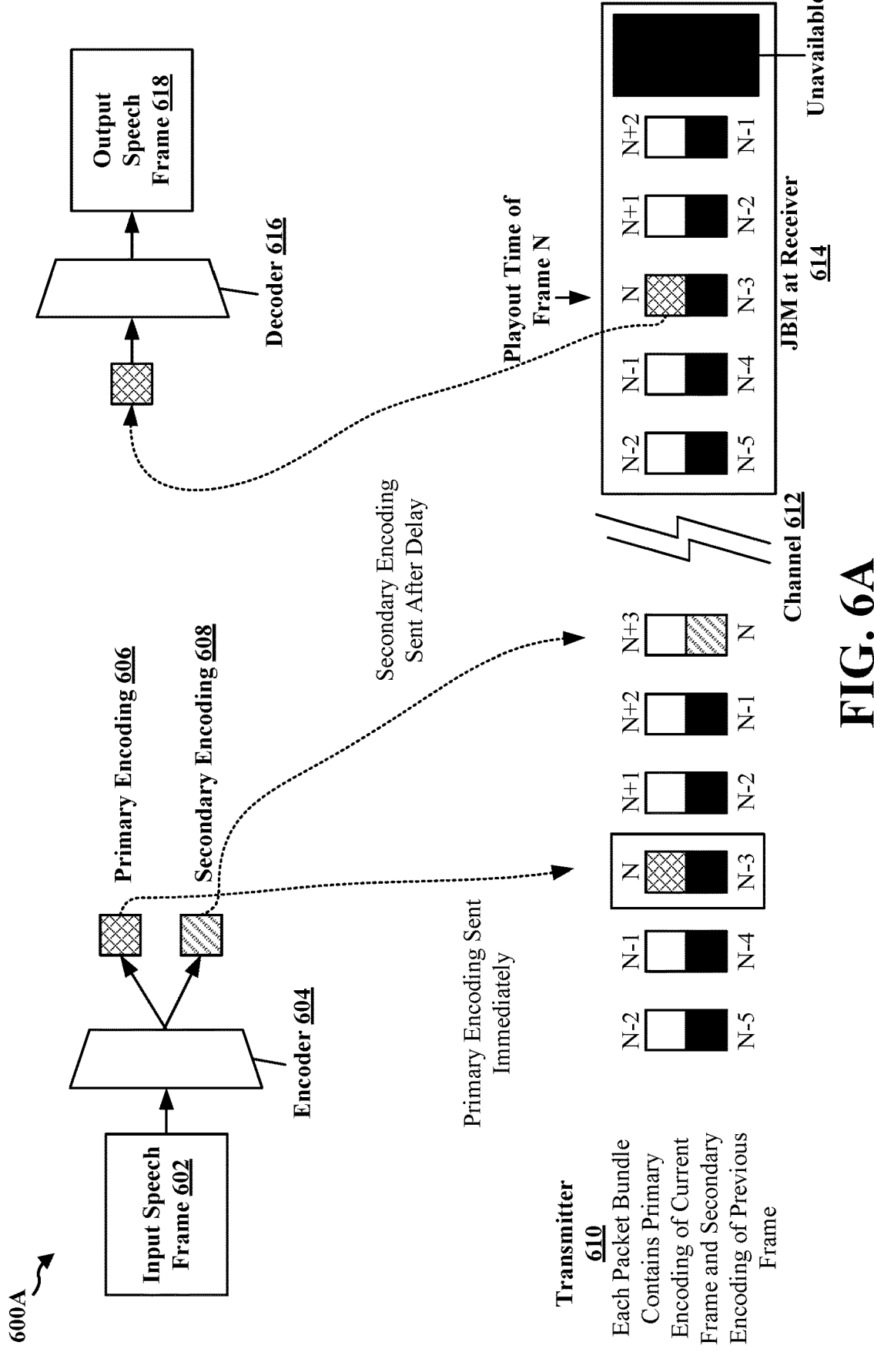
FIG. 6A is a diagram illustrating example aspects of multiple description coding (MDC).

FIG. 6A is a diagram 600A illustrating example aspects of multiple description coding (MDC). MDC may refer to a coding technique that fragments a single media stream into a plurality of substreams (e.g., two substreams) which may be referred to as descriptions. The media stream may be decoded using at least one of the descriptions; however, a quality of the decoded media stream may increase as a number of decoded descriptions increases. MDC may provide for increased fault tolerance and/or rate-adaptive streaming. For instance, MDC may improve error resiliency while maintaining clean channel quality.

As illustrated in the diagram 600A, an input speech frame 602 may be provided to an encoder 604 (e.g., a MDC encoder). In an example, the encoder 604 may be present in a device such as a UE or a base station. In an example the encoder 604 may be a feedback recurrent auto encoder (FRAE) encoder. The encoder 604 may produce a primary encoding 606 and a secondary encoding 608 based on input speech frame 602. The primary encoding 606 may be referred to as a first encoding and the secondary encoding 608 may be referred to as a second encoding. The primary encoding 606 may be a first MDC encoding and the secondary encoding 608 may be a second MDC encoding. The primary encoding 606 and/or the secondary encoding 608 may be decoded jointly (for increased quality) or separately (for increased fault tolerance).

The primary encoding 606 and the secondary encoding 608 may be provided to a transmitter 610. The primary encoding 606 (e.g., a copy of the primary encoding 606) may be sent immediately and the secondary encoding 608 (e.g., a copy of the secondary encoding 608) may be sent after a short delay. For instance, the transmitter 610 may generate packet bundles (e.g., IP packets), where each packet bundle may include a primary encoding (e.g., the primary encoding 606) of a current frame (e.g., a current speech frame) and a secondary encoding (e.g., the secondary encoding 608) of a previous frame (e.g., a previous speech frame). In an example, the primary encoding 606 may be transmitted in a first packet bundle at time N and the secondary encoding 608 may be transmitted in a second packet bundle at time N+3, where N is a positive number.

The transmitter 610 may transmit the packet bundles over a channel 612. In the example in the diagram 600A, a receiver 614 (e.g., a jitter buffer manager (JBM) at the receiver 614) may obtain the first packet bundle that includes the primary encoding 606; however, the receiver 614 may not receive the second packet bundle that includes the secondary encoding 608. For instance, the second packet bundle may be lost over the air (OTA) and hence the second packet bundle may be unavailable. In an example, the receiver 614 may be located at a different device than the transmitter 610. The receiver 614 may provide the primary encoding 606 to a decoder 616. In an example, the decoder 616 may be FRAE decoder. The decoder 616 may decode the primary encoding 606 to generate an output speech frame 618. For instance, as the primary encoding 606 arrived at the receiver 614, but the secondary encoding 608 has not arrived at the receiver 614, the primary encoding 606 may be decoded independently. In an example, the output speech frame 618 may be played over a speaker.

Figure 6B:
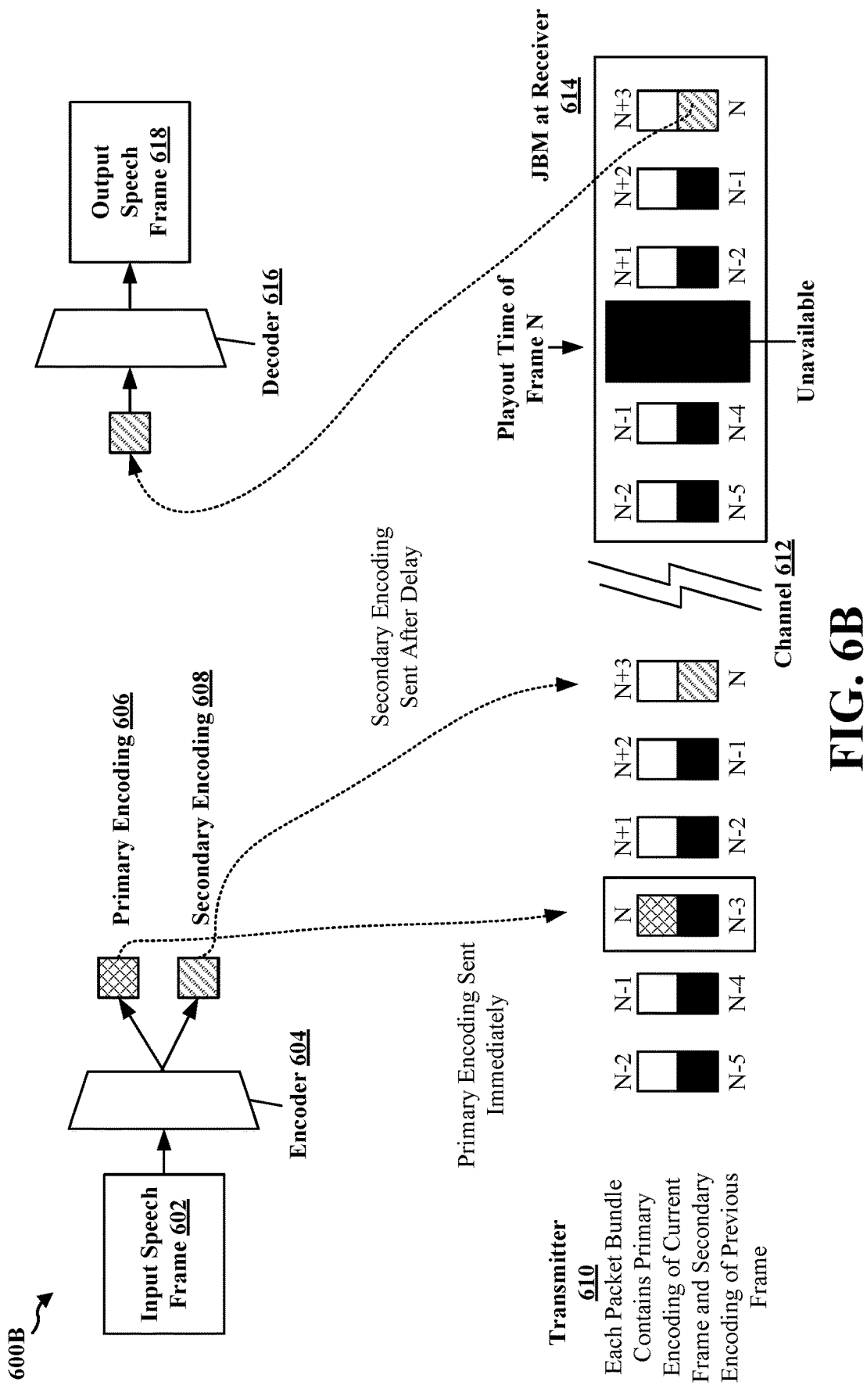
FIG. 6B is a diagram illustrating example aspects of MDC.

FIG. 6B is a diagram 600B illustrating example aspects of MDC. The diagram 600B is similar to the diagram 600A. However, in the example in the diagram 600B, the receiver 614 may obtain the second packet bundle that includes the secondary encoding; however, the receiver 614 may not receive the first packet bundle that includes the primary encoding 606. For instance, the first packet bundle may be lost OTA and hence the first packet bundle may be unavailable. The receiver 614 may provide the secondary encoding 608 to the decoder 616. The decoder 616 may decode the secondary encoding 608 to generate the output speech frame 618. For instance, as the secondary encoding 608 arrived at the receiver 614, but the primary encoding 606 has not arrived at the receiver 614, the secondary encoding 608 may be decoded independently. In an example, the output speech frame 618 may be played over a speaker.

Figure 6C:
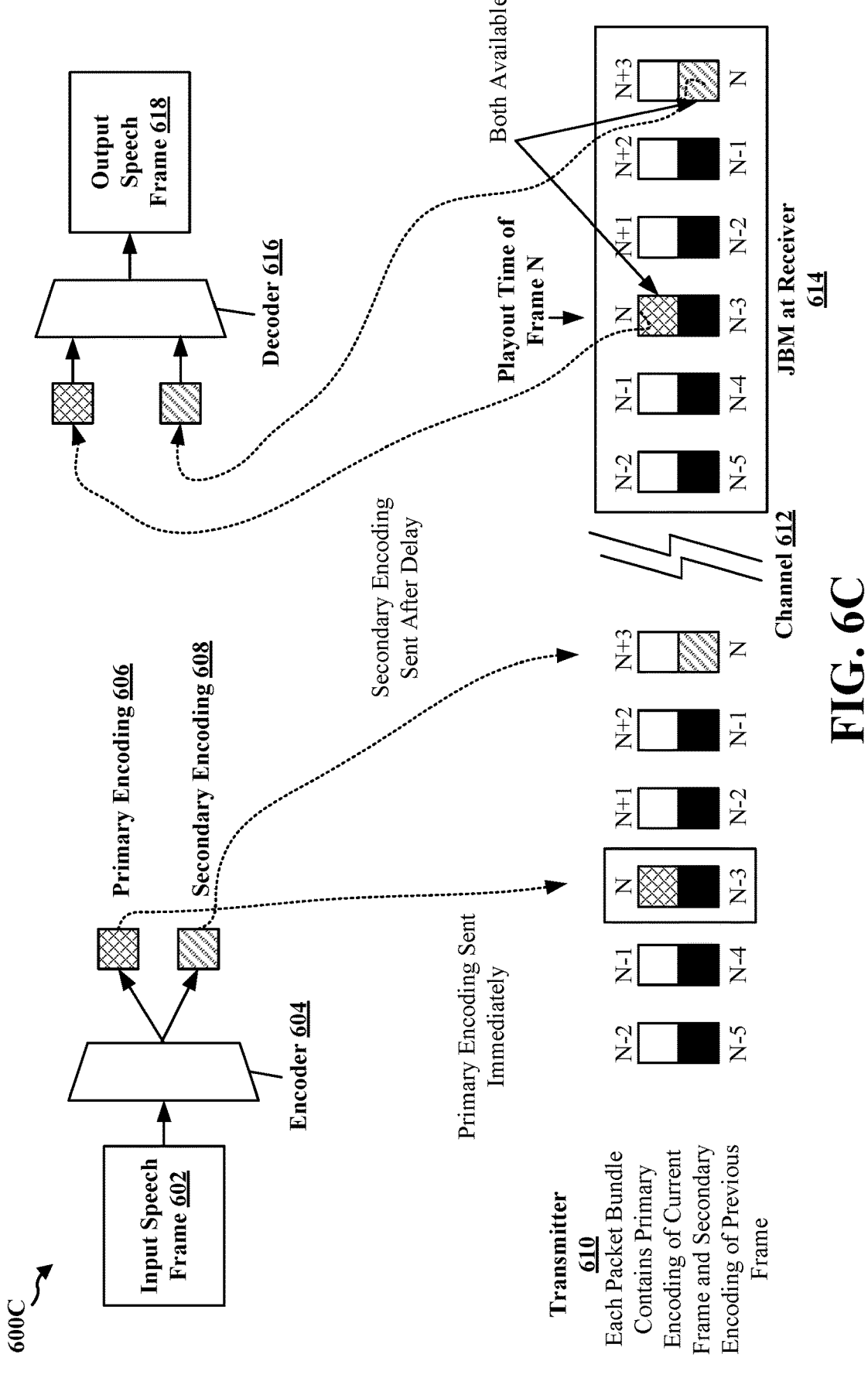
FIG. 6C is a diagram illustrating example aspects of MDC.

FIG. 6C is a diagram 600C illustrating example aspects of MDC. The diagram 600B is similar to the diagram 600A and the diagram 600B. However, in the example in the diagram 600C, the receiver 614 may obtain the first packet bundle that includes the primary encoding 606 and the second packet bundle that includes the secondary encoding 608. The receiver 614 may provide the primary encoding 606 and the secondary encoding 608 to the decoder 616. The decoder 616 may decode the primary encoding 606 and the secondary encoding 608 to generate the output speech frame 618. For instance, as both the primary encoding 606 and the secondary encoding 608 have arrived, the decoder 616 may jointly decode the primary encoding 606 and the secondary encoding 608 to generate the output speech frame 618, where the output speech frame 618 may have a relatively higher quality in comparison to the output speech frames associated with the diagram 600A and the diagram 600B.

FIG. 7 is a diagram 700 illustrating an example of a RLC PDU 702. NR RLC may support packet segmentation and reassembly to provide support for a flexible (i.e., variable) transport block size (TBS). As such, the RLC PDU 702 may facilitate the packet segmentation and reassembly. The RLC PDU 702 may be an unacknowledged mode (UM) mode data (UMD) PDU. The RLC PDU 702 may include a first octet, a second octet, a third octet, a fourth octet, and an Nth octet, where N is an integer that is greater than or equal to five. Each octet may include 8 bits (i.e., one byte). The RLC PDU 702 may include segmentation information (SI) 704 in the first octet.

The SI 704 may indicate whether or not a RLC SDU associated with the RLC PDU 702 is segmented. In an example, the SI 704 is two bits wide. The RLC PDU 702 may include a segmentation offset (SO) 706 that indicates a byte position of a segment within a RLC SDU. The SO 706 may be eight bits wide. The SO 706 may be included in the second octet and the third octet. The RLC PDU 702 may include a sequence number (SN) 708 that may identify which RLC SDU segments belong to which RLC SDU. The SN 708 may be six bits wide. The SN 708 may be included in the first octet. The RLC PDU 702 may include data 710 in at least the fourth octet (and optionally up to the Nth octet).

In one aspect, for each RLC SDU segment, a Tx side may include a SO field in a RLC header which may indicate a byte position of a segment within a RLC SDU. If each RLC SDU segment in a set of RLC SDU segments is received, a Rx side may reassemble the RLC SDU. However, in RLC UM, if each RLC SDU segment is not received (i.e., if the Rx side detects RLC SDU segments not being received in order), the Rx side may cease monitoring for each RLC SDU segment upon expiration of a t-reassembly timer and the Rx side may discard received RLC SDU segments.

Figure 8:
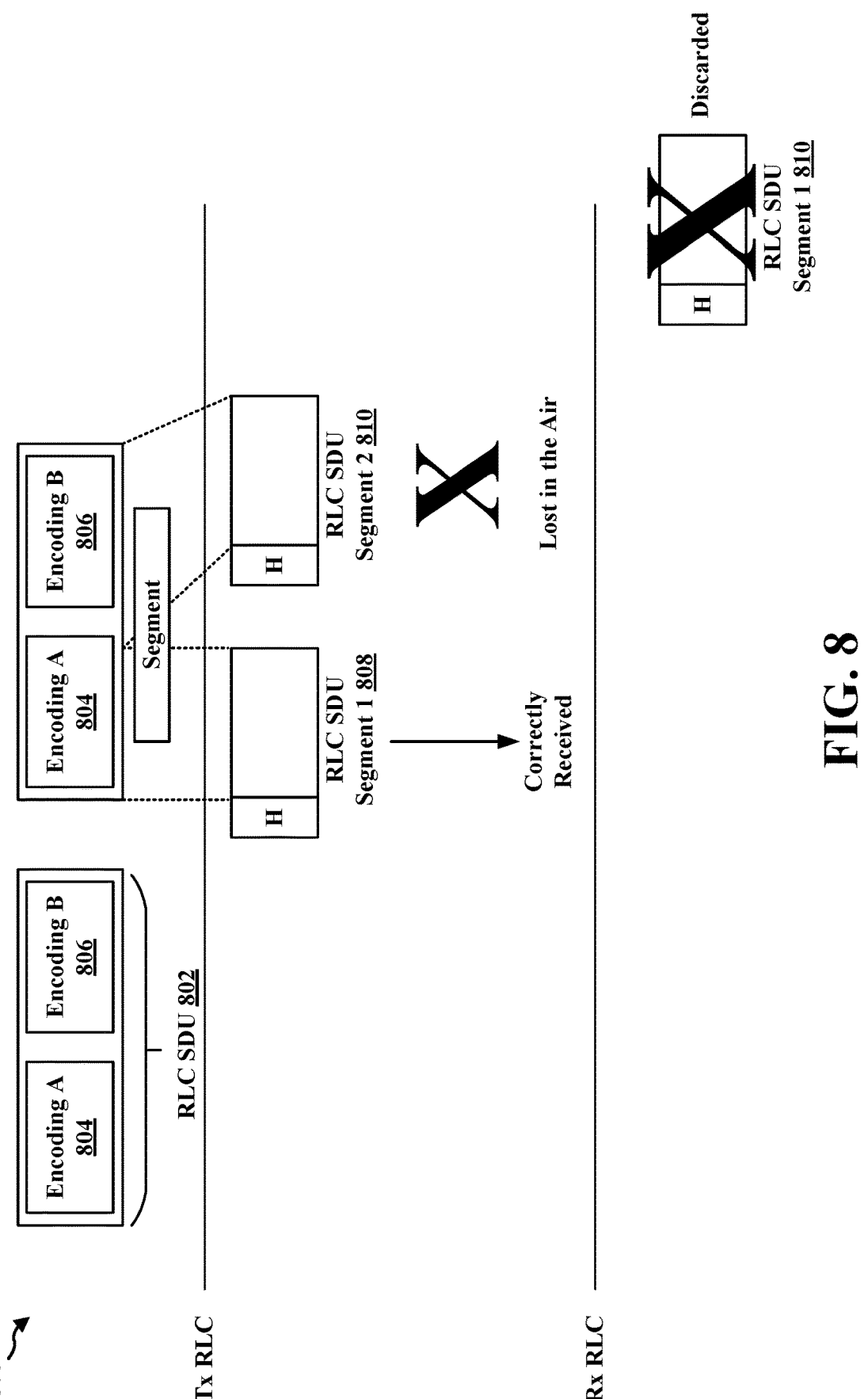
FIG. 8 is a diagram illustrating an example of RLC SDU segments being lost and discarded.

FIG. 8 is a diagram 800 illustrating an example of RLC SDU segments being lost and discarded. A transmitter (e.g., a Tx RLC) may obtain a RLC SDU 802. The RLC SDU 802 may include encoding A 804 (e.g., a first encoding, such as a primary MDC encoding) and encoding B 806 (e.g., a second encoding, such as a secondary MDC encoding). In an example, the transmitter may segment the RLC SDU 802 into a first RLC SDU segment 808 and a second RLC SDU segment 810. The first RLC SDU segment 808 may include a first header and encoding A 804 and the second RLC SDU segment 810 may include a second header and encoding B 806. The transmitter may transmit the first RLC SDU segment 808 and the second RLC SDU segment 810 for a receiver (e.g., a Rx RLC). In an example, the receiver may receive the first RLC SDU segment 808; however, the second RLC SDU segment 810 may be lost in the air. Due to RLC SDU discard behavior, the receiver may discard the first RLC SDU segment 808 based on the second RLC SDU segment 810 not being received. However, as noted above, the first RLC SDU segment 808 may still be useful from an upper layer perspective as the first RLC SDU segment 808 includes encoding A 804 which may be decoded independently by a decoder associated with the receiver.

Figure 9:
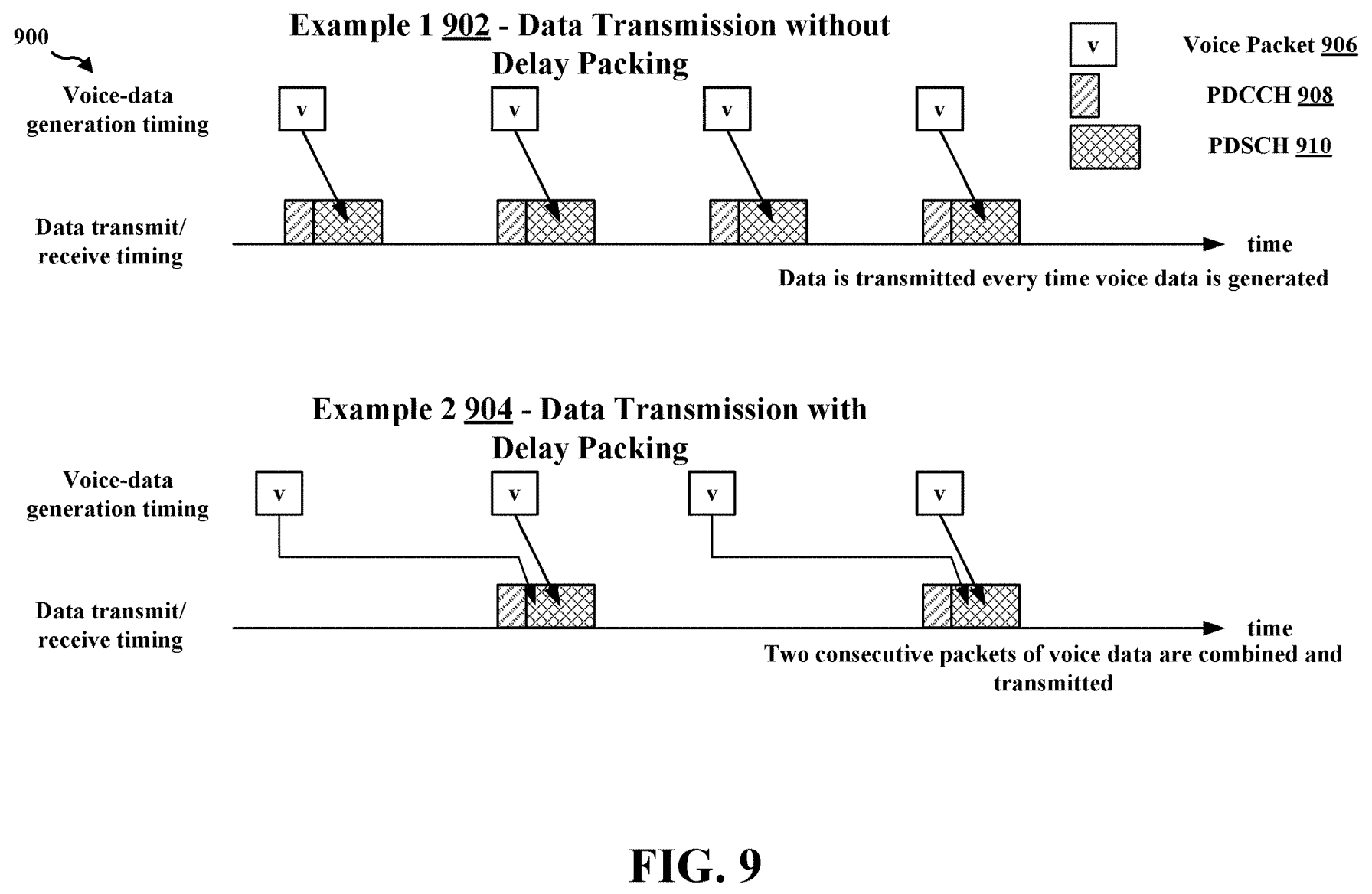

FIG. 9 is a diagram 900 illustrating examples of data transmission with and without delay packing. Delay packing may refer to a technique in which a voice packet is buffered and combined with a subsequent voice packet when the subsequent voice packet is generated. A MAC PDU may be generated to transmit the voice packet and the subsequent voice packet. Delay packing may reduce a number of times that voice data is transmitted or received and may reduce PDCCH resource usage.

The diagram 900 depicts a first example 902 of data transmission without delay packing and a second example 904 of data transmission with delay packing. In the first example 902, data may be transmitted each time voice data is generated. For instance, a voice packet 906 may be carried in a PDSCH transmission 910 (which may follow a PDCCH transmission 908). In the second example, two consecutive voice packets of voice data may be combined and transmitted in a PDSCH transmission 910 (which may follow a PDCCH transmission 908). Delay packing (e.g., as illustrated in the second example 904) may cause a first encoding (e.g., a first MDC encoding) and a second encoding (e.g., a second MDC encoding) to be scheduled in the same slot or the same subframe if a TBS is large enough to accommodate the first encoding and the second encoding.

Figure 10:
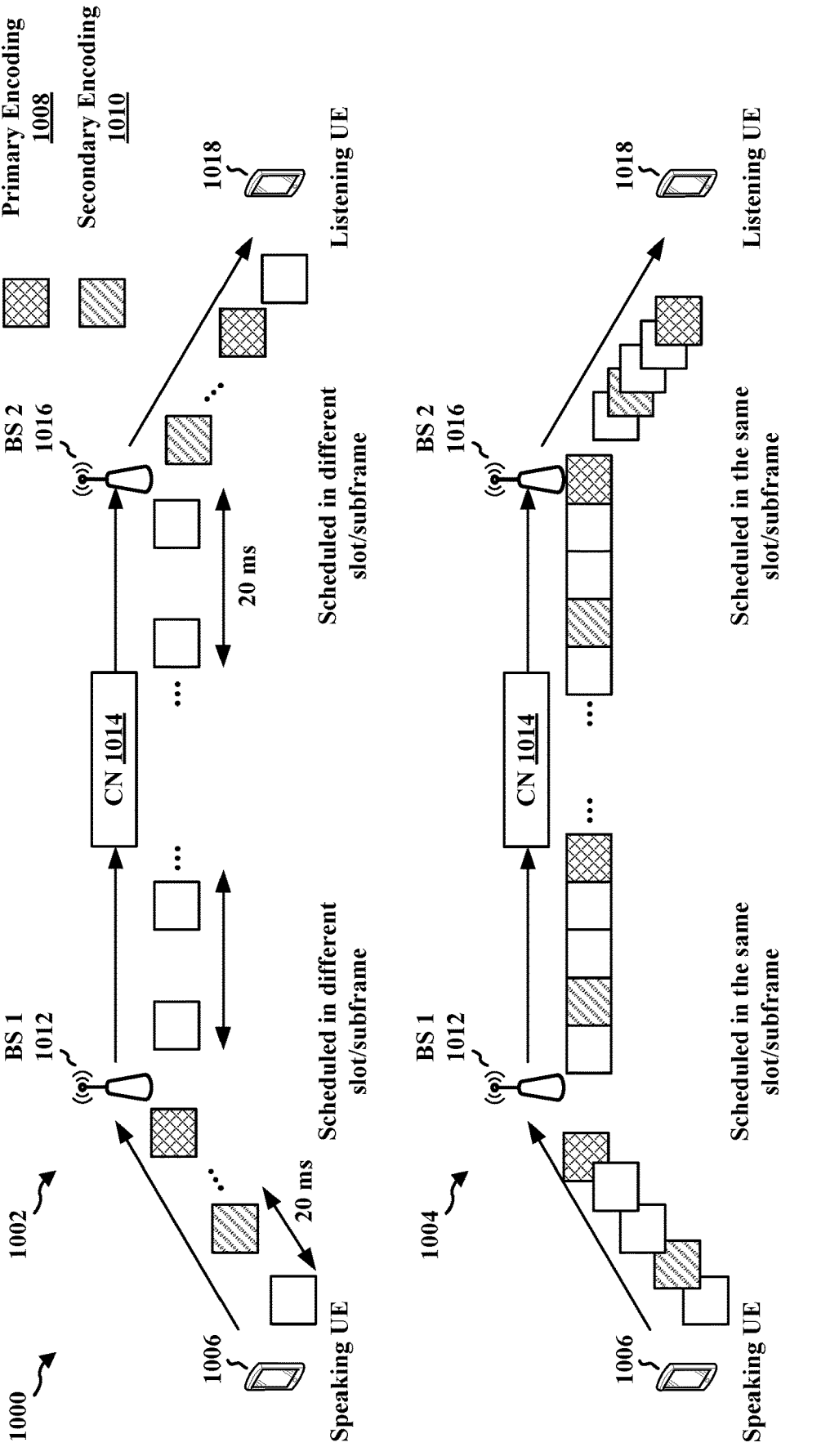
FIG. 10 is a diagram illustrating a first example of scheduling primary encodings and secondary encodings in different slots or different subframes and a second example of scheduling the primary encodings and the secondary encodings in the same slot or the same subframe.

FIG. 10 is a diagram 1000 illustrating a first example 1002 of scheduling primary encodings and secondary encodings in different slots or different subframes and a second example 1004 of scheduling the primary encodings and the secondary encodings in the same slot or the same subframe.

In the first example 1002, a primary encoding 1008 and a secondary encoding 1010 of data may be scheduled in different slots or different subframes. Stated differently, the primary encoding 1008 may be scheduled in first slot or a first subframe that is primary encoding focused and the secondary encoding 1010 may be scheduled in a second slot or a second subframe that is secondary encoding focused. In an example, the primary encoding 1008 and the secondary encoding 1010 may be encodings of voice data. A speaking UE 1006 (e.g., a UE that may transmit the primary encoding 1008 and the secondary encoding 1010 of the voice data) may transmit the primary encoding 1008 and the secondary encoding 1010 in the different slots or the different subframes to a first base station 1012. The first base station 1012 may provide the primary encoding 1008 and the secondary encoding 1010 in the different slots or the different subframes to a core network (CN) 1014. The CN 1014 may provide the primary encoding 1008 and the secondary encoding 1010 in the different slots or the different subframes to a second base station 1016. The second base station 1016 may transmit the primary encoding 1008 and the secondary encoding 1010 in the different slots or the different subframes to a listening UE 1018 (e.g., a UE that may receive the primary encoding 1008 and the secondary encoding 1010 of the voice data).

In the second example 1004, the primary encoding 1008 and the secondary encoding 1010 of the data may be scheduled in the same slot or the same subframe. The speaking UE 1006 may transmit the primary encoding 1008 and the secondary encoding 1010 in the same slot or the same subframe to the first base station 1012. The first base station 1012 may provide the primary encoding 1008 and the secondary encoding 1010 in the same slot or the same subframe to the CN 1014. The CN 1014 may provide the primary encoding 1008 and the secondary encoding 1010 in the same slot or the same subframe to the second base station 1016. The second base station 1016 may transmit the primary encoding 1008 and the secondary encoding 1010 in the same slot or the same subframe to the listening UE 1018.

When the primary encoding 1008 and the secondary encoding 1010 are scheduled in the same slot or the same subframe as in the second example 1004, communications reliability issues may arise. In one example, if UL HARQ reordering occurs in the speaking UE 1006, communications reliability issues may arise for DL communications of the listening UE 1018. In another example, if delay packing occurs at the speaking UE 1006, communications reliability issues may arise for UL communications of the speaking UE 1006 and DL communications of the listening UE 1018. In a further example, if delay packing occurs at the listening UE 1018, communications reliability issues may arise for DL communications of the listening UE 1018. In another example, if a handover (HO) or a RRC re-establishment occurs at the speaking UE 1006, communications reliability issues may arise for UL communications of the speaking UE 1006 and for DL communications of the listening UE 1018. In yet another example, if HO or a RRC re-establishment occurs at the listening UE 1018, communications reliability issues may arise for DL communications of the listening UE 1018.

A first wireless device (e.g., a first UE, a first base station) may transmit data for a second wireless device (e.g., a second UE, a second base station). The data may include a first (i.e., primary) encoding (e.g., a first MDC encoding) and a second (i.e., secondary) encoding (e.g., a second MDC encoding) of content (e.g., speech data). Depending on various factors, the second wireless device may receive the first encoding, the second encoding, or both the first encoding and the second encoding. The first encoding and the second encoding may be decoded by the second wireless device independently (e.g., in cases where the second wireless device does not receive one of the first encoding or the second encoding) to achieve increased communications reliability for the content or the first encoding and the second encoding may be decoded jointly (e.g., in cases where the second wireless device receives both the first encoding and the second encoding) to achieve higher quality for the content. However, some wireless communication systems may not be able to take advantage of the independent decoding described above, as the wireless communication systems may discard the first encoding if the second encoding is not received, or vice versa.

Aspects presented herein provide for RLC behavior, e.g., NR RLC behavior, that may improve the efficient use of data provided with MDC. For instance, the first encoding and the second encoding may be included in a first RLC SDU segment and a second RLC SDU segment, respectively. If the first RLC SDU segment is not received by a RLC receiver (e.g., the second wireless device), the second RLC SDU segment may be discarded by the RLC receiver, even though the second encoding included in the second RLC SDU segment may be decoded independently from the first encoding. Furthermore, the first encoding and the second encoding may be scheduled in the same time resource (e.g., i.e., a lack of time-domain diversity). For instance, the first encoding and the second encoding may be scheduled for the same slot or the subframe. If the second wireless device does not receive the time resource that includes the first encoding and the second encoding, the second device may not be able to decode content represented by the first encoding and the second encoding. Aspects presented herein may provide for an improved use or processing of the RLC SDU segments.

In an example, in a MDC scheme, an IP packet may accommodate multiple (output) encodings (e.g., output encoding A and output encoding B) and the encodings may be processed by a decoder independently. As described above, even if the decoder receives encoding A and not encoding B (or vice versa), the received encoding may still be useful to the decoder due to the functionality provided by the MDC scheme. For example, output encoding A and output encoding B may be accommodated in one IP packet. If output encoding B is lost in the air, it may be useful for the decoder to receive output encoding A. However, according to RLC behavior in some wireless communication systems, a receiving side of a RLC layer may not deliver a RLC SDU to an upper layer if the whole SDU is not reassembled. For instance, if output encoding B is lost in the air, the received SDU segment including output encoding A may be discarded in a RLC layer, even though encoding A may be decoded independently of encoding B in the MDC scheme.

As noted above, RLC behavior, such as NR RLC behavior, may not take advantage of time-domain diversity with respect to a MDC scheme. In order to take advantage of time-domain diversity, a base station (e.g., a gNB, eNB, or other type of base station) may schedule a primary encoding and a secondary encoding in different slots or different subframes. However, the base station may not be aware that a MDC scheme is being employed by a UE and thus the base station may schedule the primary encoding and the secondary encoding in the same slot or the same subframe if a TBS is sufficiently large to accommodate both the primary encoding and the secondary encoding.

In one example, the base station may schedule the primary encoding and the secondary encoding in the same slot or the same subframe due to UL HARQ reordering. For instance, due to UL HARQ reordering, the base station may deliver multiple packets to a core network at the same time and the multiple packets may arrive at a RAN node of a peer UE at the same time, thus causing the primary encoding and the secondary encoding to be delivered in the same slot or the same subframe. In another example, the base station may schedule the primary encoding and the secondary encoding in the same slot or the same subframe due to delay packing. For instance, the base station may intentionally suspend transmissions to save PDCCH resources for dynamic scheduling, L2 overhead reduction, and/or UE battery saving, thus causing the primary encoding and the secondary encoding to be delivered in the same slot or the same subframe. However, delay packing may not cause the primary encoding and the secondary encoding to be delivered in the same slot or the same subframe if a number of aggregated packets used for delay packing is two or three. In yet another example, the base station may schedule the primary encoding and the secondary encoding in the same slot or the same subframe due to handover (HO) or RRC re-establishment. For instance, during a HO or during a RRC re-establishment, a UE and a base station may buffer packets until scheduling is resumed. For instance, five packets may be buffered in a case in which a packet delay budget (PDB) is 100 ms and an inter-packet period is 20 ms (or six packets in a case in which the PDB is longer). In a non-terrestrial network (NTN) environment, a HO or a RRC re-establishment may take more than 100 ms. A NTN may not increase a time gap between the primary encoding and the secondary encoding for end to end latency purposes, and thus the primary encoding and the secondary encoding may be delivered in the same slot or the same subframe. This may occur frequently in a earth-moving cell such as a low Earth orbit (LEO) cell.

Various technologies pertaining to RAN enhancements for MDC are described herein. In one aspect, the technologies described herein may avoid RLC SDU segmentation and/or may help to ensure that a Rx RLC receiver delivers received data before RLC SDU reassembly. In another aspect, the technologies described herein may provide for a UE or a base station (e.g., a gNB, an eNB, or other type of base station) that applies a scheduling restriction such that a primary encoding and a secondary encoding are scheduled for transmission or reception in different slots or different subframes. In one approach, the base station may adjust a transport block size (TBS) such that the primary encoding and the secondary encoding are scheduled in different slots or different subframes. In another approach, the UE and/or the base station may restrict mapping of data to a transport block such that the primary encoding and the secondary encoding are scheduled in different slots or different subframes.

In one example, a first wireless device monitors at least one radio bearer for RLC segmentation information corresponding to a set of SDUs associated with the first wireless device. The first wireless device transmits, for a second wireless device, at least one RLC SDU that includes a number of encodings based on the RLC segmentation information corresponding to the set of SDUs. By monitoring for the RLC segmentation information, the first wireless device may help to avoid RLC segmentation in order to realize benefits associated with MDC.

In another example, a second wireless device obtains at least one RLC SDU segment belonging to a set of RLC SDU segments associated with a first wireless device. The second wireless device delivers the at least one RLC SDU segment to an upper layer, upon an occurrence of a condition and without obtain an entirety of the set of RLC SDU segments. Vis-à-vis the aforementioned features, the second wireless device may deliver received data before RLC SDU reassembly and hence may help to ensure that a primary encoding is not discarded if a secondary encoding is not received (or vice versa).

In a further example, a UE transmits, for a network node, an indication of a gap between a first encoding of a data packet and a second encoding of the data packet associated with the UE. The UE receives scheduling for at least one of DL or UL transmissions based on the indication of the gap, where the scheduling indicates that the first encoding and the second encoding of the data packet are scheduled for transmission or reception in different slots or different subframes. The scheduling may help to ensure that the first encoding and the secondary encoding are scheduled in different slots or different subframes such that advantages of MDC may be realized.

In yet another example, a first wireless device establishes a plurality of channels including a first logical channel and a second logical channel based on an indication of a gap between a first encoding of a data packet and a second encoding of the data packet associated with the first wireless device. The first wireless device maps the first encoding to the first logical channel and the second encoding to the second logical channel. The first wireless device transmits, for a second wireless device, the first encoding and the second encoding in different slots or different subframes based on the first encoding being mapped to the first logical channel and the second encoding being mapped to the second logical channel. Vis-à-vis the aforementioned mapping, the above-described technologies may help to ensure that the first encoding and the secondary encoding are scheduled in different slots or different subframes such that advantages of MDC may be realized.

In a further example, a network node receives an indication of a gap between a first encoding of a data packet and a second encoding of the data packet associated with a UE. The network node transmits, for the UE, scheduling for at least one of DL or UL transmissions of the UE based on the indication of the gap, where the scheduling indicates that the first encoding and the second encoding of the data packet are scheduled for transmission or reception in different slots or different subframes. The scheduling may help to ensure that the first encoding and the secondary encoding are scheduled in different slots or different subframes such that advantages of MDC may be realized.

In another example, a second wireless device receives, in different slots or different subframes, a first encoding of a data packet and a second encoding of the data packet associated with a first wireless device, where the first encoding is associated with a first logical channel and the second encoding is associated with a second logical channel. The second wireless device aggregates the first encoding of the data packet and the second encoding of the data packet into a QoS flow. Vis-à-vis the aforementioned features, advantages of MDC may be realized.

Figure 11:
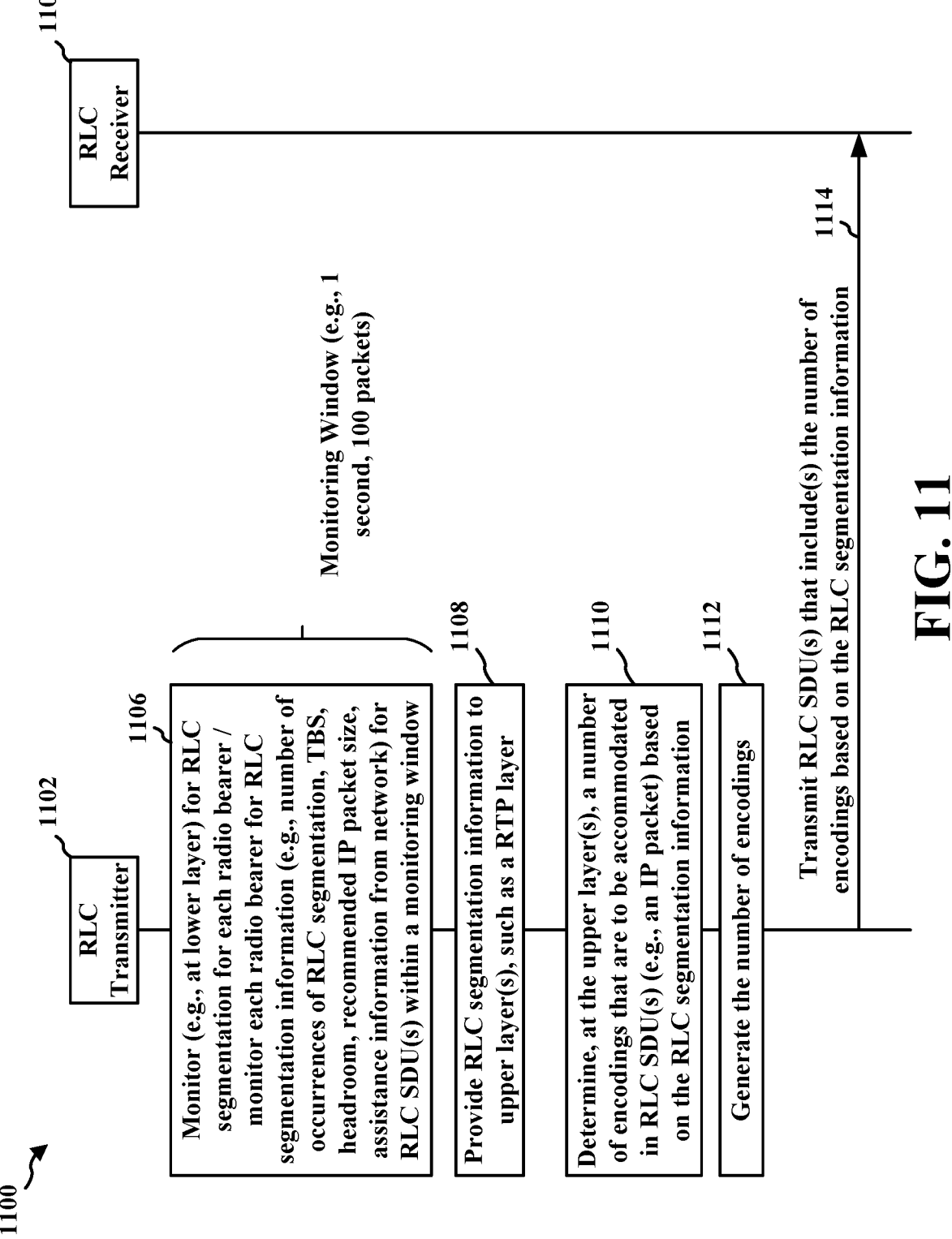
FIG. 11 is a diagram illustrating example communications between a RLC transmitter and a RLC receiver.

FIG. 11 is a diagram 1100 illustrating example communications between a RLC transmitter 1102 and a RLC receiver 1104. In an example, the RLC transmitter 1102 may be a UE (e.g., the UE 104, the UE 350, the speaking UE 1006, etc.) or a base station (e.g., the base station 102, the base station 310, the first base station 1012, the second base station 1016, etc.). In an example, the RLC receiver 1104 may be a UE (e.g., the UE 104, the UE 350, the listening UE 1018, etc.) or a base station (e.g., the base station 102, the base station 310, the first base station 1012, the second base station 1016, etc.). In an example, the RLC transmitter 1102 may be a first wireless device and the RLC receiver 1104 may be a second wireless device. Furthermore, although the description of the diagram 1100 may focus on RLC based segmentation, the concepts described in the description of the 1100 may also be applicable to other types of segmentation, such as MAC based segmentation and/or PDCP based segmentation.

In one aspect, MDC may increase an IP packet size due to generation of a primary encoding and a secondary encoding. The increased IP packet size may lead to more opportunities for RLC SDU segmentation. For instance, a TBS may be smaller than an IP packet size in a cell edge, which may lead to RLC SDU segmentation. The communications depicted in the diagram 1100 may be associated with controlling a MDC process depending on a radio environment in order to avoid RLC segmentation.

At 1106, the RLC transmitter 1102 may monitor for whether RLC segmentation (e.g., RLC SDU segmentation) occurs or not for each radio bearer associated with the RLC transmitter 1102. For instance, the RLC transmitter 1102 may monitor for RLC segmentation information (described below) during a monitoring window. The RLC segmentation information may include data that may help a wireless device (e.g., the RLC transmitter 1102) to reduce instances of RLC segmentation. In an example, the monitoring window may be 1 second or 100 packets in duration.

The RLC segmentation information may include a number of times in which RLC segmentation occurred during the monitoring window with respect to RLC SDU(s) that are to be transmitted by the RLC transmitter 1102. The RLC segmentation information may include a TBS of the RLC SDU(s). The RLC segmentation information may include an indication of space allocated for each radio bearer/RLC channel/logical channel associated with the RLC transmitter 1102. In an example, the TBS may include a minimum TBS, an average TBS, a maximum TBS, and/or a cumulative distribution function (CDF) of the TBS. The RLC segmentation information may include a headroom associated with the RLC SDU(s). For instance, the headroom may be a size of a gap between the RLC SDU(s) and the TBS. In another example, the headroom may be a size of a gap between the RLC SDU(s) and the space allocated for each radio bearer/RLC channel/logical channel associated with the RLC transmitter 1102. The headroom may be negative, that is, a size of the RLC SDU(s) may be greater than a TBS. The RLC segmentation information may include a recommended size of the RLC SDU(s) (e.g., a recommended IP packet size). In one example, the RLC transmitter 1102 may calculate the recommended size of the RLC SDU(s). In another example, the RLC segmentation information may include assistance information, where the RLC transmitter 1102 may receive the assistance information from a network, and where the assistance information may indicate a minimum TBS for the RLC transmitter 1102.

At 1108, the RLC transmitter 1102 may provide (e.g., report) the RLC segmentation information to an upper layer associated with communications at the RLC transmitter 1102. In an example, the upper layer may be an application (AS) layer, a RTP layer, or a layer associated with a vocoder.

At 1110, the RLC transmitter 1102 may determine, at the upper layer(s), a number of encodings that are to be accommodated in the RLC SDU(s) based on the RLC segmentation information. In an example, the encodings may be MDC encodings. For instance, the RLC transmitter 1102 may determine a number of encodings that are to be accommodated in one IP packet. In one aspect, the RLC transmitter 1102 may determine whether or not MDC is to be applied based on the RLC segmentation information. Stated differently, the number of encodings determined by the RLC transmitter 1102 may be zero. In one aspect, the number of encodings may be less than a threshold value.

At 1112, the RLC transmitter 1102 may generate the determined number of encodings. In an example, the RLC transmitter 1102 may generate a first encoding (e.g., a primary encoding) and a second encoding (e.g., a secondary encoding) for data, such as voice data (e.g., an input speech frame). At 1114, the RLC transmitter 1102 may transmit the RLC SDU(s) for the RLC receiver 1104. The RLC SDU(s) may include the determined number of encodings. In one aspect, multiple encodings may be associated with reduced overhead. For instance, separate IP packets may result in greater overhead due to IP/user datagram protocol (UDP)/ RTP data and layer 2 (L2) headers associated with the separate IP packets.

Figure 12:
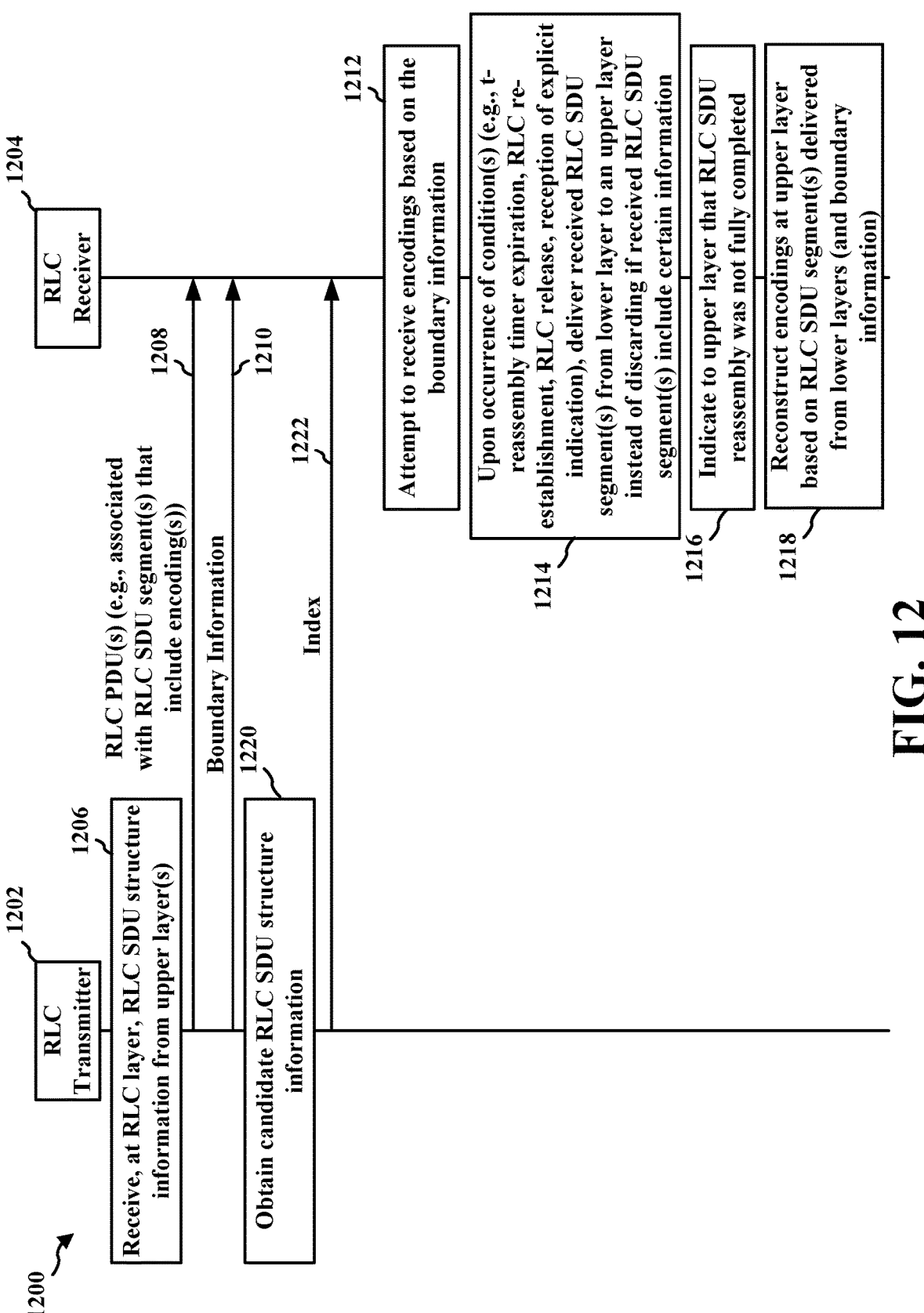
FIG. 12 is a diagram illustrating example communications between a RLC transmitter and a RLC receiver.

FIG. 12 is a diagram 1200 illustrating example communications between a RLC transmitter 1202 and a RLC receiver 1204. In an example, the RLC transmitter 1202 may be a UE (e.g., the UE 104, the UE 350, the speaking UE 1006, etc.) or a base station (e.g., the base station 102, the base station 310, the first base station 1012, the second base station 1016, etc.). In an example, the RLC receiver 1204 may be a UE (e.g., the UE 104, the UE 350, the listening UE 1018, etc.) or a base station (e.g., the base station 102, the base station 310, the first base station 1012, the second base station 1016, etc.). In an example, the RLC transmitter 1202 may be a first wireless device and the RLC receiver 1204 may be a second wireless device. As will be described in greater detail below, the RLC receiver 1204 may deliver received RLC SDU segment(s) if the received RLC SDU segment(s) are "useful" for upper layer(s) of the RLC receiver 1204. For instance, the RLC receiver 1204 may deliver the received RLC SDU segments if the received RLC SDU segment(s) include at least one encoding (e.g., at least one MDC encoding). Although the description of the diagram 1200 may focus on encodings, the concepts described herein may be generally applicable to data fields (i.e., an encoding may be a data field). Furthermore, although the description of the diagram 1200 may focus on RLC based segmentation, the concepts described in the description of the 1100 may also be applicable to other types of segmentation, such as MAC based segmentation and/or PDCP based segmentation.

At 1206, the RLC transmitter 1202 may receive, at a RLC layer, RLC SDU structure information from upper layer(s) of the RLC transmitter 1202. In an example, the upper layer(s) may include a RTP layer (for a UE or for a network). In one aspect, the RLC SDU structure information may include boundary information, where the boundary information may indicate a boundary of each encoding (e.g., MDC encoding) associated with RLC SDU(s) that are to be transmitted for the RLC receiver 1204. In an example, each encoding may be an encoding of a voice frame. In one aspect, the boundary information may be reported via a control PDU. For instance, the boundary information may be reported in a RLC control PDU or a RLC header. In one aspect, a new field may be defined in a RLC header that indicates if an associated RLC SDU segment includes the boundary information. In an example, the new field may be an indication for a last byte of the RLC header.

At 1208, the RLC transmitter 1202 may transmit RLC PDU(s) for the RLC receiver 1204. The RLC PDU(s) may be associated with RLC SDU segment(s) that include encoding(s), such as MDC encodings. At 1210, the RLC transmitter 1202 may transmit the boundary information for the RLC receiver 1204. In one aspect, the RLC transmitter 1202 may transmit the RLC PDU(s) and the boundary information together.

At 1212, the RLC receiver 1204 may attempt to receive each of the encodings associated with the RLC SDU(s) based on the boundary information. Stated differently, the RLC receiver 1204 may attempt to receive each RLC SDU segment in the RLC SDU segment(s) that includes an encoding. In an example, a network may provide for an UL grant that has a size that may avoid RLC segmentation and/or the network may provide a UL grant for HARQ retransmission until a gap is resolved in received RLC SDU(s). At 1214, upon occurrence of a condition (or conditions), the RLC receiver 1204 may deliver received RLC SDU segment(s) to an upper layer instead of discarding the received RLC SDU segment(s).

In one example, the condition may be a t-reassembly timer expiring. The t-reassembly timer may be started by the RLC receiver 1204 when the RLC receiver 1204 receives an out-of-order RLC PDU. For instance, the RLC receiver 1204 may start the t-reassembly timer if the RLC receiver 1204 receives RLC PDU n+1 without first receiving RLC PDU n, where n is a positive integer. If a missing RLC PDU is not received before the t-reassembly timer expires, the RLC receiver 1204 may request a retransmission.

In another example, the condition may be a RLC entity being re-established. A RRC layer of the RLC receiver 1204 may establish a RLC entity when a radio bearer is to be created. Establishing the RLC entity may include creating the RLC entity and initializing protocol state variables. After initializing the protocol state variables, the RLC entity may move into an active state. In the active state, the RRC layer may re-establish the RLC entity if a session has been reinitialized due to a radio link failure.

In yet another example, the condition may be a release of a RLC entity. When the RLC entity is an active state, the RRC layer may release the RLC entity if the radio bearer is released at an RRC level.

In a further example, the condition may be a reception of an explicit indication. For instance, the explicit indication may be received from the RLC transmitter 1202.

The RLC receiver 1204 may deliver the received RLC SDU segment(s) to the upper layer even if the RLC receiver 1204 has not received all of the RLC SDU segment(s). For instance, the RLC receiver 1204 may deliver a first RLC SDU segment that includes a first encoding to the upper layer even when a second RLC SDU segment including a second encoding has not been received by the RLC receiver 1204. In one aspect, the RLC receiver 1204 (e.g., a network) may deliver the received RLC SDU segment(s) to the upper layer if RLC receiver 1204 has received RLC SDU segment(s) that include certain information for reassembling the first encoding. In an example, the certain information may include a SDAP header, a PDCP header, a robust header compression (ROHC), and the first encoding. At 1216, the RLC receiver 1204 may indicate to the upper layer that RLC SDU reassembly was not fully completed. At 1218, the upper layer of the RLC receiver 1204 may reconstruct the encoding(s) based on data delivered from lower layers (e.g., the boundary information).

In one aspect, a structure of a voice packet may be associated with one structure from amongst a plurality of structures. In such an aspect, a two-step approach may be utilized to indicate a structure of RLC SDU(s) associated with the voice packet in order to reduce over the air overhead. At 1220, the RLC transmitter 1202 may obtain candidate RLC SDU structure information, that is, the RLC transmitter may be configured with the candidate RLC SDU structure information. The candidate RLC SDU structure information may include the boundary information described above and/or a length of each of the encodings associated with the RLC SDU(s) for each candidate RLC SDU structure. Each candidate RLC SDU structure may be assigned a different index.

In one aspect, the candidate RLC SDU structure information may be in the form of a list that includes indices for each of the candidate RLC SDU structures. In one example, the list may be provided to an upper layer of the RLC transmitter 1202 by a network. In another example in which the RLC transmitter 1202 is a UE, the list may be configured (e.g., preconfigured) with respect to the upper layer in the UE or in a subscriber identity module (SIM) of the UE. The upper layer may inform an AS layer or a RLC layer of the RLC transmitter 1202 of an index for a candidate RLC SDU structure.

In one aspect, the list may be provided to an AS layer or a RLC layer of the RLC transmitter 1202 by the network. The AS layer or the RLC layer may detect a structure of RLC SDU and determine an index for a candidate RLC SDU structure based on the structure.

At 1222, the RLC transmitter 1202 may transmit the index for the candidate RLC SDU structure to the RLC receiver 1204. In one example, the index may be included in a RLC data PDU (e.g., in a header) or a RLC control PDU. The RLC receiver 1204 may match the index to a candidate RLC SDU structure. The RLC receiver 1204 may perform 1212, 1214, and/or 1218 additionally based on the match. For instance, as the RLC receiver 1204 may be informed of a RLC SDU structure based on the match, the RLC receiver 1204 may deliver the RLC SDU segment(s) from a lower layer to an upper layer instead of discarding the RLC SDU segment(s) based on the RLC SDU structure. If no match exists (i.e., no candidate RLC SDU structure matching), a fixed index may be utilized, such as a zero index (e.g., index=0) or an out-of-range index.

FIG. 13 is a diagram 1300 illustrating an example of a RLC control PDU 1302. In an example, the RLC control PDU 1302 may be used to convey the boundary information described above as being transmitted by the RLC transmitter 1202. The RLC control PDU 1302 may be organized according to octets. The RLC control PDU 1302 may include a D/C field 1304 in a first octet that indicates whether the RLC control PDU 1302 is for data or control. In an example, the D/C field 1304 may indicate that the RLC control PDU 1302 is for control. The RLC control PDU 1302 may include a CPT field 1306 in the first octet that indicates a type of the RLC control PDU 1302. The RLC control PDU 1302 may include reserved bits (indicated in FIG. 12 by "R") in the first octet.

The RLC control PDU 1302 may include boundary information in remaining octets of the RLC control PDU 1302, where the boundary information may indicate a byte position of a last byte of an encoding included in a RLC SDU or a RLC SDU segment. For example, in the second octet, the RLC control PDU may include a position of a last byte of a first encoding (e.g., a first MDC encoding) in a RLC SDU. For example, in the fourth octet, the RLC control PDU 1302 may include a position of a last byte of a second encoding (e.g., a second MDC encoding) in a RLC SDU. The RLC control PDU 1302 may include two instances of boundary information for each encoding.

Figure 14:
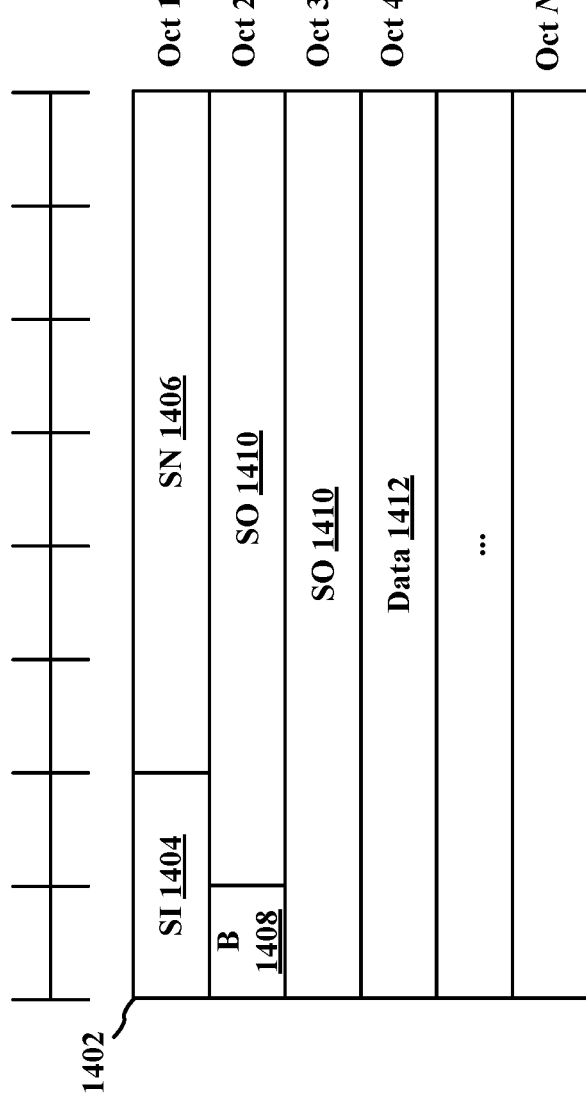
FIG. 14 is a diagram illustrating an example of a RLC header.

FIG. 14 is a diagram 1400 illustrating an example of a RLC header 1402. The RLC header 1402 may be associated with a RLC PDU. In an example, the RLC header 1402 may be used to convey the boundary information described above as being transmitted by the RLC transmitter 1202. The RLC header 1402 may be organized according to octets. The RLC header 1402 may include SI 1404 in the first octet that may indicate whether or not a RLC SDU associated with the RLC PDU is segmented. The RLC header 1402 may include a SN 1406 that may identify which RLC SDU segments belong to which RLC SDU. The SN 1406 may be six bits wide. The RLC header 1402 may include a SO 1410 that indicates a byte position of a segment within a RLC SDU. The RLC header 1402 may include data 1412 in at least the fourth octet.

The RLC header 1402 may include a B field 1408. The B field 1408 may include a zero bit when data parts of a RLC PDU segment do not include a last byte of an encoding. The B field 1408 may include a one bit if the data parts in the RLC PDU segment includes a last byte of an encoding.

In one aspect with respect to DL transmissions, a base station (e.g., a gNB) may inform a UE (e.g., a receiving UE) of the RLC SDU structure information (e.g., the boundary information) such that the UE may deliver received data to an upper layer before a whole of a RLC SDU is reassembled. In an example, the base station may receive the information from a core network or a peer base station. If an upper layer of the UE has access to the RLC SDU structure information (e.g., the boundary information) via pre-negotiation with a peer UE, a Rx RLC layer in the UE may receive the RLC SDU structure information from an upper layer instead of receiving the RLC SDU structure from the base station. Additionally, or alternatively, the RLC SDU structure information may be used to prohibit RLC SDU segmentation for DL transmissions.

In one aspect, an integrity mechanism of a wireless communication system may not be compatible with some of the aspects described above, such as when an RLC layer delivers only part (or parts) of a RLC SDU. In one aspect, a PDCP layer of the wireless communication system may not be configured with U-plane integrity protection (UP-IP). In another aspect, an upper layer of the wireless communication system may not check a parity (e.g., a UDP checksum) associated with a RLC SDU. In one aspect, the upper layer of the wireless communication system may consider data only up to a first encoding for the UDP checksum. In one aspect, the upper layer may not perform verification of header content information (e.g., length information in an IP header or a UDP header).

Figure 15:
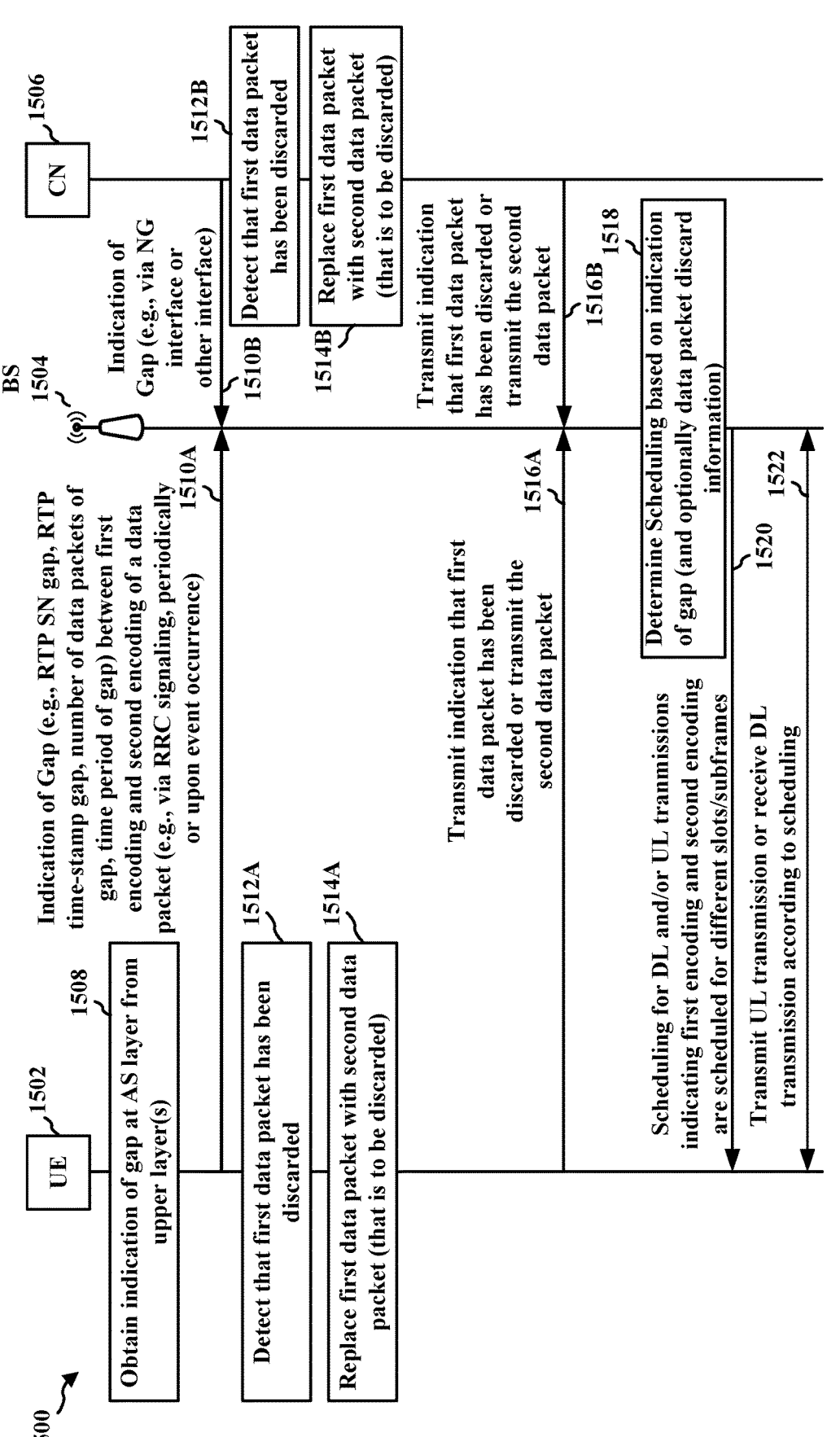
FIG. 15 is a diagram illustrating example communications between a UE, a base station, and a core network (CN).

FIG. 15 is a diagram 1500 illustrating example communications between a UE 1502, a base station 1504, and a CN 1506. In an example, the UE 1502 may be the UE 104, the UE 350, etc. In an example, the base station 1504 may be the base station 102, the base station 310, etc. In an example, the CN 1506 may be the core network 120. In an example, the CN 1506 may be or include a IP multimedia core network subsystem (IMS). The communications depicted in the diagram 1500 may pertain to the base station 1504 (e.g., a gNB/eNB) controlling a TBS in each slot or each subframe such that a part or an entirety of a primary encoding and a secondary encoding are mapped to a different slot or a different subframe for UL and/or DL transmissions.

In one aspect, at 1508, the UE 1502 may obtain, at an AS layer of the UE 1502, an indication of a gap between a primary encoding of a data packet and a secondary encoding of the data packet from upper layer(s) of the UE 1502. In an example, the data packet may be associated with voice data. In an example, the indication of the gap may be a RTP SN gap, a RTP time-stamp gap, a number of packets associated with the gap, or a time period associated with the gap.

The base station 1504 may be informed of the gap between the primary encoding and the secondary encoding, that is, the base station 1504 may receive the indication of the gap periodically or upon an occurrence of an event (e.g., as part of a bearer setup). In one aspect, at 1510A, the UE 1502 may transmit the indication of the gap to the base station 1504. In one aspect, the UE 1502 may transmit the indication of the gap periodically or the UE 1502 may transmit the indication of the gap upon occurrence of the event. In an example, the UE 1502 may transmit the indication of the gap via RRC signaling or other control information, such as control information pertaining to a SDAP layer, a PDCP layer, a RLC layer, a MAC layer (e.g., a medium access control (MAC) control element (MAC-CE)), or a physical layer (e.g., uplink control information (UCI)).

In one aspect, at 1510B, the base station 1504 may receive the indication of the gap from the CN 1506. In an example, the base station 1504 may receive the indication of the gap via a next generation (NG) interface or another interface. In an example, an IMS node associated with the CN 1506 may provide the base station 1504 with the indication of the gap.

At 1518, the base station 1504 may determine scheduling for UL or DL transmissions of the UE 1502 based on the indication of the gap received from the UE 1502 or the CN 1506. The scheduling may indicate that the primary encoding and the secondary encoding are scheduled in different slots or different subframes. Determining the scheduling may include adjusting a TBS of each slot or each subframe for UL transmissions or DL transmissions such that the primary encoding and the secondary encoding are mapped to different slots or different subframes. At 1520, the base station 1504 may transmit the scheduling to the UE 1502. At 1522, the UE 1502 may transmit a UL transmission or receive a DL transmission according to the scheduling, that is, the UE 1502 may transmit the UL transmission to the base station 1504, where the UL transmission may include the primary encoding and the secondary encoding in different slots or different subframes or the UE 1502 may receive the DL transmission from the base station 1504, where the DL transmission may include the primary encoding and the secondary encoding in different slots or different subframes.

In one aspect, if the base station 1504 utilizes a CU-DU split, the CU may indicate the gap to the DU. The DU may determine the scheduling and the CU may be responsible for RRC and PDCP functionality. In an example, the CU may be the CU 110 and the DU may be the DU 130.

In one aspect, if a packet discard occurs (e.g., a PDCP discard), the gap between the primary encoding and the secondary encoding may be smaller than an expected packet gap between the primary encoding and the secondary encoding. This may result in the primary encoding and the secondary encoding being mapped to the same slot or the same subframe.

In one aspect, at 1512A, the UE 1502 may detect that a first data packet has been discarded. At 1516A, the UE 1502 may transmit an indication to the base station 1504 indicating that the first data packet has been discarded. In an example for UL transmissions, the UE 1502 may transmit the indication via signaling such as a RRC message, a SDAP control PDU, a PDCP control PDU, a RLC control PDU, a MAC-CE, UCI, etc. A MAC scheduler within the base station 1504 may be informed of the discard. The base station 1504 may determine the scheduling at 1518 additionally based upon the indication that the first data packet has been discarded, that is, the base station 1504 may adjust a TBS based on the indication that the first data packet has been discarded.

In one aspect, at 1512B, the CN 1506 may detect that a first data packet has been discarded. At 1516B, the CN 1506 may provide an indication to the base station 1504 indicating that the first data packet has been discarded. In an example for DL transmissions, the CN 1506 may indicate that the first data packet has been discarded via signaling or via a field in a header for DL data. The MAC scheduler within the base station 1504 may be informed of the discard. The base station 1504 may determine the scheduling at 1518 additionally based upon the indication that the first data packet has been discarded, that is, the base station 1504 may adjust a TBS based on the indication that the first data packet has been discarded.

In one aspect, at 1512A, the UE 1502 may detect that the first data packet has been discarded. At 1514A, the UE 1502 may replace the first data packet with a second data packet (i.e., "a dummy data packet"). In an example for UL transmissions, a layer (e.g., a physical layer, a MAC layer, a RLC layer, a PDCP layer, a SDAP layer, etc.) of the UE 1502 may insert the second data packet in place of the first data packet. In one example, a size of the second data packet may be configured/decided with reference to a normal packet. For instance, the size of the second data packet may be determined based on a last transmitted data packet, a last submitted packet, or a last received packet. The second data packet may be discarded on a Rx side.

In one aspect, at 1512B, the CN 1506 may detect that the first data packet has been discarded. At 1514B, the CN 1506 may replace the first data packet with a second data packet (i.e., "a dummy data packet"). In an example for DL transmissions, a layer of the CN 1506 may insert the second data packet in place of the first data packet. In one example, the size of the second data packet may be configured/decided with reference to a normal packet. For instance, the size of the second data packet may be determined based on a last transmitted data packet, a last submitted packet, or a last received packet. The second data packet may be discarded on the Rx side.

Figure 16:
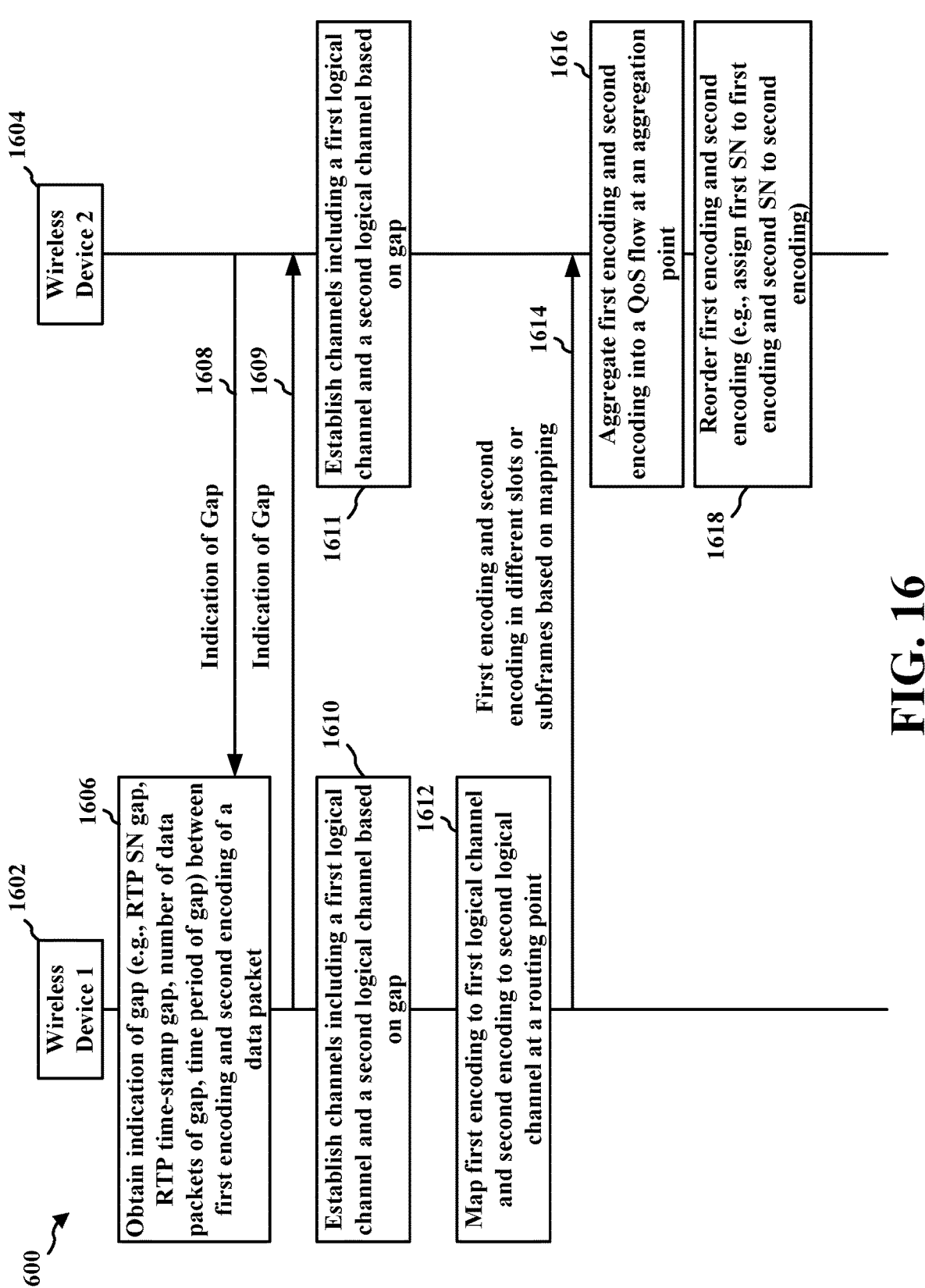
FIG. 16 is a diagram illustrating example communications between a first wireless device and a second wireless device.

FIG. 16 is a diagram 1600 illustrating example communications between a first wireless device 1602 and a second wireless device 1604. In an example, the first wireless device 1602 may be a UE (e.g., the UE 104, the UE 350, etc.) and the second wireless device 1604 may be a base station (e.g., the base station 102, the base station 310, etc.). In another example, the first wireless device 1602 may be a base station (e.g., the base station 102, the base station 310, etc.) and the second wireless device 1604 may be a UE (e.g., the UE 104, the UE 350, etc.). The communications depicted in the diagram 1600 may be associated with utilization of a MAC logical channel (LCH) restriction mechanism. The communications depicted in the diagram 1600 may pertain to mapping a primary encoding of a data packet and a secondary encoding of the data packet to different slots or different subframes via the MAC LCH restriction mechanism. Such an approach may be applicable for both DL transmissions and UL transmissions. In an example, a UE and/or a base station (e.g., a gNB or an eNB) may restrict mapping of data to a TB.

At 1606, the first wireless device 1602 may obtain an indication of a gap between a first encoding of a data packet and a second encoding of the data packet. In an example, the data packet may be associated with voice data. In an example, the indication of the gap may be a RTP SN gap, a RTP time-stamp gap, a number of packets associated with the gap, or a time period associated with the gap. In one aspect, at 1608, the first wireless device 1602 may receive the indication of the gap from the second wireless device 1604. In another aspect, the first wireless device may receive the indication of the gap from a core network.

In one aspect, at 1609, the first wireless device 1602 may transmit the indication of the gap to the second wireless device 1604. For instance, in an example, the first wireless device 1602 may be a UE and the second wireless device 1604 may be a base station (e.g., a gNB or an eNB). The base station may be informed of a scheduling recommendation (e.g., via the indication of the gap or information accompanying the indication of the gap). For instance, the base station may be informed of the scheduling recommendation via signaling, such as signaling associated with a SDAP layer, signaling associated with a PDCP layer, signaling associated with a RLC layer, signaling associated with a MAC layer (e.g., a MAC-CE), signaling associated with a physical layer (e.g., UCI), or RRC signaling. In one aspect in which different QoS flows or radio bearers are utilized, the base station may be informed that such QoS flows or radio bearers are not to be mapped onto the same slot or the same subframe. In one aspect, the base station may also be informed of the scheduling recommendation (e.g., via the indication of the gap or information accompanying the indication of the gap) from a CN. For instance, the base station may be informed of the scheduling recommendation via a NG interface or another interface.

At 1610, the first wireless device 1602 may establish channels including a first instance of a first logical channel and a first instance of a second logical channel based on the indication of the gap. The first wireless device 1602 may apply/configure a logical channel restriction. At 1611, the second wireless device 1604 may establish channels including a second instance of the first logical channel and a second instance of the second logical channel based on the indication of the gap. The second wireless device 1604 may apply/configure a logical channel restriction.

At 1612, the first wireless device 1602 may map the first encoding to the first logical channel and the second encoding to the second logical channel at a routing point (described in greater detail below) at the first wireless device 1602 (e.g., at a Tx side). In an example, the routing point may be at a protocol layer of the first wireless device 1602. Due to a MAC logical channel restriction mechanism, the primary encoding and the secondary encoding may be mapped onto different logical channels (e.g., the first logical channel and the second logical channel). For instance, the first wireless device 1602 may map the first encoding and the second encoding to corresponding logical channels based on information from an upper layer or other nodes. For instance, for UL transmissions, the information may be provided by a base station to a UE. For DL transmissions, the information may be provided by a CN to the base station. In an example, the information from the upper layer or the other nodes may be the indication of the gap.

In an example, the indication of the gap may be a number of packets between the primary encoding and the secondary encoding. In the example, the routing point at the first wireless device may count a number of packets submitted to lower layers (i.e., layers occurring under a layer associated with the routing point). For instance, if the gap has a length of three packets and two logical channels (e.g., the first logical channel and the second logical channel) are established, the routing point may switch between the two logical channels every three packets, that is, every three packets, the routing point may switch from mapping data from the first logical channel to the second logical channel. In another example, if the gap has a length of three packets and three logical channels are established, the routing point may switch logical channels in a "round-robin" manner, that is, the routing point may switch logical channels every packet. Alternatively, the routing point may perform a RTP SN modulo 3 operation (e.g., "RTP SN mod 3") and select a logical channel based on an output of the RTP SN modulo 3 operation. The RTP SN modulo 3 operation may be useful in scenarios involving discontinuous packets (e.g., due to packet discards). In another example, the indication of the gap may be a time period of "60 ms" and the routing point may switch logical channels every 60 ms.

At 1614, the first wireless device 1602 may transmit, for the second wireless device 1604, the first encoding and the second encoding in different slots or different subframes based on the mapping performed at 1612. At 1616, the second wireless device 1604 may aggregate the first encoding and the second encoding into a QoS flow at an aggregation point (described in greater detail below). The aggregation point may be located at a protocol layer of the second wireless device 1604 corresponding to a protocol layer of the routing point at the first wireless device 1602. At 1616, the second wireless device 1604 may reorder the first encoding and the second encoding at the aggregation point. For instance, if the aggregation point is located at the SDAP layer (or a layer higher than the SDAP layer), the second wireless device 1604 may reorder the first encoding and the second encoding. In one aspect, reordering the first encoding and the second encoding may include assigning a first SN to the first encoding and a second SN to the second encoding.

Figure 17:
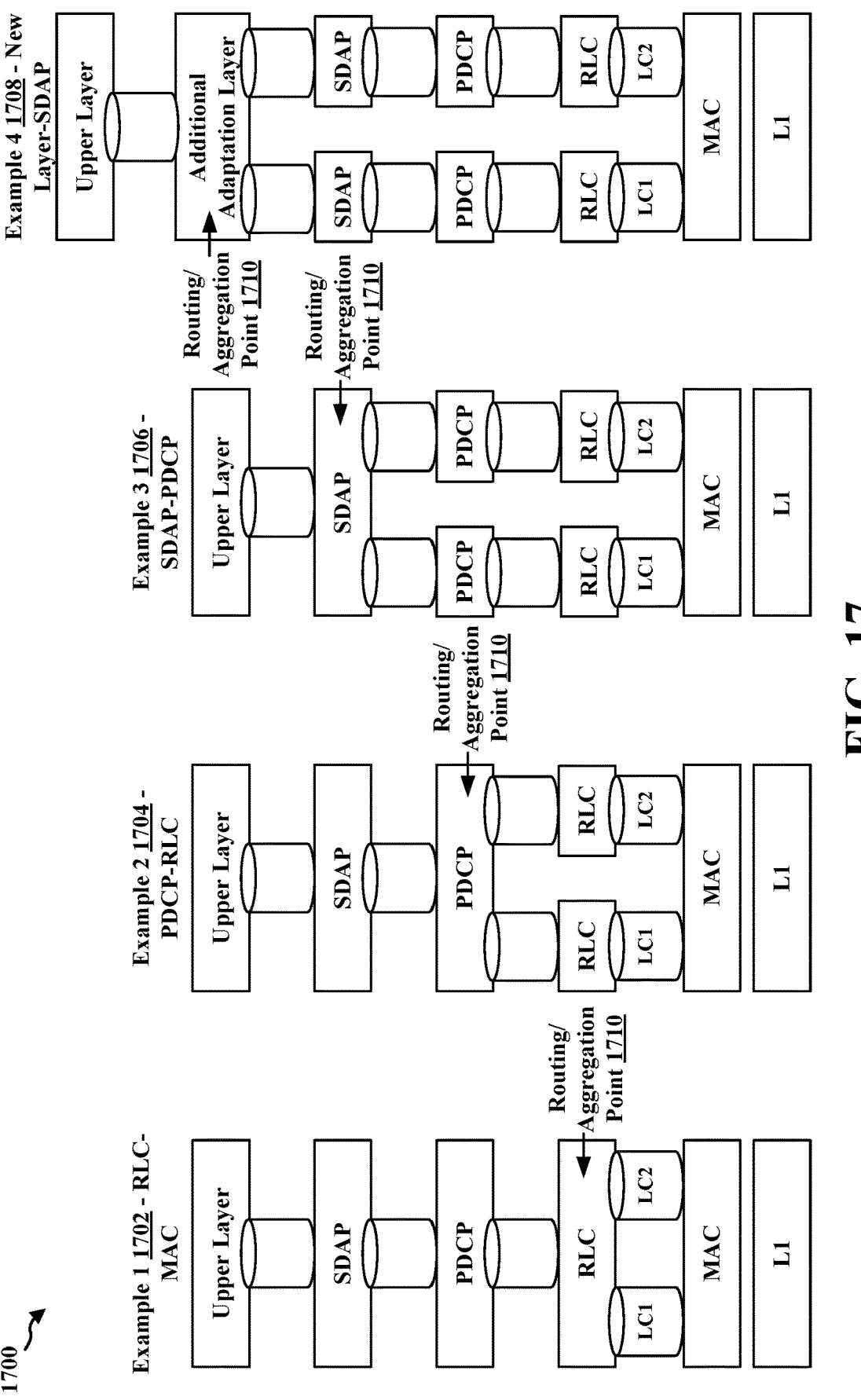
FIG. 17 is a diagram illustrating example locations of a routing/aggregation point in protocol layers associated with wireless communications.

FIG. 17 is a diagram 1700 illustrating example locations of a routing/aggregation point 1710 in protocol layers associated with wireless communications at a UE and/or a base station. The routing/aggregation point 1710 may correspond to the routing point of the first wireless device 1602 and the aggregation point of the second wireless device 1604 described above in connection with the mapping performed at 1612 and the aggregation performed at 1616 of FIG. 16, respectively. In FIG. 17, channels between protocol layers are depicted as cylinders.

In a first example 1702, the routing/aggregation point 1710 may be established at a RLC layer of the first wireless device 1602 and the second wireless device 1604. For instance, a primary encoding of a data packet and a secondary encoding of the data packet may be mapped to different slots or different subframes at the routing/aggregation point 1710 at the first wireless device 1602 and the primary encoding of the data packet and the secondary encoding of the data packet may be aggregated into a flow (e.g., a QoS flow) at the routing/aggregation point 1710 at the second wireless device 1604.

In a second example 1704, the routing/aggregation point 1710 may be established at a PDCP layer of the first wireless device 1602 and the second wireless device 1604. For instance, the primary encoding of the data packet and the secondary encoding of the data packet may be mapped to different slots or different subframes at the routing/aggregation point 1710 at the first wireless device 1602 and the primary encoding of the data packet and the secondary encoding of the data packet may be aggregated into a flow (e.g., a QoS flow) at the routing/aggregation point 1710 at the second wireless device 1604.

In a third example 1706, the routing/aggregation point 1710 may be established at a SDAP layer of the first wireless device 1602 and the second wireless device 1604. For instance, the primary encoding of the data packet and the secondary encoding of the data packet may be mapped to different slots or different subframes at the routing/aggregation point 1710 at the first wireless device 1602 and the primary encoding of the data packet and the secondary encoding of the data packet may be aggregated into a flow (e.g., a QoS flow) at the routing/aggregation point 1710 at the second wireless device 1604. In the third example 1706, multiple QoS flows or radio bearers may be used for one service.

In a fourth example 1708, the routing/aggregation point 1710 may be established at an additional adaptation layer of the first wireless device 1602 and the second wireless device 1604. The additional adaptation layer may be located between a SDAP layer and upper layers (e.g., a RTP layer, an AS layer, etc.) of the first wireless device 1602 and the second wireless device 1604. For instance, the primary encoding of the data packet and the secondary encoding of the data packet may be mapped to different slots or different subframes at the routing/aggregation point 1710 at the first wireless device 1602 and the primary encoding of the data packet and the secondary encoding of the data packet may be aggregated into a flow (e.g., a QoS flow) at the routing/aggregation point 1710 at the second wireless device 1604. In the fourth example 1708, multiple QoS flows or radio bearers may be used for one service.

Figure 18:
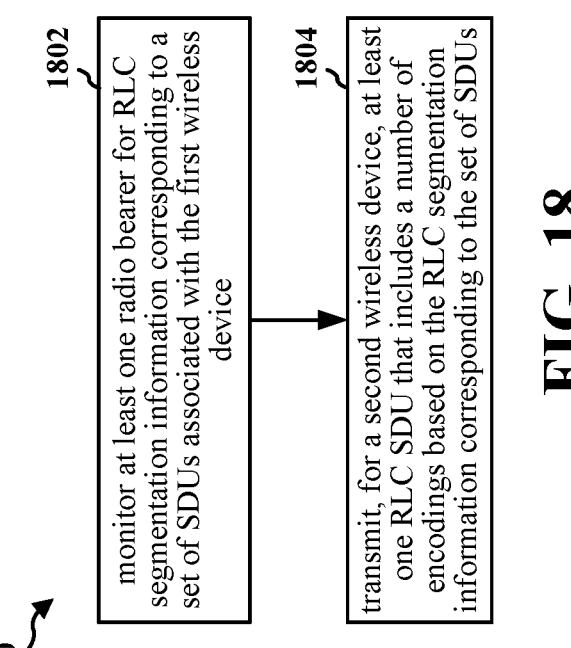
FIG. 18 is a flowchart of a method of wireless communication.

FIG. 18 is a flowchart 1800 of a method of wireless communication. The method may be performed by a first wireless device. The first wireless device may be a RLC transmitter (e.g., the RLC transmitter 1102). The method may be performed by a UE (e.g., the UE 104, the UE 350, the apparatus 3004). The method may be performed by a network node (e.g., the base station 102, the base station 310, the network entity 3102). The method may be associated with various advantages at the first wireless device, such as increased quality of transmitted voice data and/or increased fault tolerance for the transmitted voice data. In an example, the method may be performed by the MDC component 198 or the MDC component 199.

At 1802, the first wireless device monitors at least one radio bearer for RLC segmentation information corresponding to a set of SDUs associated with the first wireless device. For example, FIG. 11 at 1106 shows that the RLC transmitter 1102 may monitor for RLC segmentation information for RLC SDU(s) associated with the RLC transmitter 1102. In an example, the radio bearer may be the DRB 514 and the set of SDUs may be the RLC SDUs 508, 510, 512. In another example, the set of RLC SDUs may include the RLC SDU 802. In an example, 1802 may be performed by the MDC component 198 or the MDC component 199.

At 1804, the first wireless device transmits, for a second wireless device, at least one RLC SDU that includes a number of encodings based on the RLC segmentation information corresponding to the set of SDUs. For example, FIG. 11 at 1114 shows that the RLC transmitter 1102 may transmit RLC SDU(s) for the RLC receiver 1104 that include a number of encodings based on the segmentation information. In an example, the encodings may include the primary encoding 606 and/or the secondary encoding 608. In another example, the encodings may include encoding A 804 and/or encoding B 806. In an example, 1804 may be performed by the MDC component 198 or the MDC component 199.

Figure 19:
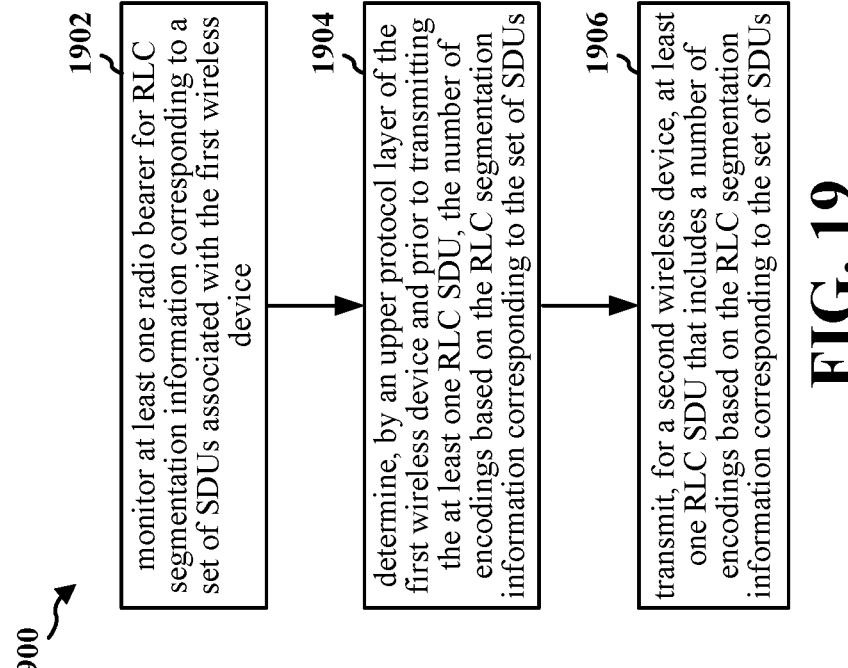
FIG. 19 is a flowchart of a method of wireless communication.

FIG. 19 is a flowchart 1900 of a method of wireless communication. The method may be performed by a first wireless device. The first wireless device may be a RLC transmitter (e.g., the RLC transmitter 1102). The method may be performed by a UE (e.g., the UE 104, the UE 350, the apparatus 3004). The method may be performed by a network node (e.g., the base station 102, the base station 310, the network entity 3102). The method may be associated with various advantages at the first wireless device, such as increased quality of transmitted voice data and/or increased fault tolerance for the transmitted voice data. In an example, the method (including the various aspects detailed below) may be performed by the MDC component 198 or the MDC component 199.

At 1902, the first wireless device monitors at least one radio bearer for RLC segmentation information corresponding to a set of SDUs associated with the first wireless device. For example, FIG. 11 at 1106 shows that the RLC transmitter 1102 may monitor for RLC segmentation information for RLC SDU(s) associated with the RLC transmitter 1102. In an example, the radio bearer may be the DRB 514 and the set of SDUs may be the RLC SDUs 508, 510, 512. In another example, the set of RLC SDUs may include the RLC SDU 802. In an example, 1902 may be performed by the MDC component 198 or the MDC component 199.

At 1906, the first wireless device transmits, for a second wireless device, at least one RLC SDU that includes a number of encodings based on the RLC segmentation information corresponding to the set of SDUs. For example, FIG. 11 at 1114 shows that the RLC transmitter 1102 may transmit RLC SDU(s) for the RLC receiver 1104 that include a number of encodings based on the segmentation information. In an example, the encodings may include the primary encoding 606 and/or the secondary encoding 608. In another example, the encodings may include encoding A 804 and/or encoding B 806. In an example, 1906 may be performed by the MDC component 198 or the MDC component 199.

In one aspect, the RLC segmentation information may include at least one of: a first number of segmentation instances of the set of SDUs, a TBS associated with the set of SDUs, a gap size between an RLC SDU and the TBS, a recommended SDU size, or a minimum TBS indicated by a network. For instance, FIG. 11 at 1106 shows that the RLC segmentation information may include a number of occurrences of RLC segmentation, a TBS associated with RLC SDU(s), a gap size between a RLC SDU and a TBS, a recommended IP packet size, and/or assistance information from a network.

In one aspect, at 1904, a lower protocol layer of the first wireless device monitors the at least one radio bearer for the RLC segmentation information and the first wireless device may determine, by an upper protocol layer of the first wireless device and prior to transmitting the at least one RLC SDU, the number of encodings based on the RLC segmentation information corresponding to the set of SDUs. For example, FIG. 11 at 1106 shows that a lower protocol layer of the RLC transmitter 1102 may monitor a radio bearer for RLC segmentation information. Furthermore, FIG. 11 at 1110 shows that the RLC transmitter 1102 may determine, at upper layer(s), the number of encodings. In another example, the lower protocol layer may be the RLC layer 406, the PDCP layer 408, or the SDAP layer 410. In a further example, the upper protocol layer may be a layer that is higher than the RLC layer 406, the PDCP layer 408, or the SDAP layer 410. For instance, the upper protocol layer may be the RTP layer 414 or the AS layer 416. In an example, 1904 may be performed by the MDC component 198 or the MDC component 199.

In one aspect, the encodings may be MDC encodings, where the MDC encodings may correspond to an input speech frame associated with the first wireless device. For example, the encodings may include the primary encoding 606 and the secondary encoding 608, where the primary encoding 606 and the secondary encoding 608 may be MDC encodings. In another example, the input speech frame may be the input speech frame 602.

In one aspect, monitoring the at least one radio bearer for the RLC segmentation information may occur within a monitor window. For example, FIG. 11 shows that the RLC transmitter 1102 may monitor a radio bearer for RLC segmentation information within a monitoring window.

In one aspect, the at least one RLC SDU does not include SDU segments. For example, the RLC SDU(s) transmitted at 1114 may not include SDU segments.

In one aspect, the number of encodings is less than a threshold. For example, the number of encodings determined at 1110 may be less than a threshold.

Figure 20:
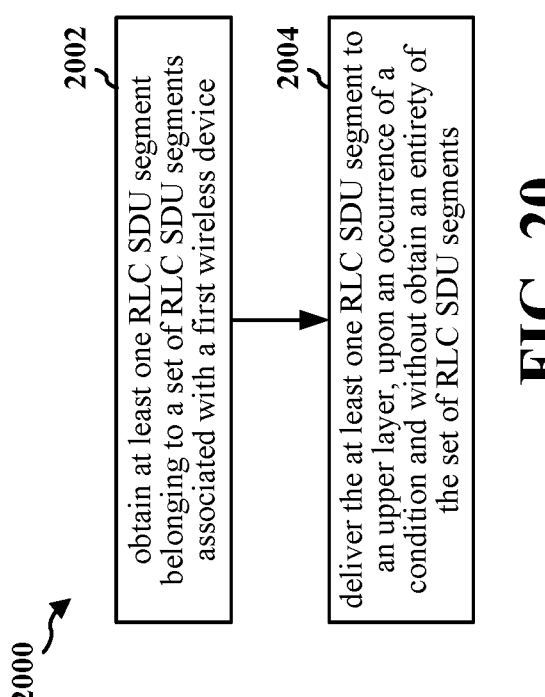
FIG. 20 is a flowchart of a method of wireless communication.

FIG. 20 is a flowchart 2000 of a method of wireless communication. The method may be performed by a second wireless device. The second wireless device may be a RLC receiver (e.g., the RLC receiver 1204). The method may be performed by a UE (e.g., the UE 104, the UE 350, the apparatus 3004). The method may be performed by a network node (e.g., the base station 102, the base station 310, the network entity 3102). The method may be associated with various advantages at the second wireless device, such as increased quality of received voice data and/or increased fault tolerance for the received voice data. In an example, the method may be performed by the MDC component 198 or the MDC component 199.

At 2002, the second wireless device obtains at least one RLC SDU segment belonging to a set of RLC SDU segments associated with a first wireless device. For example, FIG. 12 at 1208 shows that the RLC receiver 1204 may receive RLC SDU segment(s) that belong to a set of RLC SDU segments associated with the RLC transmitter 1202. In another example, the at least one RLC SDU segment may be the first RLC SDU segment 808 and/or the second RLC SDU segment 810. In yet another example, the at least one RLC SDU segment may include the SDU segment 528 and/or the SDU segment 530. In an example, 2002 may be performed by the MDC component 198 or the MDC component 199.

At 2004, the second wireless device delivers the at least one RLC SDU segment to an upper layer, upon an occurrence of a condition and without obtain an entirety of the set of RLC SDU segments. For example, FIG. 12 at 1214 shows that the RLC receiver 1204 may deliver received RLC SDU segment(s) to an upper layer upon an occurrence of a condition instead of discarding the received RLC SDU segment(s). In an example, the RLC receiver 1204 may deliver the at least one RLC SDU segment at 1214 without obtaining an entirety of the set of RLC SDU segments. In another example, the lower protocol layer may be the RLC layer 406, the PDCP layer 408, or the SDAP layer 410. In a further example, the upper protocol layer may be a layer that is higher than the RLC layer 406, the PDCP layer 408, or the SDAP layer 410. For instance, the upper protocol layer may be the RTP layer 414 or the AS layer 416. In an example, 2004 may be performed by the MDC component 198 or the MDC component 199.

FIG. 21 is a flowchart 2100 of a method of wireless communication. The method may be performed by a second wireless device. The second wireless device may be a RLC receiver (e.g., the RLC receiver 1104). The method may be performed by a UE (e.g., the UE 104, the UE 350, the apparatus 3004). The method may be performed by a network node (e.g., the base station 102, the base station 310, the network entity 3102). The method may be associated with various advantages at the second wireless device, such as increased quality of received voice data and/or increased fault tolerance for the received voice data. In an example, the method (including the various aspects detailed below) may be performed by the MDC component 198 or the MDC component 199.

At 2102, the second wireless device obtains at least one RLC SDU segment belonging to a set of RLC SDU segments associated with a first wireless device. For example, FIG. 12 at 1208 shows that the RLC receiver 1204 may receive RLC SDU segment(s) that belong to a set of RLC SDU segments associated with the RLC transmitter 1202. In another example, the at least one RLC SDU segment may be the first RLC SDU segment 808 and/or the second RLC SDU segment 810. In yet another example, the at least one RLC SDU segment may include the SDU segment 528 and/or the SDU segment 530. In an example, 2102 may be performed by the MDC component 198 or the MDC component 199.

At 2104, the second wireless device delivers the at least one RLC SDU segment to an upper layer, upon an occurrence of a condition and without obtain an entirety of the set of RLC SDU segments. For example, FIG. 12 at 1214 shows that the RLC receiver 1204 may deliver received RLC SDU segment(s) to an upper layer upon an occurrence of a condition instead of discarding the received RLC SDU segment(s). In an example, the RLC receiver 1204 may deliver the at least one RLC SDU segment at 1214 without obtaining an entirety of the set of RLC SDU segments. In another example, the lower protocol layer may be the RLC layer 406, the PDCP layer 408, or the SDAP layer 410. In a further example, the upper protocol layer may be a layer that is higher than the RLC layer 406, the PDCP layer 408, or the SDAP layer 410. For instance, the upper protocol layer may be the RTP layer 414 or the AS layer 416. In an example, 2104 may be performed by the MDC component 198 or the MDC component 199.

In one aspect, the occurrence of the condition may include a timer expiring, a re-establishment of an RLC entity, a release of the RLC entity, or a reception of an explicit indication. For example, FIG. 12 at 1214 shows that the condition may include a t-reassembly timer expiring, a RLC re-establishment, a RLC release, or a reception of an explicit indication.

In one aspect, at 2108, the at least one RLC SDU segment may be associated with a plurality of data fields and the second wireless device may reconstruct, at the upper layer, at least one of the plurality of data fields based on the at least one RLC SDU segment without receiving the entirety of the set of the RLC SDU segments. For example, the plurality of data fields may include the primary encoding 606 and the secondary encoding 608. In another example, the plurality of data fields may include encoding A 804 and encoding B 806. In a further example, FIG. 12 at 1218 shows that the RLC receiver 1204 may reconstruct encodings based on RLC SDU segment(s) received from lower layers. In an example, the reconstruction at 1218 may be performed without receiving an entirety of the RLC SDU segment(s). In an example, 2108 may be performed by the MDC component 198 or the MDC component 199.

In one aspect, at 2106 the second wireless device may obtain, prior to reconstructing the at least one of the plurality of data fields, boundary information associated with boundaries of each of the plurality of data fields associated with the at least one RLC SDU segment, where reconstructing the at least one of the plurality of data fields may be further based on the boundary information. For example, FIG. 12 at 1210 shows that the RLC receiver 1204 may receive boundary information from the RLC transmitter 1202, where the boundary information may be associated with the encodings included in the RLC SDU segment(s). Furthermore, FIG. 12 at 1218 shows that the RLC receiver 1204 may reconstruct the encodings based on the boundary information received at 1210. In an example, 2106 may be performed by the MDC component 198 or the MDC component 199.

In one aspect, the boundary information may be included in a control PDU or a RLC header. For example, the boundary information may be included in the RLC control PDU 1302 or the RLC header 1402.

In one aspect, the RLC header may include a field that indicates that the RLC header includes the boundary information. For example, the field that indicates that the RLC header includes the boundary information may be the B field 1408.

In one aspect, at 2108A, the at least one RLC SDU segment may be obtained at a lower protocol layer of the second wireless device, and reconstructing the at least one of the plurality of data fields based on the at least one RLC SDU segment may include: delivering the at least one RLC SDU segment to an upper protocol layer of the second wireless device if the at least one RLC SDU segment includes a SDAP header, a PDCP header, a ROHC header, and a first data field, where reconstructing the at least one of the plurality of data fields may occur at the upper protocol layer. For example, FIG. 12 at 1214 shows that the RLC SDU segment(s) may be delivered from a lower protocol layer to an upper protocol layer if the RLC SDU segment(s) include certain information, such as a SDAP header, a PDCP header, a ROHC header, and a first encoding (i.e., a first data field). Furthermore, FIG. 12 at 1218 shows that the encodings may be reconstructed at an upper layer. In an example, 2108A may be performed by the MDC component 198 or the MDC component 199.

In one aspect, the plurality of data fields may be MDC encodings, where the MDC encodings may correspond to an input speech frame associated with the first wireless device. For example, the encodings may include the primary encoding 606 and the secondary encoding 608, where the primary encoding 606 and the secondary encoding 608 may be MDC encodings. In another example, the input speech frame may be the input speech frame 602.

FIG. 22 is a flowchart 2200 of a method of wireless communication. The method may be performed by a UE (e.g., the UE 104, the UE 350, the UE 1502, the apparatus 3004). The method may be associated with various advantages at the UE, such as increased quality of transmitted voice data or received voice data and/or increased fault tolerance for the transmitted voice data or the received voice data. In an example, the method may be performed by the MDC component 198

At 2202, the UE transmits, for a network node, an indication of a gap between a first encoding of a data packet and a second encoding of the data packet associated with the UE. For example, FIG. 15 at 1510A shows that the UE 1502 may transmit, for the base station 1504, an indication of a gap between a first encoding of a data packet and a second encoding of the data packet. In an example, the first encoding may be the primary encoding 606 and the second encoding may be the secondary encoding 608. In a further example, the first encoding may be encoding A 804 and the second encoding may be encoding B 806. In an example, 2202 may be performed by the MDC component 198.

At 2204, the UE receives scheduling for at least one of DL or UL transmissions based on the indication of the gap, where the scheduling indicates that the first encoding and the second encoding of the data packet are scheduled for transmission or reception in different slots or different subframes. For example, FIG. 15 at 1520 shows that the UE 1502 may receive scheduling for DL transmissions and/or UL transmissions indicating that the first encoding and the second encoding are scheduled for transmission or reception in different slots or different subframes. In an example, 2204 may be performed by the MDC component.

Figure 23:
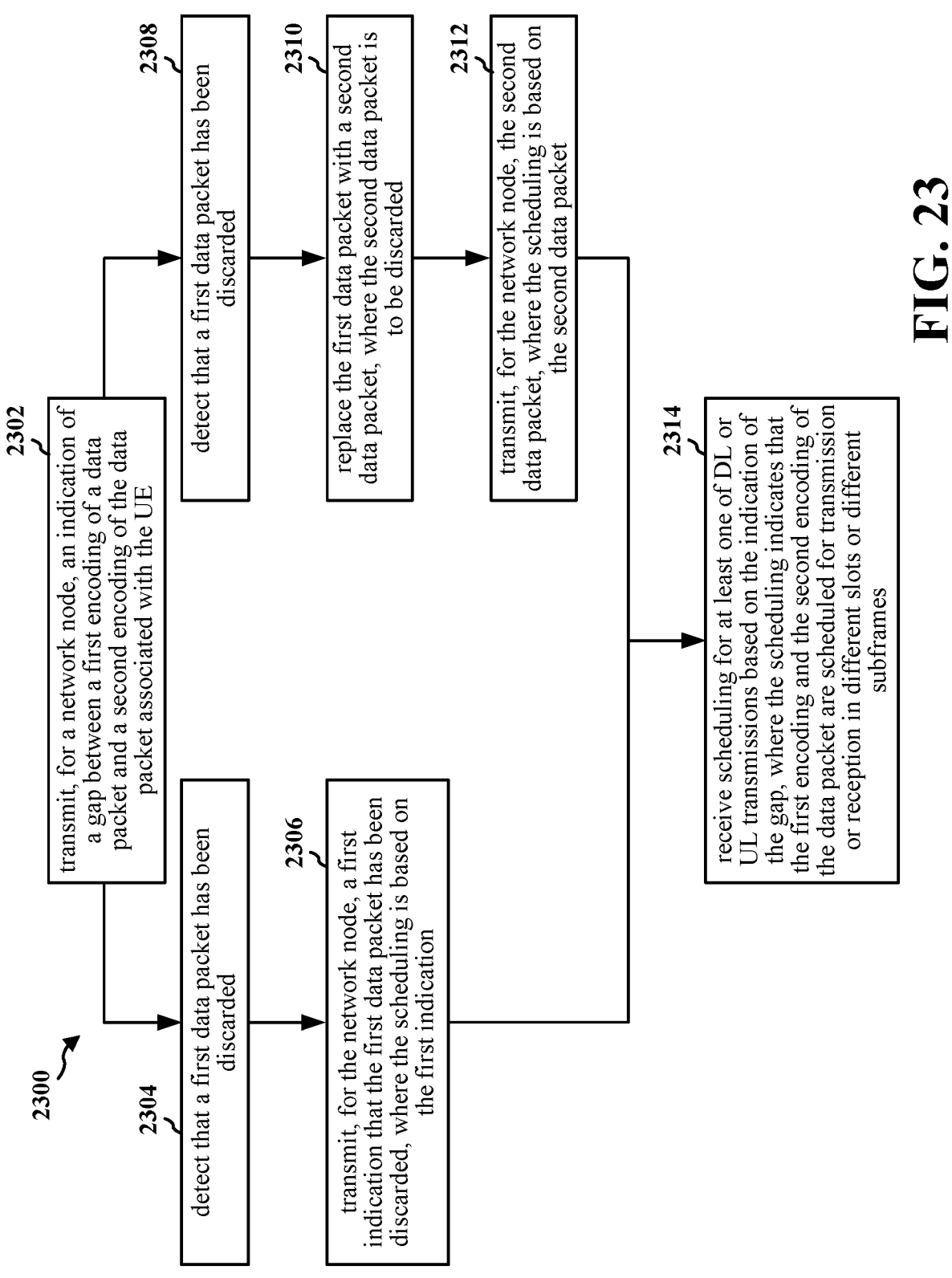
FIG. 23 is a flowchart of a method of wireless communication.

FIG. 23 is a flowchart 2300 of a method of wireless communication. The method may be performed by a UE (e.g., the UE 104, the UE 350, the UE 1502, the apparatus 3004). The method may be associated with various advantages at the UE, such as increased quality of transmitted voice data or received voice data and/or increased fault tolerance for the transmitted voice data or the received voice data. In an example, the method (including the various aspects detailed below) may be performed by the MDC component 198

At 2302, the UE transmits, for a network node, an indication of a gap between a first encoding of a data packet and a second encoding of the data packet associated with the UE. For example, FIG. 15 at 1510A shows that the UE 1502 may transmit, for the base station 1504, an indication of a gap between a first encoding of a data packet and a second encoding of the data packet. In an example, the first encoding may be the primary encoding 606 and the second encoding may be the secondary encoding 608. In a further example, the first encoding may be encoding A 804 and the second encoding may be encoding B 806. In an example, 2302 may be performed by the MDC component 198.

At 2314, the UE receives scheduling for at least one of DL or UL transmissions based on the indication of the gap, where the scheduling indicates that the first encoding and the second encoding of the data packet are scheduled for transmission or reception in different slots or different subframes. For example, FIG. 15 at 1520 shows that the UE 1502 may receive scheduling for DL transmissions and/or UL transmissions indicating that the first encoding and the second encoding are scheduled for transmission or reception in different slots or different subframes. In an example, 2314 may be performed by the MDC component 198.

In one aspect, the indication of the gap may be indicative of: a RTP SN gap, a RTP time-stamp gap, a number of data packets associated with the gap, or a time period associated with the gap. For example, FIG. 15 at 1510A shows that the indication of the gap may be indicative of a RTP SN gap, a RTP time-stamp gap, a number of data packets of the gap, or a time period of the gap. In a further example, the RTP SN gap and the RTP time-stamp gap may be associated with the RTP layer 414.

In one aspect, the indication of the gap may be transmitted periodically or upon an occurrence of an event. For example, FIG. 15 at 1510A shows that the UE 1502 may transmit the indication of the gap periodically or upon an occurrence of an event.

In one aspect, at 2304, the UE may detect that a first data packet has been discarded. For example, FIG. 15 at 1512A shows that the UE 1502 may detect that a first data packet has been discarded. In an example, 2304 may be performed by the MDC component 198.

In one aspect, at 2306, the UE may transmit, for the network node, a first indication that the first data packet has been discarded, where the scheduling may be based on the first indication. For example, FIG. 15 at 1516A shows that the UE 1502 may transmit, for the base station 1504, an indication that the first data packet has been discarded. Furthermore, FIG. 15 shows that the scheduling may be based on the indication transmitted at 1516A. In an example, 2306 may be performed by the MDC component 198.

In one aspect, at 2308, the UE may detect that a first data packet has been discarded. For example, FIG. 15 at 1512A shows that the UE 1502 may detect that a first data packet has been discarded. In an example, 2308 may be performed by the MDC component 198.

In one aspect, at 2310, the UE may replace the first data packet with a second data packet, where the second data packet is to be discarded. For example, FIG. 15 at 1514A shows that the UE 1502 may replace the first data packet with a second data packet that is to be discarded. In an example, 2310 may be performed by the MDC component 198.

In one aspect, at 2312, the UE may transmit, for the network node, the second data packet, where the scheduling may be based on the second data packet. For example, FIG. 15 at 1516A shows that the UE 1502 may transmit, for the base station 1504, the second data packet. Furthermore, FIG. 15 shows that the scheduling may be based on the second data packet transmitted at 1516A. In an example, 2312 may be performed by the MDC component 198.

FIG. 24 is a flowchart 2400 of a method of wireless communication. The method may be performed by a network node (e.g., the base station 102, the base station 310, the base station 1504, the network entity 3102). The method may be associated with various advantages at the network node, such as the facilitation of transmission/reception of higher quality voice data and/or voice data that has increased fault tolerance. In an example, the method may be performed by the MDC component 199.

At 2402, the network node receives an indication of a gap between a first encoding of a data packet and a second encoding of the data packet associated with a UE. For example, FIG. 15 at 1510A or 1510B shows that the base station 1504 may receive an indication of a gap between a first encoding and a second encoding of a data packet associated with the UE 1502. In an example, the first encoding may be the primary encoding 606 and the second encoding may be the secondary encoding 608. In a further example, the first encoding may be encoding A 804 and the second encoding may be encoding B 806. In an example, 2402 may be performed by the MDC component 199.

At 2404, the network node transmits, for the UE, scheduling for at least one of DL or UL transmissions of the UE based on the indication of the gap, where the scheduling indicates that the first encoding and the second encoding of the data packet are scheduled for transmission or reception in different slots or different subframes. For example, FIG. 15 at 1520 shows that the base station 1504 may transmit scheduling for DL transmissions and/or UL transmissions indicating that the first encoding and the second encoding are scheduled for transmission or reception in different slots or different subframes. In an example, 2404 may be performed by the MDC component 199.

FIG. 25 is a flowchart 2500 of a method of wireless communication. The method may be performed by a network node (e.g., the base station 102, the base station 310, the base station 1504, the network entity 3102). The method may be associated with various advantages at the network node, such as the facilitation of transmission/reception of higher quality voice data and/or voice data that has increased fault tolerance. In an example, the method (including the various aspects detailed below) may be performed by the MDC component 199.

At 2502, the network node receives an indication of a gap between a first encoding of a data packet and a second encoding of the data packet associated with a UE. For example, FIG. 15 at 1510A or 1510B shows that the base station 1504 may receive an indication of a gap between a first encoding and a second encoding of a data packet associated with the UE 1502. In an example, the first encoding may be the primary encoding 606 and the second encoding may be the secondary encoding 608. In a further example, the first encoding may be encoding A 804 and the second encoding may be encoding B 806. In an example, 2502 may be performed by the MDC component 199.

At 2506, the network node transmits, for the UE, scheduling for at least one of DL or UL transmissions of the UE based on the indication of the gap, where the scheduling indicates that the first encoding and the second encoding of the data packet are scheduled for transmission or reception in different slots or different subframes. For example, FIG. 15 at 1520 shows that the base station 1504 may transmit scheduling for DL transmissions and/or UL transmissions indicating that the first encoding and the second encoding are scheduled for transmission or reception in different slots or different subframes. In an example, 2506 may be performed by the MDC component 199.

In one aspect, the indication of the gap may be indicative of: a RTP SN gap, a RTP time-stamp gap, a number of data packets associated with the gap, or a time period associated with the gap. For example, FIG. 15 at 1510A (or 1510B) shows that the indication of the gap may be indicative of a RTP SN gap, a RTP time-stamp gap, a number of data packets of the gap, or a time period of the gap. In a further example, the RTP SN gap and the RTP time-stamp gap may be associated with the RTP layer 414.

In one aspect, the indication of the gap may be received periodically or upon an occurrence of an event. For example, FIG. 15 at 1510A (or 1510B) shows that the base station 1504 may receive the indication of the gap periodically or upon an occurrence of an event.

In one aspect, at 2504, the network node may obtain a first indication that a first data packet has been discarded, where the scheduling may be based on the first indication. For example, FIG. 15 at 1516A shows that the base station 1504 may receive an indication that a first data packet has been discarded. In another example, FIG. 15 at 1516B shows that the base station 1504 may receive an indication that a first data packet has been discarded. Furthermore, FIG. 15 at 1518 shows that the scheduling may be based on the indication that the first data packet has been discarded. In an example, 2504 may be performed by the MDC component 199.

FIG. 26 is a flowchart 2600 of a method of wireless communication. The method may be performed by a first wireless device (e.g., the first wireless device 1602). The method may be performed by a UE (e.g., the UE 104, the UE 350, the apparatus 3004). The method may be performed by a network node (e.g., the base station 102, the base station 310, the network entity 3102). The method may be associated with various advantages at the first wireless device, such as increased quality of transmitted voice data and/or increased fault tolerance for the transmitted voice data. In an example, the method may be performed by the MDC component 198 or the MDC component 199.

At 2602, the first wireless device establishes a plurality of channels including a first logical channel and a second logical channel based on an indication of a gap between a first encoding of a data packet and a second encoding of the data packet associated with the first wireless device. For example, FIG. 16 at 1610 shows that the first wireless device 1602 may establish channels including a first logical channel and a second logical channel based on an indication of a gap between a first encoding of a data packet and a second encoding of the data packet, where the indication may be obtained at 1606. In another example, the plurality of channels may include channels depicted in FIG. 17. In yet another example, the first logical channel and the second logical channel may correspond to "LC1" and "LC2," respectively, in FIG. 17. In an example, the first encoding may be the primary encoding 606 and the second encoding may be the secondary encoding 608. In a further example, the first encoding may be encoding A 804 and the second encoding may be encoding B 806. In an example, 2602 may be performed by the MDC component 198 or the MDC component 199.

At 2604, the first wireless device maps the first encoding to the first logical channel and the second encoding to the second logical channel. For example, FIG. 16 at 1612 shows that the first wireless device 1602 may map the first encoding to the first logical channel and the second encoding to the second logical channel. In an example, 2604 may be performed by the MDC component 198 or the MDC component 199.

At 2606, the first wireless device transmits, for a second wireless device, the first encoding and the second encoding in different slots or different subframes based on the first encoding being mapped to the first logical channel and the second encoding being mapped to the second logical channel. For example, FIG. 16 at 1614 shows that the first wireless device 1602 may transmit, for the second wireless device 1604, the first encoding and the second encoding in different slots or different subframes based on the mapping performed at 1612. In an example, 2606 may be performed by the MDC component 198 or the MDC component 199.

FIG. 27 is a flowchart 2700 of a method of wireless communication. The method may be performed by a first wireless device (e.g., the first wireless device 1602). The method may be performed by a UE (e.g., the UE 104, the UE 350, the apparatus 3004). The method may be performed by a network node (e.g., the base station 102, the base station 310, the network entity 3102). The method may be associated with various advantages at the first wireless device, such as increased quality of transmitted voice data and/or increased fault tolerance for the transmitted voice data. In an example, the method (including the various aspects detailed below) may be performed by the MDC component 198 or the MDC component 199.

At 2706, the first wireless device establishes a plurality of channels including a first logical channel and a second logical channel based on an indication of a gap between a first encoding of a data packet and a second encoding of the data packet associated with the first wireless device. For example, FIG. 16 at 1610 shows that the first wireless device 1602 may establish channels including a first logical channel and a second logical channel based on an indication of a gap between a first encoding of a data packet and a second encoding of the data packet, where the indication may be obtained at 1606. In another example, the plurality of channels may include channels depicted in FIG. 17. In yet another example, the first logical channel and the second logical channel may correspond to "LC1" and "LC2," respectively, in FIG. 17. In an example, the first encoding may be the primary encoding 606 and the second encoding may be the secondary encoding 608. In a further example, the first encoding may be encoding A 804 and the second encoding may be encoding B 806. In an example, 2706 may be performed by the MDC component 198 or the MDC component 199.

At 2708, the first wireless device maps the first encoding to the first logical channel and the second encoding to the second logical channel. For example, FIG. 16 at 1612 shows that the first wireless device 1602 may map the first encoding to the first logical channel and the second encoding to the second logical channel. In an example, 2708 may be performed by the MDC component 198 or the MDC component 199.

At 2710, the first wireless device transmits, for a second wireless device, the first encoding and the second encoding in different slots or different subframes based on the first encoding being mapped to the first logical channel and the second encoding being mapped to the second logical channel. For example, FIG. 16 at 1614 shows that the first wireless device 1602 may transmit, for the second wireless device 1604, the first encoding and the second encoding in different slots or different subframes based on the mapping performed at 1612. In an example, 2710 may be performed by the MDC component 198 or the MDC component 199.

In one aspect, mapping the first encoding to the first logical channel and the second encoding to the second logical channel occurs at a routing point associated with a protocol layer. For example, FIG. 16 at 1612 shows that the first encoding and the second encoding may be mapped to the first logical channel and the second logical channel, respectively, at a routing point. In another example, the routing point may be the routing/aggregation point 1710 in the first example 1702, the second example 1704, the third example 1706, or the fourth example 1708 depicted in FIG. 17.

In one aspect, the protocol layer may be: a RLC layer, a PDCP layer, a SDAP layer, or a layer that is higher than the SDAP layer. For example, FIG. 17 shows that the protocol layer may be a RLC layer, a PDCP layer, a SDAP layer, or an additional adaptation layer (i.e., a layer that is higher than the SDAP layer).

In one aspect, at 2702, the first wireless device may be a UE and the second wireless device may be a network node, and the first wireless device may transmit, for the network node, the indication of the gap. For example, FIG. 17 at 1609 shows that the first wireless device may transmit the indication of the gap to the second wireless device 1604, where the first wireless device 1602 may be a UE and the second wireless device 1604 may be a network node. In an example, 2702 may be performed by the MDC component 198.

In one aspect, at 2704, the first wireless device may be a network node and the second wireless device is a UE and the first wireless device may receive the indication of the gap. For example, FIG. 17 at 1608 shows that the first wireless device 1602 may receive the indication of the gap from the second wireless device 1604, where the first wireless device 1602 may be a network node and the second wireless device 1604 may be a UE. In an example, 2704 may be performed by the MDC component 199.

In one aspect, the indication of the gap may be received from the UE or from a core network. For example, obtaining the indication of the gap at 1606 may include receiving the indication of the gap from a UE or a core network.

In one aspect, the indication of the gap may be indicative of: a RTP SN gap, a RTP time-stamp gap, a number of data packets associated with the gap, or a time period associated with the gap. For example, FIG. 16 at 1606 shows that the indication of the gap may be a RTP SN gap, a RTP time-stamp gap, a number of data packets of the gap, or a time period of the gap. In a further example, the RTP SN gap and the RTP time-stamp gap may be associated with the RTP layer 414.

FIG. 28 is a flowchart 2800 of a method of wireless communication. The method may be performed by a second wireless device (e.g., the second wireless device 1604). The method may be performed by a UE (e.g., the UE 104, the UE 350, the apparatus 3004). The method may be performed by a network node (e.g., the base station 102, the base station 310, the network entity 3102). The method may be associated with various advantages at the second wireless device, such as increased quality of received voice data and/or increased fault tolerance for the received voice data. In an example, the method may be performed by the MDC component 198 or the MDC component 199.

At 2802, the second wireless device receives, in different slots or different subframes, a first encoding of a data packet and a second encoding of the data packet associated with a first wireless device, where the first encoding is associated with a first logical channel and the second encoding is associated with a second logical channel. For example, FIG. 16 at 1614 shows that the second wireless device 1604 may receive, in different slots or different subframes, a first encoding of a data packet and a second encoding of the data packet associated with the first wireless device 1602. Furthermore, FIG. 16 illustrates that the first encoding may be associated with a first logical channel and the second encoding may be associated with a second logical channel. In an example, the first logical channel and the second logical channel may respectively correspond to "LC1" and "LC2" depicted in FIG. 17. In an example, the first encoding may be the primary encoding 606 and the second encoding may be the secondary encoding 608. In a further example, the first encoding may be encoding A 804 and the second encoding may be encoding B 806. In an example, 2802 may be performed by the MDC component 198 or the MDC component 199.

At 2804, the second wireless device aggregates the first encoding of the data packet and the second encoding of the data packet into a QoS flow. For example, FIG. 16 at 1616 shows that the second wireless device 1604 may aggregate the first encoding of the data packet and the second encoding of the data packet into a QoS flow. In an example, 2804 may be performed by the MDC component 198 or the MDC component 199.

Figure 29:
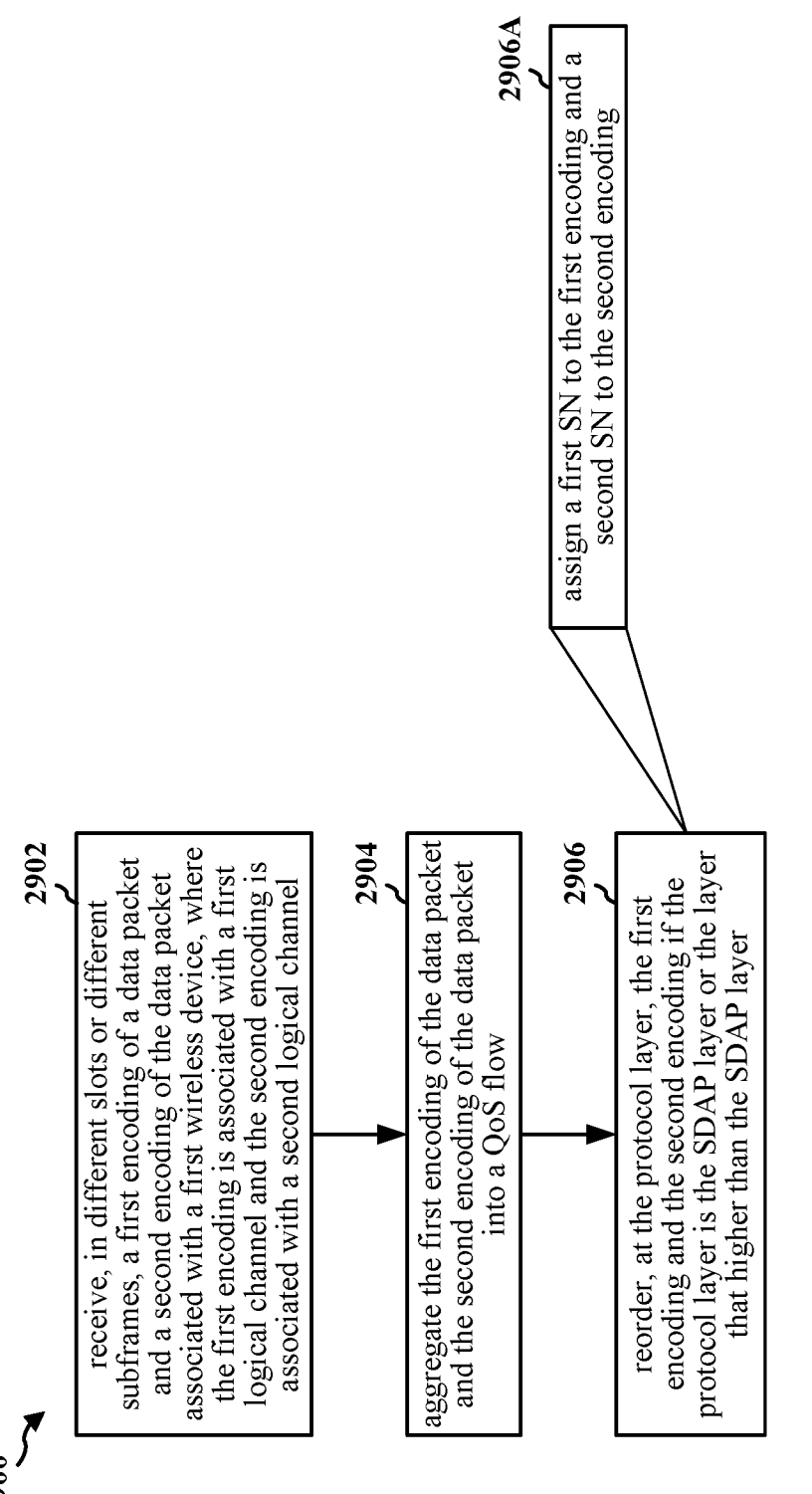
FIG. 29 is a flowchart of a method of wireless communication.

FIG. 29 is a flowchart 2900 of a method of wireless communication. The method may be performed by a second wireless device (e.g., the second wireless device 1604). The method may be performed by a UE (e.g., the UE 104, the UE 350, the apparatus 3004). The method may be performed by a network node (e.g., the base station 102, the base station 310, the network entity 3102). The method may be associated with various advantages at the second wireless device, such as increased quality of received voice data and/or increased fault tolerance for the received voice data. In an example, the method (including the various aspects detailed below) may be performed by the MDC component 198 or the MDC component 199.

At 2902, the second wireless device receives, in different slots or different subframes, a first encoding of a data packet and a second encoding of the data packet associated with a first wireless device, where the first encoding is associated with a first logical channel and the second encoding is associated with a second logical channel. For example, FIG. 16 at 1614 shows that the second wireless device 1604 may receive, in different slots or different subframes, a first encoding of a data packet and a second encoding of the data packet associated with the first wireless device 1602. Furthermore, FIG. 16 illustrates that the first encoding may be associated with a first logical channel and the second encoding may be associated with a second logical channel. In an example, the first logical channel and the second logical channel may respectively correspond to "LC1" and "LC2" depicted in FIG. 17. In an example, the first encoding may be the primary encoding 606 and the second encoding may be the secondary encoding 608. In a further example, the first encoding may be encoding A 804 and the second encoding may be encoding B 806. In an example, 2902 may be performed by the MDC component 198 or the MDC component 199.

At 2904, the second wireless device aggregates the first encoding of the data packet and the second encoding of the data packet into a QoS flow. For example, FIG. 16 at 1616 shows that the second wireless device 1604 may aggregate the first encoding of the data packet and the second encoding of the data packet into a QoS flow. In an example, 2904 may be performed by the MDC component 198 or the MDC component 199.

In one aspect, aggregating the first encoding and the second encoding may occur at an aggregation point associated with a protocol layer. For example, FIG. 16 at 1616 shows that aggregating the first encoding and the second encoding may occur at an aggregation point. In another example, the aggregation point may be the routing/aggregation point 1710 in the first example 1702, the second example 1704, the third example 1706, or the fourth example 1708 depicted in FIG. 17.

In one aspect, the protocol layer may be: a RLC layer, a PDCP layer, a SDAP layer, or a layer that is higher than the SDAP layer. For example, FIG. 17 shows that the protocol layer may be a RLC layer, a PDCP layer, a SDAP layer, or an additional adaptation layer (i.e., a layer that is higher than the SDAP layer).

In one aspect, at 2906, the second wireless device may reorder, at the protocol layer, the first encoding and the second encoding if the protocol layer is the SDAP layer or the layer that higher than the SDAP layer. For example, FIG. 16 at 1618 shows that the second wireless device 1604 may reorder the first encoding and the second encoding at a protocol layer if the protocol layer is a SDAP layer or a layer that is higher than the SDAP layer. In an example, the SDAP layer may be the SDAP layer 410 and the layer that is higher than the SDAP layer may be the RTP layer 414 or the AS layer 416. In an example, 2906 may be performed by the MDC component 198 or the MDC component 199.

In one aspect, at 2906A, reordering the first encoding and the second encoding may include assigning a first SN to the first encoding and a second SN to the second encoding. For example, FIG. 16 at 1618 shows that reordering the first encoding and the second encoding may include assigning a first SN to the first encoding and a second SN to the second encoding. In an example, 2906A may be performed by the MDC component 198 or the MDC component 199.

Figure 30:
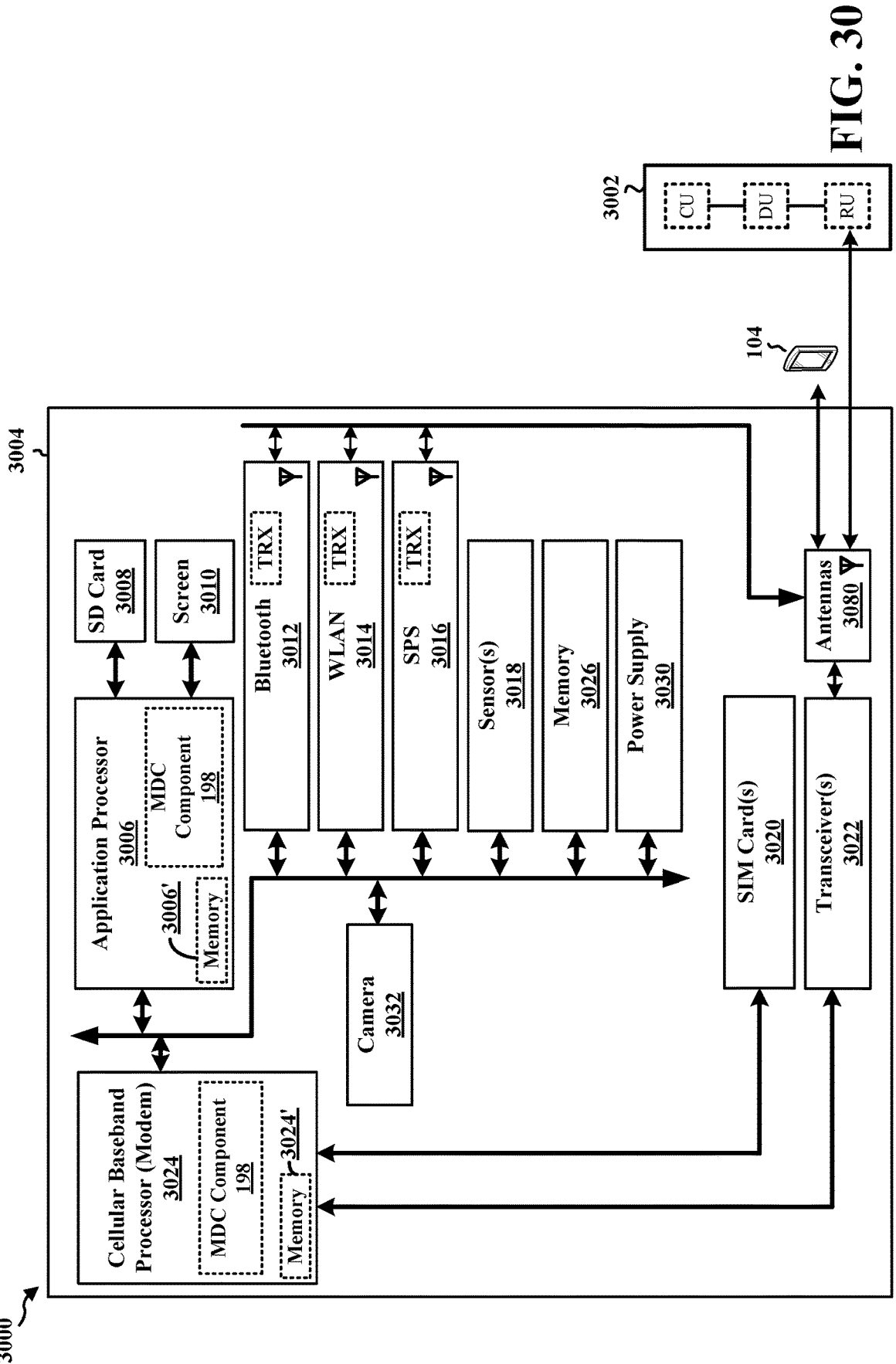
FIG. 30 is a diagram illustrating an example of a hardware implementation for an example apparatus.

FIG. 30 is a diagram 3000 illustrating an example of a hardware implementation for an apparatus 3004. The apparatus 3004 may be a UE, a component of a UE, or may implement UE functionality. In some aspects, the apparatus 3004 may include a cellular baseband processor 3024 (also referred to as a modem) coupled to one or more transceivers 3022 (e.g., cellular RF transceiver). The cellular baseband processor 3024 may include on-chip memory 3024'. In some aspects, the apparatus 3004 may further include one or more subscriber identity modules (SIM) cards 3020 and an application processor 3006 coupled to a secure digital (SD) card 3008 and a screen 3010. The application processor 3006 may include on-chip memory 3006'. In some aspects, the apparatus 3004 may further include a Bluetooth module 3012, a WLAN module 3014, an SPS module 3016 (e.g., GNSS module), one or more sensor modules 3018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 3026, a power supply 3030, and/or a camera 3032. The Bluetooth module 3012, the WLAN module 3014, and the SPS module 3016 may include an on-chip transceiver (TRX) (or in some cases, just a receiver (RX)). The Bluetooth module 3012, the WLAN module 3014, and the SPS module 3016 may include their own dedicated antennas and/or utilize the antennas 3080 for communication. The cellular baseband processor 3024 communicates through the transceiver(s) 3022 via one or more antennas 3080 with the UE 104 and/or with an RU associated with a network entity 3002. The cellular baseband processor 3024 and the application processor 3006 may each include a computer-readable medium/memory 3024', 3006', respectively. The additional memory modules 3026 may also be considered a computer-readable medium/memory. Each computer-readable medium/memory 3024', 3006', 3026 may be non-transitory. The cellular baseband processor 3024 and the application processor 3006 are each responsible for general processing, including the execution of software stored on the computer-readable medium/memory. The software, when executed by the cellular baseband processor 3024/application processor 3006, causes the cellular baseband processor 3024/application processor 3006 to perform the various functions described supra. The computer-readable medium/memory may also be used for storing data that is manipulated by the cellular baseband processor 3024/application processor 3006 when executing software. The cellular baseband processor 3024/application processor 3006 may be a component of the UE 350 and may include the memory 360 and/or at least one of the TX processor 368, the RX processor 356, and the controller/processor 359. In one configuration, the apparatus 3004 may be a processor chip (modem and/or application) and include just the cellular baseband processor 3024 and/or the application processor 3006, and in another configuration, the apparatus 3004 may be the entire UE (e.g., see 350 of FIG. 3) and include the additional modules of the apparatus 3004.

As discussed supra, the MDC component 198 is configured to monitor at least one radio bearer for RLC segmentation information corresponding to a set of SDUs associated with the first wireless device. The MDC component 198 is configured to transmit, for a second wireless device, at least one RLC SDU that includes a number of encodings based on the RLC segmentation information corresponding to the set of SDUs. The MDC component 198 is configured to determine, by an upper protocol layer of the first wireless device and prior to transmitting the at least one RLC SDU, the number of encodings based on the RLC segmentation information corresponding to the set of SDUs. The MDC component 198 is configured to obtain at least one RLC SDU segment belonging to a set of RLC SDU segments associated with a first wireless device. The MDC component 198 is configured to deliver the at least one RLC SDU segment to an upper layer, upon an occurrence of a condition and without obtaining an entirety of the set of RLC SDU segments. The MDC component 198 is configured to reconstruct, at the upper layer, at least one of the plurality of data fields based on the at least one RLC SDU segment and without receiving the entirety of the set of the RLC SDU segments. The MDC component 198 is configured to obtain, prior to reconstructing the at least one of the plurality of data fields, boundary information associated with boundaries of each of the plurality of data fields associated with the at least one RLC SDU segment, where reconstructing the at least one of the plurality of data fields is further based on the boundary information. The MDC component 198 is configured to deliver the at least one RLC SDU segment to an upper protocol layer of the second wireless device if the at least one RLC SDU segment includes a SDAP header, a PDCP header, a ROHC header, and a first data field, where reconstructing the at least one of the plurality of data fields occurs at the upper protocol layer. The MDC component 198 is configured to transmit, for a network node, an indication of a gap between a first encoding of a data packet and a second encoding of the data packet associated with the UE. The MDC component 198 is configured to receive scheduling for at least one of DL or UL transmissions based on the indication of the gap, where the scheduling indicates that the first encoding and the second encoding of the data packet are scheduled for transmission or reception in different slots or different subframes. The MDC component 198 is configured to detect that a first data packet has been discarded. The MDC component 198 is configured to transmit, for the network node, a first indication that the first data packet has been discarded, where the scheduling is based on the first indication. The MDC component 198 is configured to replace the first data packet with a second data packet, where the second data packet is to be discarded. The MDC component 198 is configured to transmit, for the network node, the second data packet, where the scheduling is based on the second data packet. The MDC component 198 is configured to establish a plurality of channels including a first logical channel and a second logical channel based on an indication of a gap between a first encoding of a data packet and a second encoding of the data packet associated with the first wireless device. The MDC component 198 is configured to map the first encoding to the first logical channel and the second encoding to the second logical channel. The MDC component 198 is configured to transmit, for a second wireless device, the first encoding and the second encoding in different slots or different subframes based on the first encoding being mapped to the first logical channel and the second encoding being mapped to the second logical channel. The MDC component 198 is configured to transmit, for the network node, the indication of the gap. The MDC component 198 is configured to receive the indication of the gap. The MDC component 198 is configured to receive, in different slots or different subframes, a first encoding of a data packet and a second encoding of the data packet associated with a first wireles s device, where the first encoding is associated with a first logical channel and the second encoding is associated with a second logical channel. The MDC component 198 is configured to aggregate the first encoding of the data packet and the second encoding of the data packet into a QoS flow. The MDC component 198 is configured to reorder, at the protocol layer, the first encoding and the second encoding if the protocol layer is the SDAP layer or the layer that higher than the SDAP layer. The MDC component 198 is configured assign a first SN to the first encoding and a second SN to the second encoding. The MDC component 198 may be within the cellular baseband processor 3024, the application processor 3006, or both the cellular baseband processor 3024 and the application processor 3006. The MDC component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 3004 may include a variety of components configured for various functions. In one configuration, the apparatus 3004, and in particular the cellular baseband processor 3024 and/or the application processor 3006, includes means for monitoring at least one radio bearer for RLC segmentation information corresponding to a set of SDUs associated with the first wireless device. In one configuration, the apparatus 3004, and in particular the cellular baseband processor 3024 and/or the application processor 3006, includes means for transmitting, for a second wireless device, at least one RLC SDU that includes a number of encodings based on the RLC segmentation information corresponding to the set of SDUs. In one configuration, the apparatus 3004, and in particular the cellular baseband processor 3024 and/or the application processor 3006, includes means for determining, by an upper protocol layer of the first wireless device and prior to transmitting the at least one RLC SDU, the number of encodings based on the RLC segmentation information corresponding to the set of SDUs. In one configuration, the apparatus 3004, and in particular the cellular baseband processor 3024 and/or the application processor 3006, includes means for obtaining at least one RLC SDU segment belonging to a set of RLC SDU segments associated with a first wireless device. In one configuration, the apparatus 3004, and in particular the cellular baseband processor 3024 and/or the application processor 3006, includes means for delivering the at least one RLC SDU segment to an upper layer, upon an occurrence of a condition and without obtaining an entirety of the set of RLC SDU segments. In one configuration, the apparatus 3004, and in particular the cellular baseband processor 3024 and/or the application processor 3006, includes means for reconstructing, at the upper layer, at least one of the plurality of data fields based on the at least one RLC SDU segment and without receiving the entirety of the set of the RLC SDU segments. In one configuration, the apparatus 3004, and in particular the cellular baseband processor 3024 and/or the application processor 3006, includes means for obtaining, prior to reconstructing the at least one of the plurality of data fields, boundary information associated with boundaries of each of the plurality of data fields associated with the at least one RLC SDU segment, where reconstructing the at least one of the plurality of data fields is further based on the boundary information. In one configuration, the means for reconstructing the at least one of the plurality of data fields based on the at least one RLC SDU segment include means for delivering the at least one RLC SDU segment to an upper protocol layer of the second wireless device if the at least one RLC SDU segment includes a SDAP header, a PDCP header, a ROHC header, and a first data field, where reconstructing the at least one of the plurality of data fields occurs at the upper protocol layer. In one configuration, the apparatus 3004, and in particular the cellular baseband processor 3024 and/or the application processor 3006, includes means for transmitting, for a network node, an indication of a gap between a first encoding of a data packet and a second encoding of the data packet associated with the UE. In one configuration, the apparatus 3004, and in particular the cellular baseband processor 3024 and/or the application processor 3006, includes means for receiving scheduling for at least one of DL or UL transmissions based on the indication of the gap, where the scheduling indicates that the first encoding and the second encoding of the data packet are scheduled for transmission or reception in different slots or different subframes. In one configuration, the apparatus 3004, and in particular the cellular baseband processor 3024 and/or the application processor 3006, includes means for detecting that a first data packet has been discarded. In one configuration, the apparatus 3004, and in particular the cellular baseband processor 3024 and/or the application processor 3006, includes means for transmitting, for the network node, a first indication that the first data packet has been discarded, where the scheduling is based on the first indication. In one configuration, the apparatus 3004, and in particular the cellular baseband processor 3024 and/or the application processor 3006, includes means for replacing the first data packet with a second data packet, where the second data packet is to be discarded. In one configuration, the apparatus 3004, and in particular the cellular baseband processor 3024 and/or the application processor 3006, includes means for transmitting, for the network node, the second data packet, where the scheduling is based on the second data packet. In one configuration, the apparatus 3004, and in particular the cellular baseband processor 3024 and/or the application processor 3006, includes means for establishing a plurality of channels including a first logical channel and a second logical channel based on an indication of a gap between a first encoding of a data packet and a second encoding of the data packet associated with the first wireless device. In one configuration, the apparatus 3004, and in particular the cellular baseband processor 3024 and/or the application processor 3006, includes means for mapping the first encoding to the first logical channel and the second encoding to the second logical channel. In one configuration, the apparatus 3004, and in particular the cellular baseband processor 3024 and/or the application processor 3006, includes means for transmitting, for a second wireless device, the first encoding and the second encoding in different slots or different subframes based on the first encoding being mapped to the first logical channel and the second encoding being mapped to the second logical channel. In one configuration, the apparatus 3004, and in particular the cellular baseband processor 3024 and/or the application processor 3006, includes means for transmitting, for the network node, the indication of the gap. In one configuration, the apparatus 3004, and in particular the cellular baseband processor 3024 and/or the application processor 3006, includes means for receiving the indication of the gap. In one configuration, the apparatus 3004, and in particular the cellular baseband processor 3024 and/or the application processor 3006, includes means for receiving, in different slots or different subframes, a first encoding of a data packet and a second encoding of the data packet associated with a first wireless device, where the first encoding is associated with a first logical channel and the second encoding is associated with a second logical channel. In one configuration, the apparatus 3004, and in particular the cellular baseband processor 3024 and/or the application processor 3006, includes means for aggregating the first encoding of the data packet and the second encoding of the data packet into a QoS flow. In one configuration, the apparatus 3004, and in particular the cellular baseband processor 3024 and/or the application processor 3006, includes means for reordering, at the protocol layer, the first encoding and the second encoding if the protocol layer is the SDAP layer or the layer that higher than the SDAP layer. In one configuration, the means for reordering the first encoding and the second encoding include means for assigning a first SN to the first encoding and a second SN to the second encoding. The means may be the MDC component 198 of the apparatus 3004 configured to perform the functions recited by the means. As described supra, the apparatus 3004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 31:
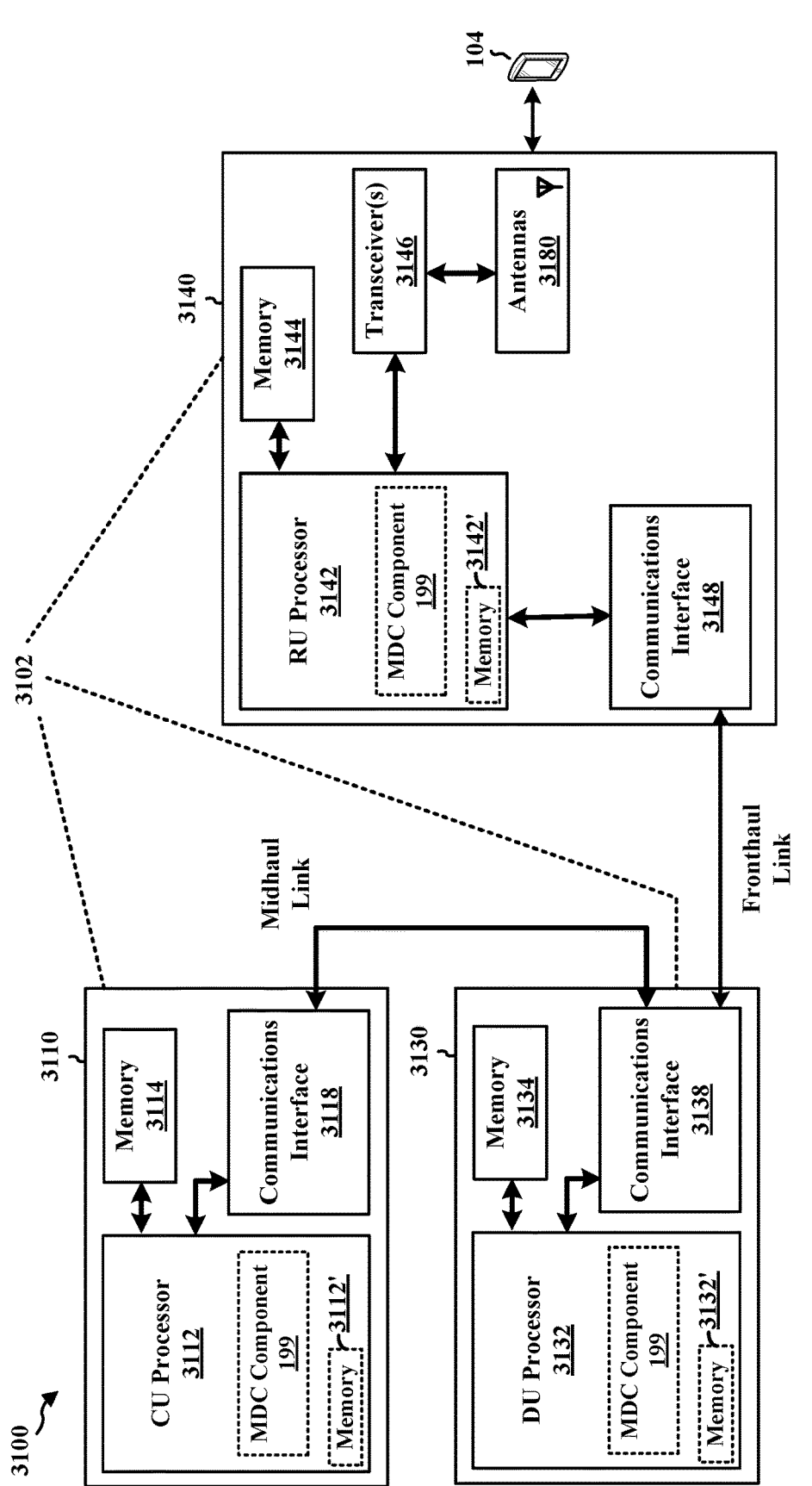
FIG. 31 is a diagram illustrating an example of a hardware implementation for an example network entity.

FIG. 31 is a diagram 3100 illustrating an example of a hardware implementation for a network entity 3102. The network entity 3102 may be a BS, a component of a BS, or may implement BS functionality. The network entity 3102 may include at least one of a CU 3110, a DU 3130, or an RU 3140. For example, depending on the layer functionality handled by the MDC component 199, the network entity 3102 may include the CU 3110; both the CU 3110 and the DU 3130; each of the CU 3110, the DU 3130, and the RU 3140; the DU 3130; both the DU 3130 and the RU 3140; or the RU 3140. The CU 3110 may include a CU processor 3112. The CU processor 3112 may include on-chip memory 3112'. In some aspects, the CU 3110 may further include additional memory modules 3114 and a communications interface 3118. The CU 3110 communicates with the DU 3130 through a midhaul link, such as an F1 interface. The DU 3130 may include a DU processor 3132. The DU processor 3132 may include on-chip memory 3132'. In some aspects, the DU 3130 may further include additional memory modules 3134 and a communications interface 3138. The DU 3130 communicates with the RU 3140 through a fronthaul link. The RU 3140 may include an RU processor 3142. The RU processor 3142 may include on-chip memory 3142'. In some aspects, the RU 3140 may further include additional memory modules 3144, one or more transceivers 3146, antennas 3180, and a communications interface 3148. The RU 3140 communicates with the UE 104. The on-chip memory 3112', 3132', 3142' and the additional memory modules 3114, 3134, 3144 may each be considered a computer-readable medium/memory. Each computer-readable medium/memory may be non-transitory. Each of the processors 3112, 3132, 3142 is responsible for general processing, including the execution of software stored on the computer-readable medium/memory. The software, when executed by the corresponding processor(s)

causes the processor(s) to perform the various functions described supra. The computer-readable medium/memory may also be used for storing data that is manipulated by the processor(s) when executing software.

As discussed supra, the MDC component 199 is configured to monitor at least one radio bearer for RLC segmentation information corresponding to a set of SDUs associated with the first wireless device. The MDC component 199 is configured to transmit, for a second wireless device, at least one RLC SDU that includes a number of encodings based on the RLC segmentation information corresponding to the set of SDUs. The MDC component 199 is configured to determine, by an upper protocol layer of the first wireless device and prior to transmitting the at least one RLC SDU, the number of encodings based on the RLC segmentation information corresponding to the set of SDUs. The MDC component 199 is configured to obtain at least one RLC SDU segment belonging to a set of RLC SDU segments associated with a first wireless device. The MDC component 199 is configured to deliver the at least one RLC SDU segment to an upper layer, upon an occurrence of a condition and without obtaining an entirety of the set of RLC SDU segments. The MDC component 199 is configured to reconstruct, at the upper layer, at least one of the plurality of data fields based on the at least one RLC SDU segment and without receiving the entirety of the set of the RLC SDU segments. The MDC component 199 is configured to obtain, prior to reconstructing the at least one of the plurality of data fields, boundary information associated with boundaries of each of the plurality of encodings associated with the at least one RLC SDU segment, where reconstructing the at least one of the plurality of data fields is further based on the boundary information. The MDC component 199 is configured to deliver the at least one RLC SDU segment to an upper protocol layer of the second wireless device if the at least one RLC SDU segment includes a SDAP header, a PDCP header, a ROHC header, and a first data field, where reconstructing the at least one of the plurality of data fields occurs at the upper protocol layer. The MDC component 199 is configured to receive an indication of a gap between a first encoding of a data packet and a second encoding of the data packet associated with a UE. The MDC component 199 is configured to transmit, for the UE, scheduling for at least one of DL or UL transmissions of the UE based on the indication of the gap, where the scheduling indicates that the first encoding and the second encoding of the data packet are scheduled for transmission or reception in different slots or different subframes. The MDC component 199 is configured to obtain a first indication that a first data packet has been discarded, where the scheduling is based on the first indication. The MDC component 199 is configured to establish a plurality of channels including a first logical channel and a second logical channel based on an indication of a gap between a first encoding of a data packet and a second encoding of the data packet associated with the first wireless device. The MDC component 199 is configured to map the first encoding to the first logical channel and the second encoding to the second logical channel. The MDC component 199 is configured to transmit, for a second wireless device, the first encoding and the second encoding in different slots or different subframes based on the first encoding being mapped to the first logical channel and the second encoding being mapped to the second logical channel. The MDC component 199 is configured to transmit, for the network node, the indication of the gap. The MDC component 199 is configured to receive the indication of the gap. The MDC component 199 is configured to receive, in different slots or different subframes, a first encoding of a data packet and a second encoding of the data packet associated with a first wireless device, where the first encoding is associated with a first logical channel and the second encoding is associated with a second logical channel. The MDC component 199 is configured to aggregate the first encoding of the data packet and the second encoding of the data packet into a QoS flow. The MDC component 199 is configured to reorder, at the protocol layer, the first encoding and the second encoding if the protocol layer is the SDAP layer or the layer that higher than the SDAP layer. The MDC component 199 is configured assign a first SN to the first encoding and a second SN to the second encoding. The MDC component 199 may be within one or more processors of one or more of the CU 3110, DU 3130, and the RU 3140. The MDC component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 3102 may include a variety of components configured for various functions. In one configuration, the network entity 3102 includes means for monitoring at least one radio bearer for RLC segmentation information corresponding to a set of SDUs associated with the first wireless device. In one configuration, the network entity 3102 includes means for transmitting, for a second wireless device, at least one RLC SDU that includes a number of encodings based on the RLC segmentation information corresponding to the set of SDUs. In one configuration, the network entity 3102 includes means for determining, by an upper protocol layer of the first wireless device and prior to transmitting the at least one RLC SDU, the number of encodings based on the RLC segmentation information corresponding to the set of SDUs. In one configuration, the network entity 3102 includes means for obtaining at least one RLC SDU segment belonging to a set of RLC SDU segments associated with a first wireless device. In one configuration, the network entity 3102 includes means for delivering the at least one RLC SDU segment to an upper layer, upon an occurrence of a condition and without obtaining an entirety of the set of RLC SDU segments. In one configuration, the network entity 3102 includes means for reconstructing, at the upper layer, at least one of the plurality of data fields based on the at least one RLC SDU segment and without receiving the entirety of the set of the RLC SDU segments. In one configuration, the network entity 3102 includes means for obtaining, prior to reconstructing the at least one of the plurality of data fields, boundary information associated with boundaries of each of the plurality of data fields associated with the at least one RLC SDU segment, where reconstructing the at least one of the plurality of data fields is further based on the boundary information. In one configuration, the means for reconstructing the at least one of the plurality of data fields based on the at least one RLC SDU segment include means for delivering the at least one RLC SDU segment to an upper protocol layer of the second wireless device if the at least one RLC SDU segment includes a SDAP header, a PDCP header, a ROHC header, and a first data field, where reconstructing the at least one of the plurality of data fields occurs at the upper protocol layer. In one configuration, the network entity 3102 includes means for receiving an indication of a gap between a first encoding of a data packet and a second encoding of the data packet associated with a UE. In one configuration, the network entity 3102 includes means for transmitting, for the UE, scheduling for at least one of DL or UL transmissions of the UE based on the indication of the gap, where the scheduling indicates that the first encoding and the second encoding of the data packet are scheduled for transmission or reception in different slots or different subframes. In one configuration, the network entity 3102 includes means for obtaining a first indication that a first data packet has been discarded, where the scheduling is based on the first indication. In one configuration, the network entity 3102 includes means for establishing a plurality of channels including a first logical channel and a second logical channel based on an indication of a gap between a first encoding of a data packet and a second encoding of the data packet associated with the first wireless device. In one configuration, the network entity 3102 includes means for mapping the first encoding to the first logical channel and the second encoding to the second logical channel. In one configuration, the network entity 3102 includes means for transmitting, for a second wireless device, the first encoding and the second encoding in different slots or different subframes based on the first encoding being mapped to the first logical channel and the second encoding being mapped to the second logical channel. In one configuration, the network entity 3102 includes means for transmitting, for the network node, the indication of the gap. In one configuration, the network entity 3102 includes means for receiving the indication of the gap. In one configuration, the network entity 3102 includes means for receiving, in different slots or different subframes, a first encoding of a data packet and a second encoding of the data packet associated with a first wireless device, where the first encoding is associated with a first logical channel and the second encoding is associated with a second logical channel. In one configuration, the network entity 3102 includes means for aggregating the first encoding of the data packet and the second encoding of the data packet into a QoS flow. In one configuration, the network entity 3102 includes means for reordering, at the protocol layer, the first encoding and the second encoding if the protocol layer is the SDAP layer or the layer that higher than the SDAP layer. In one configuration, the means for reordering the first encoding and the second encoding include means for assigning a first SN to the first encoding and a second SN to the second encoding.

The means may be the MDC component 199 of the network entity 3102 configured to perform the functions recited by the means. As described supra, the network entity 3102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 32:
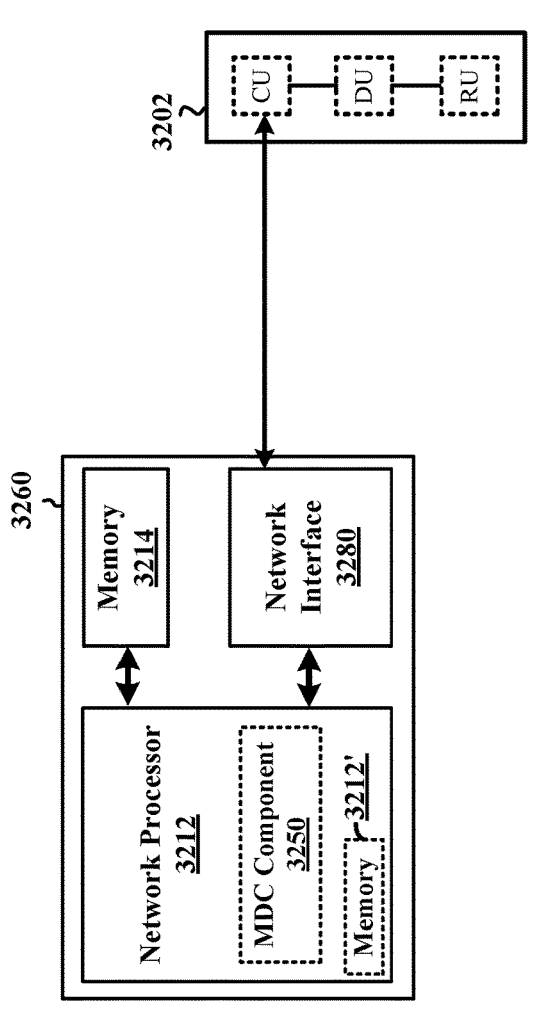
FIG. 32 is a diagram illustrating an example of a hardware implementation for an example network entity.

FIG. 32 is a diagram 3200 illustrating an example of a hardware implementation for a network entity 3260. In one example, the network entity 3260 may be within the core network 120. The network entity 3260 may include a network processor 3212. The network processor 3212 may include on-chip memory 3212'. In some aspects, the network entity 3260 may further include additional memory modules 3214. The network entity 3260 communicates via the network interface 3280 directly (e.g., backhaul link) or indirectly (e.g., through a RIC) with the CU 3202. The on-chip memory 3212' and the additional memory modules 3214 may each be considered a computer-readable medium/memory. Each computer-readable medium/memory may be non-transitory. The processor 3212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MDC component 3250 is configured to perform functionality described herein as being performed by a core network. The MDC component 3250 may be within the processor 3212. The MDC component 3250 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 3260 may include a variety of components configured for various functions. In one configuration, the network entity 3260 includes means for performing functionality described herein as being performed by a core network. The means may be the MDC component 3250 of the network entity 3260 configured to perform the functions recited by the means.

A first wireless device (e.g., a first UE, a first base station) may transmit data for a second wireless device (e.g., a second UE, a second base station). The data may include a first (i.e., primary) encoding (e.g., a first MDC encoding) and a second (i.e., secondary) encoding (e.g., a second MDC encoding) of content (e.g., speech data). Depending on various factors, the second wireless device may receive the first encoding, the second encoding, or both the first encoding and the second encoding. The first encoding and the second encoding may be decoded by the second wireless device independently (e.g., in cases where the second wireless device does not receive one of the first encoding or the second encoding) to achieve increased communications reliability for the content or the first encoding and the second encoding may be decoded jointly (e.g., in cases where the second wireless device receives both the first encoding and the second encoding) to achieve higher quality for the content. However, some wireless communication systems may not be able to take advantage of the independent decoding described above, as the wireless communication systems may discard the first encoding if the second encoding is not received, or vice versa.

NR RLC behavior may not be able to take advantage of MDC. For instance, the first encoding and the second encoding may be included in a first RLC SDU segment and a second RLC SDU segment, respectively. If the first RLC SDU segment is not received by a RLC receiver (e.g., the second wireless device), the second RLC SDU segment may be discarded by the RLC receiver, even though the second encoding included in the second RLC SDU segment may be decoded independently from the first encoding. Furthermore, the first encoding and the second encoding may be scheduled in the same time resource (e.g., i.e., a lack of time-domain diversity). For instance, the first encoding and the second encoding may be scheduled for the same slot or the subframe. If the second wireless device does not receive the time resource that includes the first encoding and the second encoding, the second device may not be able to decode content represented by the first encoding and the second encoding.

In an example, in a MDC scheme, an IP packet may accommodate multiple (output) encodings (e.g., output encoding A and output encoding B) and the encodings may be processed by a Rx side of a vocoder independently. As described above, even if the Rx side of the vocoder receives encoding A and not encoding B (or vice versa), the received encoding may still be useful to the Rx side of the vocoder due to the functionality provided by the MDC scheme. For example, output encoding A and output encoding B may be accommodated in one IP packet. If output encoding B is lost in the air, it may be useful for the Rx side of the vocoder to receive output encoding A. However, according to RLC behavior in some wireless communication systems, a receiving side of a RLC layer may not deliver a RLC SDU to an upper layer if the whole SDU is not reassembled. For instance, if output encoding B is lost in the air, the received SDU segment including output encoding A may be discarded in a RLC layer. Thus, current RLC behavior may not be able to take advantage of the MDC scheme.

As noted above, NR RLC behavior may not take advantage of time-domain diversity with respect to a MDC scheme. In order to take advantage of time-domain diversity, a base station (e.g., a gNB or eNB) may schedule a primary encoding and a secondary encoding in different slots or different subframes. However, the base station may not be aware that a MDC scheme is being employed by a UE and thus the base station may schedule the primary encoding and the secondary encoding in the same slot or the same subframe if a TBS is sufficiently large to accommodate both the primary encoding and the secondary encoding.

In one example, the base station may schedule the primary encoding and the secondary encoding in the same slot or the same subframe due to UL HARQ reordering. For instance, due to UL HARQ reordering, the base station may deliver multiple packets to a core network at the same time and the multiple packets may arrive at RAN node of a peer UE at the same time, thus causing the primary encoding and the secondary encoding to be delivered in the same slot or the same subframe. In another example, the base station may schedule the primary encoding and the secondary encoding in the same slot or the same subframe due to delay packing. For instance, the base station may intentionally suspend transmissions to save PDCCH resources for dynamic scheduling, L2 overhead reduction, and/or UE battery saving, thus causing the primary encoding and the secondary encoding to be delivered in the same slot or the same subframe. However, delay packing may not cause the primary encoding and the secondary encoding to be delivered in the same slot or the same subframe if a number of aggregated packets used for delay packing is two or three. In yet another example, the base station may schedule the primary encoding and the secondary encoding in the same slot or the same subframe due to handover (HO) or RRC re-establishment. For instance, during a HO or during a RRC re-establishment, a UE and a base station may buffer packets until scheduling is resumed. For instance, five packets may be buffered in a case in which a packet delay budget (PDB) is 100 ms and an inter-packet period is 20 ms (or six packets in a case in which the PDB is longer). In a non-terrestrial network (NTN) environment, a HO or a RRC re-establishment may take more than 100 ms. A NTN may not increase a time gap between the primary encoding and the secondary encoding for end to end latency purposes, and thus the primary encoding and the secondary encoding may be delivered in the same slot or the same subframe. This may occur frequently in a earth-moving cell such as a low Earth orbit (LEO) cell.

Various technologies pertaining to RAN enhancements for MDC are described herein. In one aspect, the technologies described herein may avoid RLC SDU segmentation and/or may help to ensure that a Rx RLC receiver delivers received data before RLC SDU reassembly. In another aspect, the technologies described herein may provide for a UE or a base station (e.g., a gNB or a eNB) that applies a scheduling restriction such that a primary encoding and a secondary encoding are scheduled for transmission or reception in different slots or different subframes. In one approach, the base station may adjust a transport block size (TBS) such that the primary encoding and the secondary encoding are scheduled in different slots or different subframes. In another approach, the UE and/or the base station may restrict mapping of data to a transport block such that the primary encoding and the secondary encoding are scheduled in different slots or different subframes.

In one example, a first wireless device monitors at least one radio bearer for RLC segmentation information corresponding to a set of SDUs associated with the first wireless device. The first wireless device transmits, for a second wireless device, at least one RLC SDU that includes a number of encodings based on the RLC segmentation information corresponding to the set of SDUs. By monitoring for the RLC segmentation information, the first wireless device may help to avoid RLC segmentation in order to realize benefits associated with MDC.

In another example, a second wireless device obtains at least one RLC SDU segment belonging to a set of RLC SDU segments associated with a first wireless device. The second wireless device delivers the at least one RLC SDU segment to an upper layer, upon an occurrence of a condition and without obtain an entirety of the set of RLC SDU segments. Vis-à-vis the aforementioned features, the second wireless device may deliver received data before RLC SDU reassembly and hence may help to ensure that a primary encoding is not discarded if a secondary encoding is not received (or vice versa).

In a further example, a UE transmits, for a network node, an indication of a gap between a first encoding of a data packet and a second encoding of the data packet associated with the UE. The UE receives scheduling for at least one of DL or UL transmissions based on the indication of the gap, where the scheduling indicates that the first encoding and the second encoding of the data packet are scheduled for transmission or reception in different slots or different subframes. The scheduling may help to ensure that the first encoding and the secondary encoding are scheduled in different slots or different subframes such that advantages of MDC may be realized.

In yet another example, a first wireless device establishes a plurality of channels including a first logical channel and a second logical channel based on an indication of a gap between a first encoding of a data packet and a second encoding of the data packet associated with the first wireless device. The first wireless device maps the first encoding to the first logical channel and the second encoding to the second logical channel. The first wireless device transmits, for a second wireless device, the first encoding and the second encoding in different slots or different subframes based on the first encoding being mapped to the first logical channel and the second encoding being mapped to the second logical channel. Vis-à-vis the aforementioned mapping, the above-described technologies may help to ensure that the first encoding and the secondary encoding are scheduled in different slots or different subframes such that advantages of MDC may be realized.

In a further example, a network node receives an indication of a gap between a first encoding of a data packet and a second encoding of the data packet associated with a UE. The network node transmits, for the UE, scheduling for at least one of DL or UL transmissions of the UE based on the indication of the gap, where the scheduling indicates that the first encoding and the second encoding of the data packet are scheduled for transmission or reception in different slots or different subframes. The scheduling may help to ensure that the first encoding and the secondary encoding are scheduled in different slots or different subframes such that advantages of MDC may be realized.

In another example, a second wireless device receives, in different slots or different subframes, a first encoding of a data packet and a second encoding of the data packet associated with a first wireless device, where the first encoding is associated with a first logical channel and the second encoding is associated with a second logical channel. The second wireless device aggregates the first encoding of the data packet and the second encoding of the data packet into a QoS flow. Vis-à-vis the aforementioned features, advantages of MDC may be realized.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, including: monitoring at least one radio bearer for radio link control (RLC) segmentation information corresponding to a set of service data units (SDUs) associated with the first wireless device; and transmitting, for a second wireless device, at least one RLC SDU that includes a number of encodings based on the RLC segmentation information corresponding to the set of SDUs.

Aspect 2 is the method of aspect 1, where the RLC segmentation information includes at least one of: a first number of segmentation instances of the set of SDUs, a transport block size (TBS) associated with the set of SDUs, a gap size between an RLC SDU and the TBS, a recommended SDU size, or a minimum TBS indicated by a network.

Aspect 3 is the method of any of aspects 1-2, where a lower protocol layer of the first wireless device monitors the at least one radio bearer for the RLC segmentation information, the method further including: determining, by an upper protocol layer of the first wireless device and prior to transmitting the at least one RLC SDU, the number of encodings based on the RLC segmentation information corresponding to the set of SDUs.

Aspect 4 is the method of any of aspects 1-3, where the encodings are multiple description coding (MDC) encodings, where the MDC encodings correspond to an input speech frame associated with the first wireless device.

Aspect 5 is the method of any of aspects 1-4, where monitoring the at least one radio bearer for the RLC segmentation information occurs within a monitoring window.

Aspect 6 is the method of any of aspects 1-5, where the at least one RLC SDU does not include SDU segments.

Aspect 7 is the method of any of aspects 1-6, where the number of encodings is less than a threshold.

Aspect 8 is an apparatus for wireless communication at a first wireless device including a memory and at least one processor coupled to the memory and based at least in part on information stored in the memory, the at least one processor is configured to perform a method in accordance with any of aspects 1-7.

Aspect 9 is an apparatus for wireless communications, including means for performing a method in accordance with any of aspects 1-7.

Aspect 10 is the apparatus of aspect 8 or 9 further including at least one of a transceiver or an antenna coupled to the at least one processor, where the at least one processor is configured to transmit the at least one RLC SDU via at least one of the transceiver or the antenna.

Aspect 11 is a computer-readable medium (e.g., a non-transitory computer-readable medium) including instructions that, when executed by an apparatus, cause the apparatus to perform a method in accordance with any of aspects 1-7.

Aspect 12 is a method of wireless communication at a second wireless device, including: obtaining at least one radio link control (RLC) service data unit (SDU) segment belonging to a set of RLC SDU segments associated with a first wireless device; and delivering the at least one RLC SDU segment to an upper layer, upon an occurrence of a condition and without obtaining an entirety of the set of RLC SDU segments.

Aspect 13 is the method of aspect 12, where the occurrence of the condition includes a timer expiring, a re-establishment of an RLC entity, a release of the RLC entity, or a reception of an explicit indication.

Aspect 14 is the method of any of aspects 12-13, where the at least one RLC SDU segment is associated with a plurality of data fields, the method further including: reconstructing, at the upper layer, at least one of the plurality of data fields based on the at least one RLC SDU segment and without receiving the entirety of the set of the RLC SDU segments.

Aspect 15 is the method of aspect 14, further including: obtaining, prior to reconstructing the at least one of the plurality of data fields, boundary information associated with boundaries of each of the plurality of data fields associated with the at least one RLC SDU segment, where reconstructing the at least one of the plurality of data fields is further based on the boundary information.

Aspect 16 is the method of aspect 15, where the boundary information is included in a control packet data unit (PDU) or a RLC header.

Aspect 17 is the method of aspect 16, where the RLC header includes a field that indicates that the RLC header includes the boundary information.

Aspect 18 is the method of any of aspects 15-17, where the at least one RLC SDU segment is obtained at a lower protocol layer of the second wireless device, where reconstructing the at least one of the plurality of data fields based on the at least one RLC SDU segment includes: delivering the at least one RLC SDU segment to an upper protocol layer of the second wireless device if the at least one RLC SDU segment includes a service data application protocol (SDAP) header, a packet data convergence protocol (PDCP) header, a robust header compression (ROHC) header, and a first data field, where reconstructing the at least one of the plurality of data fields occurs at the upper protocol layer.

Aspect 19 is the method of any of aspects 14-18, where the plurality of data fields includes multiple description coding (MDC) encodings, where the MDC encodings correspond to an input speech frame associated with the first wireless device.

Aspect 20 is an apparatus for wireless communication at a second wireless device including a memory and at least one processor coupled to the memory and based at least in part on information stored in the memory, the at least one processor is configured to perform a method in accordance with any of aspects 12-19.

Aspect 21 is an apparatus for wireless communications, including means for performing a method in accordance with any of aspects 12-19.

Aspect 22 is the apparatus of aspect 20 or 21 further including at least one of a transceiver or an antenna coupled to the at least one processor, where the at least one processor is configured to obtain the at least one RLC SDU via at least one of the transceiver or the antenna.

Aspect 23 is a computer-readable medium (e.g., a non-transitory computer-readable medium) including instructions that, when executed by an apparatus, cause the apparatus to perform a method in accordance with any of aspects 12-19.

Aspect 24 is a method of wireless communication at a user equipment (UE), including: transmitting, for a network node, an indication of a gap between a first encoding of a data packet and a second encoding of the data packet associated with the UE; and receiving scheduling for at least one of downlink (DL) or uplink (UL) transmissions based on the indication of the gap, where the scheduling indicates that the first encoding and the second encoding of the data packet are scheduled for transmission or reception in different slots or different subframes.

Aspect 25 is the method of aspect 24, where the indication of the gap is indicative of: a real time transport protocol (RTP) sequence number (SN) gap, a RTP time-stamp gap, a number of data packets associated with the gap, or a time period associated with the gap.

Aspect 26 is the method of any of aspects 24-25, where the indication of the gap is transmitted periodically or upon an occurrence of an event.

Aspect 27 is the method of any of aspects 24-26, further including: detecting that a first data packet has been discarded; and transmitting, for the network node, a first indication that the first data packet has been discarded, where the scheduling is based on the first indication.

Aspect 28 is the method of any of aspects 24-26, further including: detecting that a first data packet has been discarded; replacing the first data packet with a second data packet, where the second data packet is to be discarded; and transmitting, for the network node, the second data packet, where the scheduling is based on the second data packet.

Aspect 29 is an apparatus for wireless communication at a UE including a memory and at least one processor coupled to the memory and based at least in part on information stored in the memory, the at least one processor is configured to perform a method in accordance with any of aspects 24-28.

Aspect 30 is an apparatus for wireless communications, including means for performing a method in accordance with any of aspects 24-28.

Aspect 31 is the apparatus of aspect 29 or 30 further including at least one of a transceiver or an antenna coupled to the at least one processor, where the at least one processor is configured to receive the scheduling via at least one of the transceiver or the antenna.

Aspect 32 is a computer-readable medium (e.g., a non-transitory computer-readable medium) including instructions that, when executed by an apparatus, cause the apparatus to perform a method in accordance with any of aspects 24-28.

Aspect 33 is a method of wireless communication at a first wireless device, including: establishing a plurality of channels including a first logical channel and a second logical channel based on an indication of a gap between a first encoding of a data packet and a second encoding of the data packet associated with the first wireless device; mapping the first encoding to the first logical channel and the second encoding to the second logical channel; and transmitting, for a second wireless device, the first encoding and the second encoding in different slots or different subframes based on the first encoding being mapped to the first logical channel and the second encoding being mapped to the second logical channel.

Aspect 34 is the method of aspect 33, where mapping the first encoding to the first logical channel and the second encoding to the second logical channel occurs at a routing point associated with a protocol layer.

Aspect 35 is the method of aspect 34, where the protocol layer is: a radio link control (RLC) layer, a packet data convergence protocol (PDCP) layer, a service data application protocol (SDAP) layer, or a layer that is higher than the SDAP layer.

Aspect 36 is the method of any of aspects 33-35, where the first wireless device is a user equipment (UE) and the second wireless device is a network node, the method further including: transmitting, for the network node, the indication of the gap.

Aspect 37 is the method of any of aspects 33-35, where the first wireless device is a network node and the second wireless device is a user equipment (UE), the method further including: receiving the indication of the gap.

Aspect 38 is the method of aspect 37, where the indication of the gap is received from the UE or from a core network.

Aspect 39 is the method of any of aspects 33-38, where the indication of the gap is indicative of: a real time transport protocol (RTP) sequence number (SN) gap, a RTP time-stamp gap, a number of data packets associated with the gap, or a time period associated with the gap.

Aspect 40 is an apparatus for wireless communication at a first wireless device including a memory and at least one processor coupled to the memory and based at least in part on information stored in the memory, the at least one processor is configured to perform a method in accordance with any of aspects 33-39.

Aspect 41 is an apparatus for wireless communications, including means for performing a method in accordance with any of aspects 33-39.

Aspect 42 is the apparatus of aspect 40 or 41 further including at least one of a transceiver or an antenna coupled to the at least one processor, where the at least one processor is configured to transmit the first encoding and the second encoding via at least one of the transceiver or the antenna.

Aspect 43 is a computer-readable medium (e.g., a non-transitory computer-readable medium) including instructions that, when executed by an apparatus, cause the apparatus to perform a method in accordance with any of aspects 33-39

Aspect 44 is a method of wireless communication at a network node, including: receiving an indication of a gap between a first encoding of a data packet and a second encoding of the data packet associated with a user equipment (UE); and transmitting, for the UE, scheduling for at least one of downlink (DL) or uplink (UL) transmissions of the UE based on the indication of the gap, where the scheduling indicates that the first encoding and the second encoding of the data packet are scheduled for transmission or reception in different slots or different subframes.

Aspect 45 is the method of aspect 44, where the indication of the gap is indicative of: a real time transport protocol (RTP) sequence number (SN) gap, a RTP time-stamp gap, a number of data packets associated with the gap, or a time period associated with the gap.

Aspect 46 is the method of any of aspects 44-45, where the indication of the gap is received periodically or upon an occurrence of an event.

Aspect 47 is the method of any of aspects 44-46, further including: obtaining a first indication that a first data packet has been discarded, where the scheduling is based on the first indication.

Aspect 48 is an apparatus for wireless communication at a network node including a memory and at least one processor coupled to the memory and based at least in part on information stored in the memory, the at least one processor is configured to perform a method in accordance with any of aspects 44-47.

Aspect 49 is an apparatus for wireless communications, including means for performing a method in accordance with any of aspects 44-47.

Aspect 50 is the apparatus of aspect 48 or 49 further including at least one of a transceiver or an antenna coupled to the at least one processor, where the at least one processor is configured to transmit the scheduling via at least one of the transceiver or the antenna.

Aspect 51 is a computer-readable medium (e.g., a non-transitory computer-readable medium) including instructions that, when executed by an apparatus, cause the apparatus to perform a method in accordance with any of aspects 44-47.

Aspect 52 is a method of wireless communication at a second wireless device, including: receiving, in different slots or different subframes, a first encoding of a data packet and a second encoding of the data packet associated with a first wireless device, where the first encoding is associated with a first logical channel and the second encoding is associated with a second logical channel; and aggregating the first encoding of the data packet and the second encoding of the data packet into a quality of service (QoS) flow.

Aspect 53 is the method of aspect 52, where aggregating the first encoding and the second encoding occurs at an aggregation point associated with a protocol layer.

Aspect 54 is the method of aspect 53, where the protocol layer is: a radio link control (RLC) layer, a packet data convergence protocol (PDCP) layer, a service data application protocol (SDAP) layer, or a layer that is higher than the SDAP layer.

Aspect 55 is the method of aspect 54, further including: reordering, at the protocol layer, the first encoding and the second encoding if the protocol layer is the SDAP layer or the layer that higher than the SDAP layer.

Aspect 56 is the method of aspect 55, where reordering the first encoding and the second encoding includes: assigning a first sequence number (SN) to the first encoding and a second SN to the second encoding.

Aspect 57 is an apparatus for wireless communication at a second wireless device including a memory and at least one processor coupled to the memory and based at least in part on information stored in the memory, the at least one processor is configured to perform a method in accordance with any of aspects 52-56.

Aspect 58 is an apparatus for wireless communications, including means for performing a method in accordance with any of aspects 52-56.

Aspect 59 is the apparatus of aspect 57 or 58 further including at least one of a transceiver or an antenna coupled to the at least one processor, where the at least one processor is configured to receive the first encoding and the second encoding via at least one of the transceiver or the antenna.

Aspect 60 is a computer-readable medium (e.g., a non-transitory computer-readable medium) including instructions that, when executed by an apparatus, cause the apparatus to perform a method in accordance with any of aspects 52-56.

What is claimed is:

1. An apparatus for wireless communication at a first wireless device, comprising:
    memory; and
    at least one processor coupled to the memory and, based at least in part on information stored in the memory, the at least one processor is configured to:
    monitor at least one radio bearer for radio link control (RLC) segmentation information corresponding to a set of service data units (SDUs) associated with the first wireless device; and
    transmit, for a second wireless device, at least one RLC SDU that includes a number of encodings based on the RLC segmentation information corresponding to the set of SDUs, wherein the number of encodings is less than a threshold.

2. The apparatus of claim 1, wherein the RLC segmentation information includes at least one of:
    a first number of segmentation instances of the set of SDUs,
    a transport block size (TBS) associated with the set of SDUs,
    a gap size between an RLC SDU and the TBS,
    a recommended SDU size, or
    a minimum TBS indicated by a network.

3. The apparatus of claim 1, wherein to monitor the at least one radio bearer for RLC segmentation information, the at least one processor is configured to monitor a lower protocol layer of the first wireless device for the RLC segmentation information, wherein the at least one processor is further configured to:
    determine, by an upper protocol layer of the first wireless device and prior to transmission of the at least one RLC SDU, the number of encodings based on the RLC segmentation information corresponding to the set of SDUs.

4. The apparatus of claim 1, wherein the encodings are multiple description coding (MDC) encodings, wherein the MDC encodings correspond to an input speech frame associated with the first wireless device.

5. The apparatus of claim 1, wherein to monitor the at least one radio bearer for the RLC segmentation information, the at least one processor is configured to monitor the at least one radio bearer for the RLC segmentation information within a monitoring window.

6. The apparatus of claim 1, further comprising: at least one of a transceiver or an antenna coupled to the at least one processor, wherein the at least one processor is configured to transmit the at least one RLC SDU via at least one of the transceiver or the antenna.

7. An apparatus for wireless communication at a second wireless device, comprising:

memory; and at least one processor coupled to the memory and, based at least in part on information stored in the memory, the at least one processor is configured to:

obtain at least one radio link control (RLC) service data unit (SDU) segment belonging to a set of RLC SDU segments associated with a first wireless device, wherein the at least one RLC SDU segment is associated with a plurality of data fields;

deliver the at least one RLC SDU segment to an upper layer, upon an occurrence of a condition and without an entirety of the set of RLC SDU segments being obtained; and reconstruct, at the upper layer, at least one of the plurality of data fields associated with the at least one RLC SDU segment based on the at least one RLC SDU segment and without the entirety of the set of the RLC SDU segments being received.

8. The apparatus of claim 7, wherein the occurrence of the condition includes an expiration of a timer, a re-establishment of an RLC entity, a release of the RLC entity, or a reception of an explicit indication.

9. The apparatus of claim 7, wherein the at least one processor is further configured to:

obtain, prior to reconstruction of the at least one of the plurality of data fields, boundary information associated with boundaries of each of the plurality of data fields associated with the at least one RLC SDU segment, wherein to reconstruct the at least one of the plurality of data fields, the at least one processor is further configured to reconstruct the at least one of the plurality of data fields based on the boundary information.

10. The apparatus of claim 9, wherein the boundary information is included in a control packet data unit (PDU) or a RLC header.

11. The apparatus of claim 10, wherein the RLC header includes a field that indicates that the RLC header includes the boundary information.

12. The apparatus of claim 9, wherein to obtain the at least one RLC SDU segment, the at least one processor is configured to obtain the at least one RLC SDU segment at a lower protocol layer of the second wireless device, wherein to reconstruct the at least one of the plurality of data fields based on the at least one RLC SDU segment, the at least one processor is configured to:

deliver the at least one RLC SDU segment to an upper protocol layer of the second wireless device if the at least one RLC SDU segment includes a service data application protocol (SDAP) header, a packet data convergence protocol (PDCP) header, a robust header compression (ROHC) header, and a first data field, wherein to reconstruct the at least one of the plurality of data fields, the at least one processor is configured to reconstruct the at least one of the plurality of data fields at the upper protocol layer.

13. The apparatus of claim 7, wherein the plurality of data fields includes multiple description coding (MDC) encodings, wherein the MDC encodings correspond to an input speech frame associated with the first wireless device.

14. The apparatus of claim 10, further comprising:

at least one of a transceiver or an antenna coupled to the at least one processor, wherein the at least one processor is configured to obtain the at least one RLC SDU segment via at least one of the transceiver or the antenna.

15. A method of wireless communication at a first wireless device, comprising:

monitoring at least one radio bearer for radio link control (RLC) segmentation information corresponding to a set of service data units (SDUs) associated with the first wireless device; and transmitting, for a second wireless device, at least one RLC SDU that includes a number of encodings based on the RLC segmentation information corresponding to the set of SDUs, wherein the number of encodings is less than a threshold.

16. The method of claim 15, wherein the RLC segmentation information includes at least one of:

a first number of segmentation instances of the set of SDUs, a transport block size (TBS) associated with the set of SDUs, a gap size between an RLC SDU and the TBS, a recommended SDU size, or a minimum TBS indicated by a network.

17. The method of claim 15, wherein monitoring the at least one radio bearer for RLC segmentation information includes monitoring a lower protocol layer of the first wireless device for the RLC segmentation information, the method further comprising:

determining, by an upper protocol layer of the first wireless device and prior to transmitting the at least one RLC SDU, the number of encodings based on the RLC segmentation information corresponding to the set of SDUs.

18. The method of claim 15, wherein the encodings are multiple description coding (MDC) encodings, wherein the MDC encodings correspond to an input speech frame associated with the first wireless device.

19. The method of claim 15, wherein monitoring the at least one radio bearer for the RLC segmentation information includes monitoring the at least one radio bearer for the RLC segmentation information within a monitoring window.

20. A method of wireless communication at a second wireless device, comprising:

obtaining at least one radio link control (RLC) service data unit (SDU) segment belonging to a set of RLC SDU segments associated with a first wireless device, wherein the at least one RLC SDU segment is associated with a plurality of data fields; and delivering the at least one RLC SDU segment to an upper layer, upon an occurrence of a condition and without an entirety of the set of RLC SDU segments being obtained; and reconstructing, at the upper layer, at least one of the plurality of data fields based on the at least one RLC SDU segment and without the entirety of the set of the RLC SDU segments being received.

21. The method of claim 20, wherein the occurrence of the condition includes an expiration of a timer, a re-establishment of an RLC entity, a release of the RLC entity, or a reception of an explicit indication.

22. The method of claim 20, further comprising:

obtaining, prior to reconstructing the at least one of the plurality of data fields, boundary information associated with boundaries of each of the plurality of data fields associated with the at least one RLC SDU segment, wherein reconstructing the at least one of the plurality of data fields includes reconstructing the at least one of the plurality of data fields based on the boundary information.

23. The method of claim 22, wherein the boundary information is included in a control packet data unit (PDU) or a RLC header.

24. The method of claim 23, wherein the RLC header includes a field that indicates that the RLC header includes the boundary information.

25. The method of claim 22, wherein obtaining the at least one RLC SDU segment includes obtaining the at least one RLC SDU segment at a lower protocol layer of the second wireless device, wherein reconstructing the at least one of the plurality of data fields is based on the at least one RLC SDU segment, and wherein the method further includes:

delivering the at least one RLC SDU segment to an upper protocol layer of the second wireless device if the at least one RLC SDU segment includes a service data application protocol (SDAP) header, a packet data convergence protocol (PDCP) header, a robust header compression (ROHC) header, and a first data field, wherein reconstructing the at least one of the plurality of data fields includes reconstructing the at least one of the plurality of data fields at the upper protocol layer.

26. The method of claim 20, wherein the plurality of data fields includes multiple description coding (MDC) encodings, wherein the MDC encodings correspond to an input speech frame associated with the first wireless device.

*    *    *    *    *